(12) United States Patent
Gao et al.

(10) Patent No.: US 12,732,316 B2
(45) Date of Patent: Sep. 8, 2026

(54) REFERENCE SIGNAL MAPPING METHOD AND APPARATUS

(71) Applicant: HUAWEI TECHNOLOGIES CO., LTD., Shenzhen (CN)

(72) Inventors: Xiang Gao, Beijing (CN); Kunpeng Liu, Beijing (CN); Mingxin Gong, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 441 days.

(21) Appl. No.: 18/193,220

(22) Filed: Mar. 30, 2023

(65) Prior Publication Data

US 2023/0246774 A1 Aug. 3, 2023

Related U.S. Application Data

(63) Continuation of application No. PCT/CN2021/122424, filed on Sep. 30, 2021.

(30) Foreign Application Priority Data

Sep. 30, 2020 (CN) ........................ 202011069338.4

(51) Int. Cl.
*H04L 5/00* (2006.01)
*H04B 7/0456* (2017.01)

(52) U.S. Cl.
CPC ......... *H04L 5/0048* (2013.01); *H04B 7/0456* (2013.01); *H04L 5/001* (2013.01)

(58) Field of Classification Search
CPC ................ H04L 5/0048; H04L 5/0051; H04L 27/26025; H04L 27/26035; H04L 5/001;
(Continued)

(56) References Cited

U.S. PATENT DOCUMENTS

2015/0382356 A1* 12/2015 Kim ...................... H04L 5/0094 370/335
2018/0287682 A1* 10/2018 Kwak ................. H04B 7/0695
(Continued)

FOREIGN PATENT DOCUMENTS

EP 3429088 A1 1/2019

OTHER PUBLICATIONS

Extended European Search Report in European Appln No. 21874590.9, dated Feb. 6, 2024, 9 pages.

*Primary Examiner* — Marcus Smith
*Assistant Examiner* — Francesca Lima Santos
(74) *Attorney, Agent, or Firm* — Fish & Richardson P.C.

(57) ABSTRACT

This disclosure provides example reference signal mapping methods, apparatuses, and media. One example method includes determining a time-frequency unit based on a size of a first frequency domain unit. A resource group in the time-frequency unit is determined based on a first port index, where the resource group corresponds to one port group, and the port group includes one or more ports. A reference signal corresponding to the first port index is mapped to a first resource group in the time-frequency unit in response to determining that a port corresponding to the first port index belongs to a first port group, or the reference signal corresponding to the first port index is mapped to a second resource group in the time-frequency unit in response to determining that a port corresponding to the first port index belongs to a second port group. The reference signal is sent.

20 Claims, 32 Drawing Sheets

(58) Field of Classification Search
CPC ............. H04L 25/0202; H04L 25/0224; H04L 27/261; H04L 27/2613; H04B 7/0456
See application file for complete search history.

(56) References Cited

U.S. PATENT DOCUMENTS

2020/0229122 A1* 7/2020 Kim ...................... H04W 64/00
2020/0229157 A1* 7/2020 Rastegardoost .. H04W 74/0833

* cited by examiner

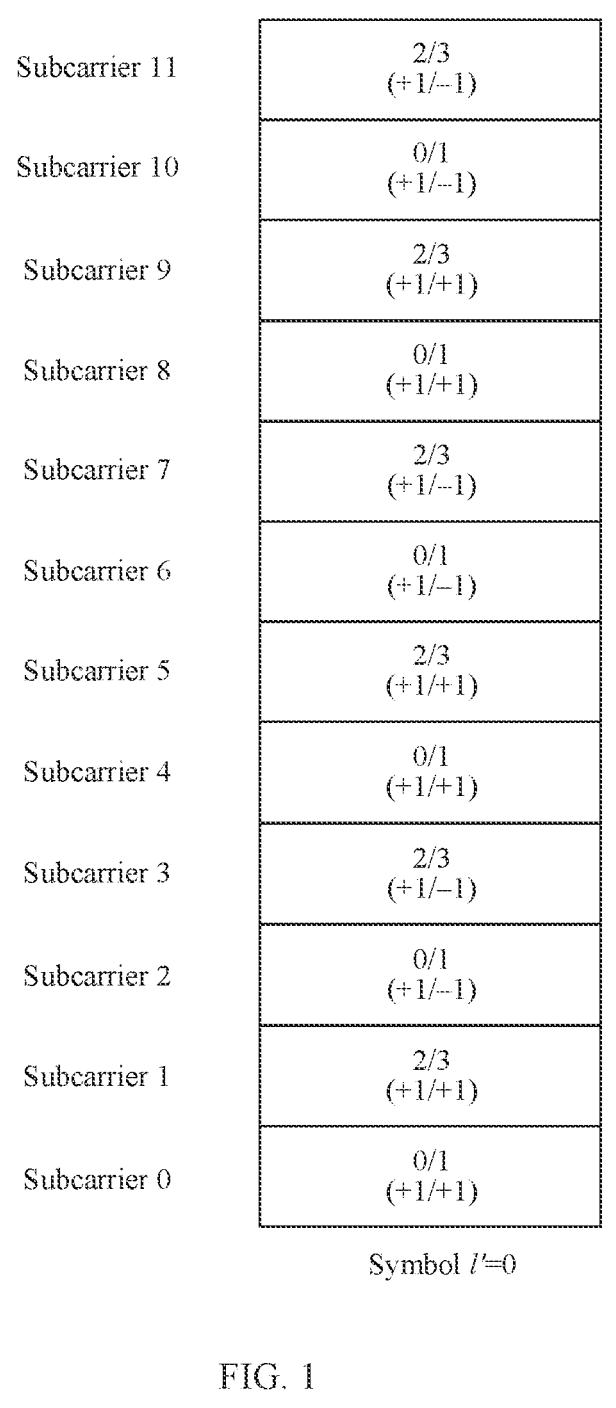

| | Symbol $l'$=0 |
|---|---|
| Subcarrier 11 | 2/3 (+1/−1) |
| Subcarrier 10 | 0/1 (+1/−1) |
| Subcarrier 9 | 2/3 (+1/+1) |
| Subcarrier 8 | 0/1 (+1/+1) |
| Subcarrier 7 | 2/3 (+1/−1) |
| Subcarrier 6 | 0/1 (+1/−1) |
| Subcarrier 5 | 2/3 (+1/+1) |
| Subcarrier 4 | 0/1 (+1/+1) |
| Subcarrier 3 | 2/3 (+1/−1) |
| Subcarrier 2 | 0/1 (+1/−1) |
| Subcarrier 1 | 2/3 (+1/+1) |
| Subcarrier 0 | 0/1 (+1/+1) |

FIG. 1

| | Symbol $l'=0$ | Symbol $l'=1$ |
|---|---|---|
| Subcarrier 11 | 2/3/6/7<br>(+1/–1/+1/–1) | 2/3/6/7<br>(+1/–1/–1/+1) |
| Subcarrier 10 | 0/1/4/5<br>(+1/–1/+1/–1) | 0/1/4/5<br>(+1/–1/–1+1) |
| Subcarrier 9 | 2/3/6/7<br>(+1/+1/+1/+1) | 2/3/6/7<br>(+1/+1/–1/–1) |
| Subcarrier 8 | 0/1/4/5<br>(+1/+1/+1/+1) | 0/1/4/5<br>(+1/+1/–1/–1) |
| Subcarrier 7 | 2/3/6/7<br>(+1/–1/+1/–1) | 2/3/6/7<br>(+1/–1/–1/+1) |
| Subcarrier 6 | 0/1/4/5<br>(+1/–1/+1/–1) | 0/1/4/5<br>(+1/–1/–1+1) |
| Subcarrier 5 | 2/3/6/7<br>(+1/+1/+1/+1) | 2/3/6/7<br>(+1/+1/–1/–1) |
| Subcarrier 4 | 0/1/4/5<br>(+1/+1/+1/+1) | 0/1/4/5<br>(+1/+1/–1/–1) |
| Subcarrier 3 | 2/3/6/7<br>(+1/–1/+1/–1) | 2/3/6/7<br>(+1/–1/–1/+1) |
| Subcarrier 2 | 0/1/4/5<br>(+1/–1/+1/–1) | 0/1/4/5<br>(+1/–1/–1+1) |
| Subcarrier 1 | 2/3/6/7<br>(+1/+1/+1/+1) | 2/3/6/7<br>(+1/+1/–1/–1) |
| Subcarrier 0 | 0/1/4/5<br>(+1/+1/+1/+1) | 0/1/4/5<br>(+1/+1/–1/–1) |

FIG. 2

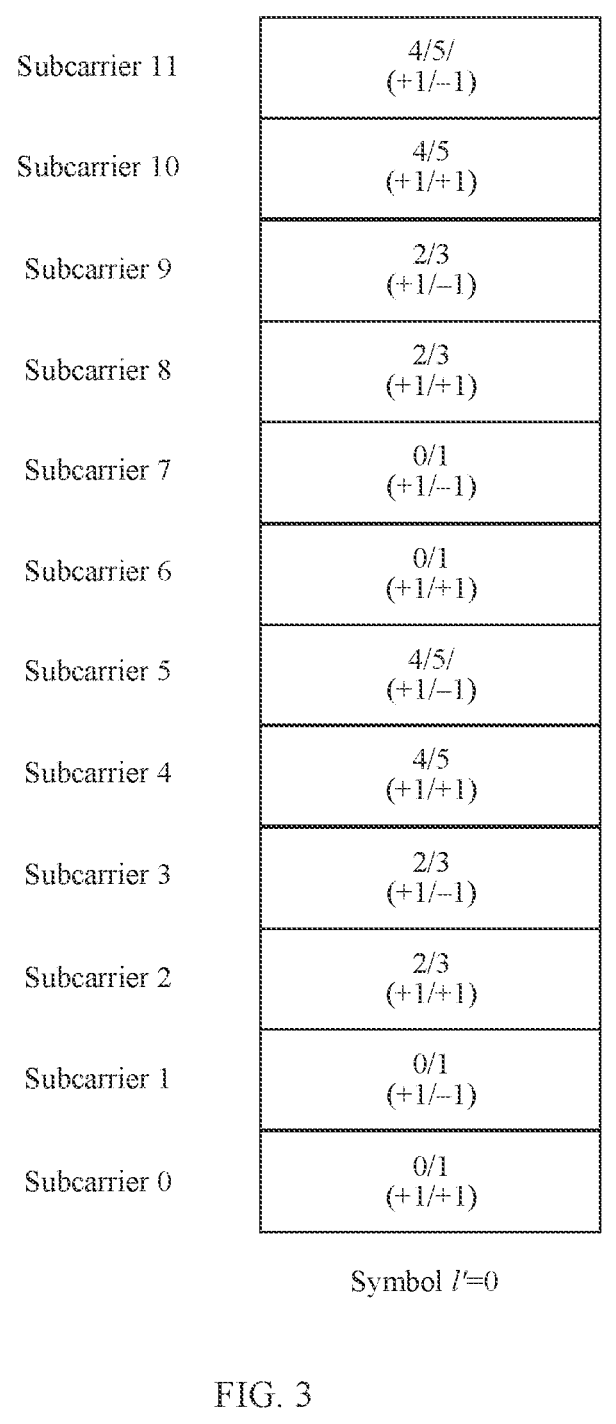

| Subcarrier | Symbol $l'$=0 |
| --- | --- |
| Subcarrier 11 | 4/5/ (+1/−1) |
| Subcarrier 10 | 4/5 (+1/+1) |
| Subcarrier 9 | 2/3 (+1/−1) |
| Subcarrier 8 | 2/3 (+1/+1) |
| Subcarrier 7 | 0/1 (+1/−1) |
| Subcarrier 6 | 0/1 (+1/+1) |
| Subcarrier 5 | 4/5/ (+1/−1) |
| Subcarrier 4 | 4/5 (+1/+1) |
| Subcarrier 3 | 2/3 (+1/−1) |
| Subcarrier 2 | 2/3 (+1/+1) |
| Subcarrier 1 | 0/1 (+1/−1) |
| Subcarrier 0 | 0/1 (+1/+1) |

FIG. 3

| | Symbol $l'$=0 | Symbol $l'$=1 |
|---|---|---|
| Subcarrier 11 | 4/5/10/11 (+1/−1/+1/−1) | 4/5/10/11 (+1/−1/−1/+1) |
| Subcarrier 10 | 4/5/10/11 (+1/+1/+1/+1) | 4/5/10/11 (+1/+1/−1/−1) |
| Subcarrier 9 | 2/3/8/9 (+1/−1/+1/−1) | 2/3/8/9 (+1/−1/−1/+1) |
| Subcarrier 8 | 2/3/8/9 (+1/+1/+1/+1) | 2/3/8/9 (+1/+1/−1/−1) |
| Subcarrier 7 | 0/1/6/7 (+1/−1/+1/−1) | 0/1/6/7 (+1/−1/−1/+1) |
| Subcarrier 6 | 0/1/6/7 (+1/+1/+1/+1) | 0/1/6/7 (+1/+1/−1/−1) |
| Subcarrier 5 | 4/5/10/11 (+1/−1/+1/−1) | 4/5/10/11 (+1/−1/−1/+1) |
| Subcarrier 4 | 4/5/10/11 (+1/+1/+1/+1) | 4/5/10/11 (+1/+1/−1/−1) |
| Subcarrier 3 | 2/3/8/9 (+1/−1/+1/−1) | 2/3/8/9 (+1/−1/−1/+1) |
| Subcarrier 2 | 2/3/8/9 (+1/+1/+1/+1) | 2/3/8/9 (+1/+1/−1/−1) |
| Subcarrier 1 | 0/1/6/7 (+1/−1/+1/−1) | 0/1/6/7 (+1/−1/−1/+1) |
| Subcarrier 0 | 0/1/6/7 (+1/+1/+1/+1) | 0/1/6/7 (+1/+1/−1/−1) |

FIG. 4

| | Symbol $l'$=0 | Symbol $l'$=1 |
|---|---|---|
| Subcarrier 11 | 2/3/6/7 (+1/−1/+1/−1) | 2/3/6/7 (+1/−1/−1/ +1) |
| Subcarrier 10 | 0/1/4/5 (+1/−1/+1/−1) | 0/1/4/5 (+1/−1/−1/ +1) |
| Subcarrier 9 | 2/3/6/7 (+1/+1/+1/+1) | 2/3/6/7 (+1/+1/−1/−1) |
| Subcarrier 8 | 0/1/4/5 (+1/+1/+1/+1) | 0/1/4/5 (+1/+1/−1/−1) |
| Subcarrier 7 | 2/3/6/7/10/11/14/15 (+1/−1/+1/−1/−1/+1/−1/+1) | 2/3/6/7/10/11/14/15 (+1/−1/−1/+1/−1/+1/+1/−1) |
| Subcarrier 6 | 0/1/4/5/8/9/12/13 (+1/−1/+1/−1/−1/+1/−1/+1) | 0/1/4/5/8/9/12/13 (+1/+1/−1/−1/−1/−1/+1/+1) |
| Subcarrier 5 | 2/3/6/7/10/11/14/15 (+1/+1/+1/+1/−1/−1/−1/−1) | 2/3/6/7/10/11/14/15 (+1/+1/−1/−1/−1/−1/+1/+1) |
| Subcarrier 4 | 0/1/4/5/8/9/12/13 (+1/+1/+1/+1/−1/−1/−1/−1) | 0/1/4/5/8/9/12/13 (+1/+1/−1/−1/−1/−1/+1/+1) |
| Subcarrier 3 | 2/3/6/7/10/11/14/15 (+1/−1/+1/−1/+1/−1/+1/−1) | 2/3/6/7/10/11/14/15 (+1/−1/−1/+1/+1/−1/−1/+1) |
| Subcarrier 2 | 0/1/4/5/8/9/12/13 (+1/−1/+1/−1/+1/−1/+1/−1) | 0/1/4/5/8/9/12/13 (+1/−1/−1/+1/+1/−1/−1/+1) |
| Subcarrier 1 | 2/3/6/7/10/11/14/15 (+1/+1/+1/+1/+1/+1/+1/+1) | 2/3/6/7/10/11/14/15 (+1/+1/−1/−1/+1/+1/−1/−1) |
| Subcarrier 0 | 0/1/4/5/8/9/12/13 (+1/+1/+1/+1/+1/+1/+1/+1) | 0/1/4/5/8/9/12/13 (+1/+1/−1/−1/+1/+1/−1/−1) |

Second resource sub-block (Subcarriers 8–11)

First resource sub-block (Subcarriers 0–7)

FIG. 10

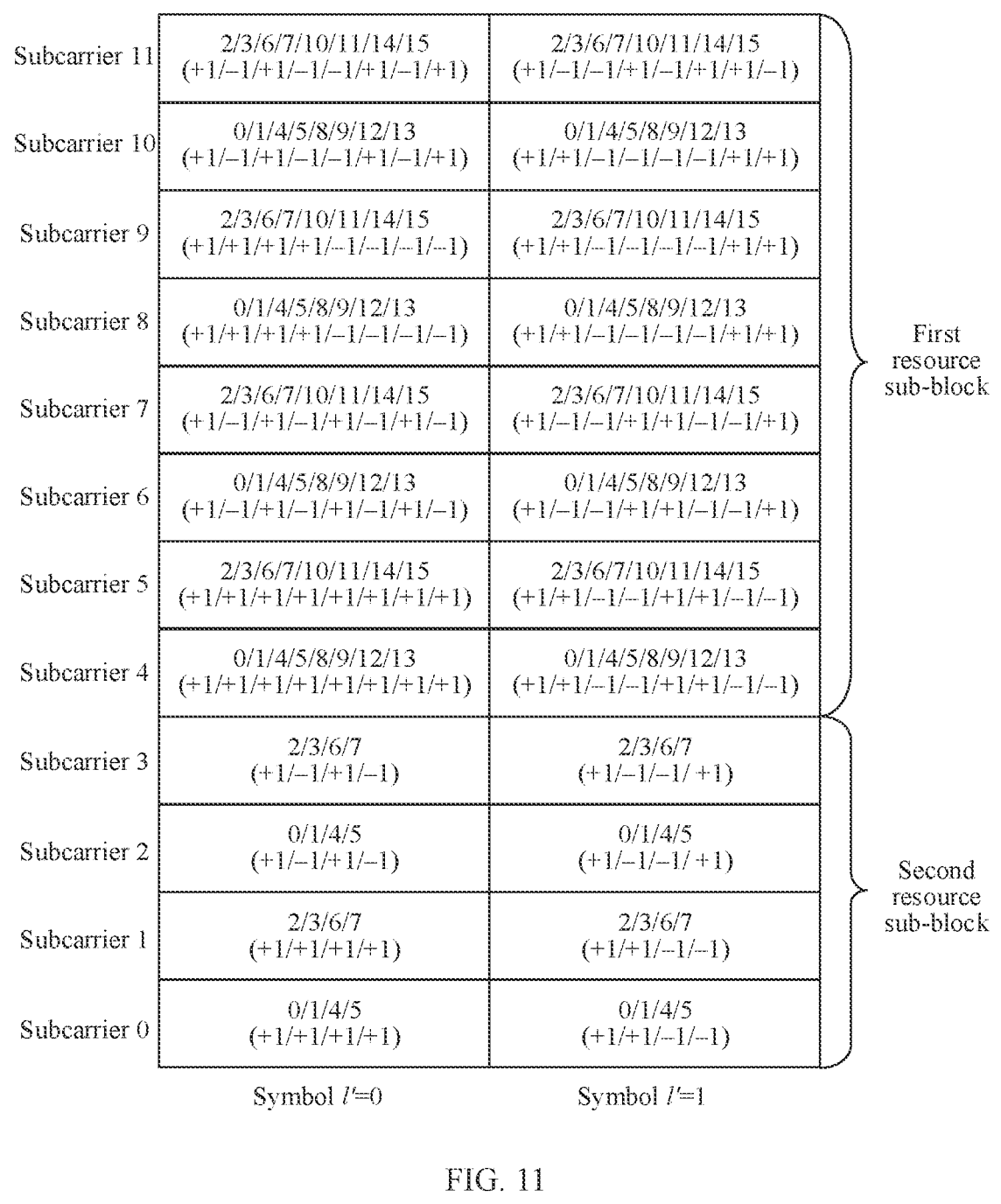

| | Symbol $l'$=0 | Symbol $l'$=1 | |
|---|---|---|---|
| Subcarrier 11 | 2/3/6/7/10/11/14/15 (+1/−1/+1/−1/−1/+1/−1/+1) | 2/3/6/7/10/11/14/15 (+1/−1/−1/+1/−1/+1/+1/−1) | First resource sub-block |
| Subcarrier 10 | 0/1/4/5/8/9/12/13 (+1/−1/+1/−1/−1/+1/−1/+1) | 0/1/4/5/8/9/12/13 (+1/+1/−1/−1/−1/−1/+1/+1) | |
| Subcarrier 9 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 8 | 0/1/4/5/8/9/12/13 (+1/+1/+1/+1/−1/−1/−1/−1) | 0/1/4/5/8/9/12/13 (+1/+1/−1/−1/−1/−1/+1/+1) | |
| Subcarrier 7 | 2/3/6/7/10/11/14/15 (+1/−1/+1/−1/+1/−1/+1/−1) | 2/3/6/7/10/11/14/15 (+1/−1/−1/+1/+1/−1/−1/+1) | |
| Subcarrier 6 | 0/1/4/5/8/9/12/13 (+1/−1/+1/−1/+1/−1/+1/−1) | 0/1/4/5/8/9/12/13 (+1/−1/−1/+1/+1/−1/−1/+1) | |
| Subcarrier 5 | 2/3/6/7/10/11/14/15 (+1/+1/+1/+1/+1/+1/+1/+1) | 2/3/6/7/10/11/14/15 (+1/+1/−1/−1/+1/+1/−1/−1) | |
| Subcarrier 4 | 0/1/4/5/8/9/12/13 (+1/+1/+1/+1/+1/+1/+1/+1) | 0/1/4/5/8/9/12/13 (+1/+1/−1/−1/+1/+1/−1/−1) | |
| Subcarrier 3 | 2/3/6/7 (+1/−1/+1/−1) | 2/3/6/7 (+1/−1/−1/ +1) | Second resource sub-block |
| Subcarrier 2 | 0/1/4/5 (+1/−1/+1/−1) | 0/1/4/5 (+1/−1/−1/ +1) | |
| Subcarrier 1 | 2/3/6/7 (+1/+1/+1/+1) | 2/3/6/7 (+1/+1/−1/−1) | |
| Subcarrier 0 | 0/1/4/5 (+1/+1/+1/+1) | 0/1/4/5 (+1/+1/−1/−1) | |

FIG. 11

| | Symbol $l'$=0 | Symbol $l'$=1 | |
|---|---|---|---|
| Subcarrier 11 | 2/3/6/7/10/11/14/15 (+1/−1/+1/−1/−1/+1/−1/+1) | 2/3/6/7/10/11/14/15 (+1/−1/−1/+1/−1/+1/+1/−1) | First resource sub-block |
| Subcarrier 10 | 0/1/4/5/8/9/12/13 (+1/−1/+1/−1/−1/+1/−1/+1) | 0/1/4/5/8/9/12/13 (+1/+1/−1/−1/−1/−1/+1/+1) | |
| Subcarrier 9 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 8 | 0/1/4/5/8/9/12/13 (+1/+1/+1/+1/−1/−1/−1/−1) | 0/1/4/5/8/9/12/13 (+1/+1/−1/−1/−1/−1/+1/+1) | |
| Subcarrier 7 | 2/3/6/7 (+1/−1/+1/−1) | 2/3/6/7 (+1/−1/−1/ +1) | Second resource sub-block |
| Subcarrier 6 | 0/1/4/5 (+1/−1/+1/−1) | 0/1/4/5 (+1/−1/−1/ +1) | |
| Subcarrier 5 | 2/3/6/7 (+1/+1/+1/+1) | 2/3/6/7 (+1/+1/−1/−1) | |
| Subcarrier 4 | 0/1/4/5 (+1/+1/+1/+1) | 0/1/4/5 (+1/+1/−1/−1) | |
| Subcarrier 3 | 2/3/6/7/10/11/14/15 (+1/−1/+1/−1/+1/−1/+1/−1) | 2/3/6/7/10/11/14/15 (+1/−1/−1/+1/+1/−1/−1/+1) | First resource sub-block |
| Subcarrier 2 | 0/1/4/5/8/9/12/13 (+1/−1/+1/−1/+1/−1/+1/−1) | 0/1/4/5/8/9/12/13 (+1/−1/−1/+1/+1/−1/−1/+1) | |
| Subcarrier 1 | 2/3/6/7/10/11/14/15 (+1/+1/+1/+1/+1/+1/+1/+1) | 2/3/6/7/10/11/14/15 (+1/+1/−1/−1/+1/+1/−1/−1) | |
| Subcarrier 0 | 0/1/4/5/8/9/12/13 (+1/+1/+1/+1/+1/+1/+1/+1) | 0/1/4/5/8/9/12/13 (+1/+1/−1/−1/+1/+1/−1/−1) | |

CONT. FROM FIG. 13A

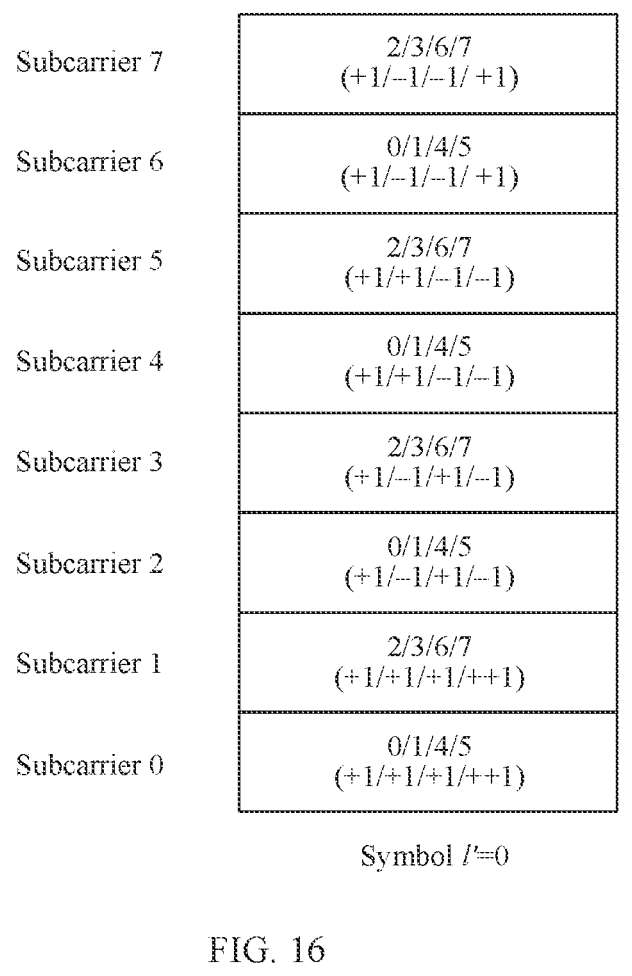

| | Symbol $l'$=0 |
|---|---|
| Subcarrier 7 | 2/3/6/7 (+1/−1/−1/ +1) |
| Subcarrier 6 | 0/1/4/5 (+1/−1/−1/ +1) |
| Subcarrier 5 | 2/3/6/7 (+1/+1/−1/−1) |
| Subcarrier 4 | 0/1/4/5 (+1/+1/−1/−1) |
| Subcarrier 3 | 2/3/6/7 (+1/−1/+1/−1) |
| Subcarrier 2 | 0/1/4/5 (+1/−1/+1/−1) |
| Subcarrier 1 | 2/3/6/7 (+1/+1/+1/++1) |
| Subcarrier 0 | 0/1/4/5 (+1/+1/+1/++1) |

FIG. 16

| | | | |
|---|---|---|---|
| Subcarrier 23 | 2/3/6/7/10/11/14/15 (+1/−1/+1/−1/−1/+1/−1/+1) | 2/3/6/7/10/11/14/15 (+1/−1/−1/+1/−1/+1/+1/−1) | Fifth resource sub-block |
| Subcarrier 22 | 0/1/4/5/8/9/12/13 (+1/−1/+1/−1/−1/+1/−1/+1) | 0/1/4/5/8/9/12/13 (+1/−1/−1/+1/−1/+1/+1/−1) | |
| Subcarrier 21 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 26 | 0/1/4/5/8/9/12/13 (+1/+1/+1/+1/−1/−1/−1/−1) | 0/1/4/5/8/9/12/13 (+1/+1/−1/−1/−1/−1/+1/+1) | |
| Subcarrier 19 | 2/3/6/7/10/11/14/15 (+1/−1/+1/−1/−1/+1/−1/+1) | 2/3/6/7/10/11/14/15 (+1/−1/−1/+1/−1/+1/+1/−1) | Fourth resource sub-block |
| Subcarrier 18 | 0/1/4/5/8/9/12/13 (+1/−1/+1/−1/−1/+1/−1/+1) | 0/1/4/5/8/9/12/13 (+1/−1/−1/+1/−1/+1/+1/−1) | |
| Subcarrier 17 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 16 | 0/1/4/5/8/9/12/13 (+1/+1/+1/+1/−1/−1/−1/−1) | 0/1/4/5/8/9/12/13 (+1/+1/−1/−1/−1/−1/+1/+1) | |
| Subcarrier 15 | 2/3/6/7/10/11/14/15 (+1/−1/+1/−1/+1/−1/+1/−1) | 2/3/6/7/10/11/14/15 (+1/−1/−1/+1/+1/−1/−1/+1) | |
| Subcarrier 14 | 0/1/4/5/8/9/12/13 (+1/−1/+1/−1/+1/−1/+1/−1) | 0/1/4/5/8/9/12/13 (+1/−1/−1/+1/+1/−1/−1/+1) | |
| Subcarrier 13 | 2/3/6/7/10/11/14/15 (+1/+1/+1/+1/+1/+1/+1/+1) | 2/3/6/7/10/11/14/15 (+1/+1/−1/−1/+1/+1/−1/−1) | |
| Subcarrier 12 | 0/1/4/5/8/9/12/13 (+1/+1/+1/+1/+1/+1/+1/+1) | 0/1/4/5/8/9/12/13 (+1/+1/−1/−1/+1/+1/−1/−1) | |

CONT. FROM
FIG. 17A

| | Symbol $l'$=0 | Symbol $l'$=1 | |
|---|---|---|---|
| Subcarrier 11 | 2/3/6/7/10/11/14/15 (+1/−1/+1/−1/+1/−1/+1/−1) | 2/3/6/7/10/11/14/15 (+1/−1/−1/+1/+1/−1/−1/+1) | Fifth resource sub-block |
| Subcarrier 10 | 0/1/4/5/8/9/12/13 (+1/−1/+1/−1/+1/−1/+1/−1) | 0/1/4/5/8/9/12/13 (+1/−1/−1/+1/+1/−1/−1/+1) | Fifth resource sub-block |
| Subcarrier 9 | 2/3/6/7/10/11/14/15 (+1/+1/+1/+1/+1/+1/+1/+1) | 2/3/6/7/10/11/14/15 (+1/+1/−1/−1/+1/+1/−1/−1) | Fifth resource sub-block |
| Subcarrier 8 | 0/1/4/5/8/9/12/13 (+1/+1/+1/+1/+1/+1/+1/+1) | 0/1/4/5/8/9/12/13 (+1/+1/−1/−1/+1/+1/−1/−1) | Fifth resource sub-block |
| Subcarrier 7 | 2/3/6/7/10/11/14/15 (+1/−1/+1/−1/−1/+1/−1/+1) | 2/3/6/7/10/11/14/15 (+1/−1/−1/+1/−1/+1/+1/−1) | Third resource sub-block |
| Subcarrier 6 | 0/1/4/5/8/9/12/13 (+1/−1/+1/−1/−1/+1/−1/+1) | 0/1/4/5/8/9/12/13 (+1/−1/−1/+1/−1/+1/+1/−1) | Third resource sub-block |
| Subcarrier 5 | 2/3/6/7/10/11/14/15 (+1/+1/+1/+1/−1/−1/−1/−1) | 2/3/6/7/10/11/14/15 (+1/+1/−1/−1/−1/−1/+1/+1) | Third resource sub-block |
| Subcarrier 4 | 0/1/4/5/8/9/12/13 (+1/+1/+1/+1/−1/−1/−1/−1) | 0/1/4/5/8/9/12/13 (+1/+1/−1/−1/−1/−1/+1/+1) | Third resource sub-block |
| Subcarrier 3 | 2/3/6/7/10/11/14/15 (+1/−1/+1/−1/+1/−1/+1/−1) | 2/3/6/7/10/11/14/15 (+1/−1/−1/+1/+1/−1/−1/+1) | Third resource sub-block |
| Subcarrier 2 | 0/1/4/5/8/9/12/13 (+1/−1/+1/−1/+1/−1/+1/−1) | 0/1/4/5/8/9/12/13 (+1/−1/−1/+1/+1/−1/−1/+1) | Third resource sub-block |
| Subcarrier 1 | 2/3/6/7/10/11/14/15 (+1/+1/+1/+1/+1/+1/+1/+1) | 2/3/6/7/10/11/14/15 (+1/+1/−1/−1/+1/+1/−1/−1) | Third resource sub-block |
| Subcarrier 0 | 0/1/4/5/8/9/12/13 (+1/+1/+1/+1/+1/+1/+1/+1) | 0/1/4/5/8/9/12/13 (+1/+1/−1/−1/+1/+1/−1/−1) | Third resource sub-block |

FIG. 17B

| | | | |
|---|---|---|---|
| Subcarrier 23 | 2/3/6/7/10/11/14/15 (+1/−1/+1/−1/−1/+1/−1/+1) | 2/3/6/7/10/11/14/15 (+1/−1/−1/+1/−1/+1/+1/−1) | Fourth resource sub-block |
| Subcarrier 22 | 0/1/4/5/8/9/12/13 (+1/−1/+1/−1/−1/+1/−1/+1) | 0/1/4/5/8/9/12/13 (+1/−1/−1/+1/−1/+1/+1/−1) | |
| Subcarrier 21 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 26 | 0/1/4/5/8/9/12/13 (+1/+1/+1/+1/−1/−1/−1/−1) | 0/1/4/5/8/9/12/13 (+1/+1/−1/−1/−1/−1/+1/+1) | |
| Subcarrier 19 | 2/3/6/7/10/11/14/15 (+1/−1/+1/−1/+1/−1/+1/−1) | 2/3/6/7/10/11/14/15 (+1/−1/−1/+1/+1/−1/−1/+1) | |
| Subcarrier 18 | 0/1/4/5/8/9/12/13 (+1/−1/+1/−1/+1/−1/+1/−1) | 0/1/4/5/8/9/12/13 (+1/−1/−1/+1/+1/−1/−1/+1) | |
| Subcarrier 17 | 2/3/6/7/10/11/14/15 (+1/+1/+1/+1/+1/+1/+1/+1) | 2/3/6/7/10/11/14/15 (+1/+1/−1/−1/+1/+1/−1/−1) | |
| Subcarrier 16 | 0/1/4/5/8/9/12/13 (+1/+1/+1/+1/+1/+1/+1/+1) | 0/1/4/5/8/9/12/13 (+1/+1/−1/−1/+1/+1/−1/−1) | |
| Subcarrier 15 | 2/3/6/7/10/11/14/15 (+1/−1/+1/−1/−1/+1/−1/+1) | 2/3/6/7/10/11/14/15 (+1/−1/−1/+1/−1/+1/+1/−1) | Fifth resource sub-block |
| Subcarrier 14 | 0/1/4/5/8/9/12/13 (+1/−1/+1/−1/−1/+1/−1/+1) | 0/1/4/5/8/9/12/13 (+1/−1/−1/+1/−1/+1/+1/−1) | |
| Subcarrier 13 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 12 | 0/1/4/5/8/9/12/13 (+1/+1/+1/+1/−1/−1/−1/−1) | 0/1/4/5/8/9/12/13 (+1/+1/−1/−1/−1/−1/+1/+1) | |

CONT. FROM FIG. 18A

| | Symbol $l'$=0 | Symbol $l'$=1 | |
|---|---|---|---|
| Subcarrier 11 | 2/3/6/7/10/11/14/15 (+1/−1/+1/−1/−1/+1/−1/+1) | 2/3/6/7/10/11/14/15 (+1/−1/−1/+1/−1/+1/+1/−1) | Third resource sub-block |
| Subcarrier 10 | 0/1/4/5/8/9/12/13 (+1/−1/+1/−1/−1/+1/−1/+1) | 0/1/4/5/8/9/12/13 (+1/−1/−1/+1/−1/+1/+1/−1) | |
| Subcarrier 9 | 2/3/6/7/10/11/14/15 (+1/+1/+1/+1/−1/−1/−1/−1) | 2/3/6/7/10/11/14/15 (+1/+1/−1/−1/−1/−1/+1/+1) | |
| Subcarrier 8 | 0/1/4/5/8/9/12/13 (+1/+1/+1/+1/−1/−1/−1/−1) | 0/1/4/5/8/9/12/13 (+1/+1/−1/−1/−1/−1/+1/+1) | |
| Subcarrier 7 | 2/3/6/7/10/11/14/15 (+1/−1/+1/−1/+1/−1/+1/−1) | 2/3/6/7/10/11/14/15 (+1/−1/−1/+1/+1/−1/−1/+1) | |
| Subcarrier 6 | 0/1/4/5/8/9/12/13 (+1/−1/+1/−1/+1/−1/+1/−1) | 0/1/4/5/8/9/12/13 (+1/−1/−1/+1/+1/−1/−1/+1) | |
| Subcarrier 5 | 2/3/6/7/10/11/14/15 (+1/+1/+1/+1/+1/+1/+1/+1) | 2/3/6/7/10/11/14/15 (+1/+1/−1/−1/+1/+1/−1/−1) | |
| Subcarrier 4 | 0/1/4/5/8/9/12/13 (+1/+1/+1/+1/+1/+1/+1/+1) | 0/1/4/5/8/9/12/13 (+1/+1/−1/−1/+1/+1/−1/−1) | |
| Subcarrier 3 | 2/3/6/7/10/11/14/15 (+1/−1/+1/−1/+1/−1/+1/−1) | 2/3/6/7/10/11/14/15 (+1/−1/−1/+1/+1/−1/−1/+1) | Fifth resource sub-block |
| Subcarrier 2 | 0/1/4/5/8/9/12/13 (+1/−1/+1/−1/+1/−1/+1/−1) | 0/1/4/5/8/9/12/13 (+1/−1/−1/+1/+1/−1/−1/+1) | |
| Subcarrier 1 | 2/3/6/7/10/11/14/15 (+1/+1/+1/+1/+1/+1/+1/+1) | 2/3/6/7/10/11/14/15 (+1/+1/−1/−1/+1/+1/−1/−1) | |
| Subcarrier 0 | 0/1/4/5/8/9/12/13 (+1/+1/+1/+1/+1/+1/+1/+1) | 0/1/4/5/8/9/12/13 (+1/+1/−1/−1/+1/+1/−1/−1) | |

FIG. 18B

| | | | |
|---|---|---|---|
| Subcarrier 23 | 2/3/6/7/10/11/14/15 (+1/–1/+1/–1/–1/+1/–1/+1) | 2/3/6/7/10/11/14/15 (+1/–1/–1/+1/–1/+1/+1/–1) | Fourth resource sub-block |
| Subcarrier 22 | 0/1/4/5/8/9/12/13 (+1/–1/+1/–1/–1/+1/–1/+1) | 0/1/4/5/8/9/12/13 (+1/–1/–1/+1/–1/+1/+1/–1) | |
| Subcarrier 21 | 2/3/6/7/10/11/14/15 (+1/+1/+1/+1/–1/–1/–1/–1) | 2/3/6/7/10/11/14/15 (+1/+1/–1/–1/–1/–1/+1/+1) | |
| Subcarrier 26 | 0/1/4/5/8/9/12/13 (+1/+1/+1/+1/–1/–1/–1/–1) | 0/1/4/5/8/9/12/13 (+1/+1/–1/–1/–1/–1/+1/+1) | |
| Subcarrier 19 | 2/3/6/7/10/11/14/15 (+1/–1/+1/–1/+1/–1/+1/–1) | 2/3/6/7/10/11/14/15 (+1/–1/–1/+1/+1/–1/–1/+1) | |
| Subcarrier 18 | 0/1/4/5/8/9/12/13 (+1/–1/+1/–1/+1/–1/+1/–1) | 0/1/4/5/8/9/12/13 (+1/–1/–1/+1/+1/–1/–1/+1) | |
| Subcarrier 17 | 2/3/6/7/10/11/14/15 (+1/+1/+1/+1/+1/+1/+1/+1) | 2/3/6/7/10/11/14/15 (+1/+1/–1/–1/+1/+1/–1/–1) | |
| Subcarrier 16 | 0/1/4/5/8/9/12/13 (+1/+1/+1/+1/+1/+1/+1/+1) | 0/1/4/5/8/9/12/13 (+1/+1/–1/–1/+1/+1/–1/–1) | |
| Subcarrier 15 | 2/3/6/7/10/11/14/15 (+1/–1/+1/–1/–1/+1/–1/+1) | 2/3/6/7/10/11/14/15 (+1/–1/–1/+1/–1/+1/+1/–1) | Fifth resource sub-block |
| Subcarrier 14 | 0/1/4/5/8/9/12/13 (+1/–1/+1/–1/–1/+1/–1/+1) | 0/1/4/5/8/9/12/13 (+1/–1/–1/+1/–1/+1/+1/–1) | |
| Subcarrier 13 | 2/3/6/7/10/11/14/15 (+1/+1/+1/+1/–1/–1/–1/–1) | 2/3/6/7/10/11/14/15 (+1/+1/–1/–1/–1/–1/+1/+1) | |
| Subcarrier 12 | 0/1/4/5/8/9/12/13 (+1/+1/+1/+1/–1/–1/–1/–1) | 0/1/4/5/8/9/12/13 (+1/+1/–1/–1/–1/–1/+1/+1) | |
| Subcarrier 11 | 2/3/6/7/10/11/14/15 (+1/–1/+1/–1/+1/–1/+1/–1) | 2/3/6/7/10/11/14/15 (+1/–1/–1/+1/+1/–1/–1/+1) | |
| Subcarrier 10 | 0/1/4/5/8/9/12/13 (+1/–1/+1/–1/+1/–1/+1/–1) | 0/1/4/5/8/9/12/13 (+1/–1/–1/+1/+1/–1/–1/+1) | |
| Subcarrier 9 | 2/3/6/7/10/11/14/15 (+1/+1/+1/+1/+1/+1/+1/+1) | 2/3/6/7/10/11/14/15 (+1/+1/–1/–1/+1/+1/–1/–1) | |
| Subcarrier 8 | 0/1/4/5/8/9/12/13 (+1/+1/+1/+1/+1/+1/+1/+1) | 0/1/4/5/8/9/12/13 (+1/+1/–1/–1/+1/+1/–1/–1) | |

CONT. FROM FIG. 19A

| | Symbol $l'$=0 | Symbol $l'$=1 |
|---|---|---|
| Subcarrier 7 | 2/3/6/7/10/11/14/15 (+1/−1/+1/−1/−1/+1/−1/+1) | 2/3/6/7/10/11/14/15 (+1/−1/−1/+1/−1/+1/+1/−1) |
| Subcarrier 6 | 0/1/4/5/8/9/12/13 (+1/−1/+1/−1/−1/+1/−1/+1) | 0/1/4/5/8/9/12/13 (+1/−1/−1/+1/−1/+1/+1/−1) |
| Subcarrier 5 | 2/3/6/7/10/11/14/15 (+1/+1/+1/+1/−1/−1/−1/−1) | 2/3/6/7/10/11/14/15 (+1/+1/−1/−1/−1/−1/+1/+1) |
| Subcarrier 4 | 0/1/4/5/8/9/12/13 (+1/+1/+1/+1/−1/−1/−1/−1) | 0/1/4/5/8/9/12/13 (+1/+1/−1/−1/−1/−1/+1/+1) |
| Subcarrier 3 | 2/3/6/7/10/11/14/15 (+1/−1/+1/−1/+1/−1/+1/−1) | 2/3/6/7/10/11/14/15 (+1/−1/−1/+1/+1/−1/−1/+1) |
| Subcarrier 2 | 0/1/4/5/8/9/12/13 (+1/−1/+1/−1/+1/−1/+1/−1) | 0/1/4/5/8/9/12/13 (+1/−1/−1/+1/+1/−1/−1/+1) |
| Subcarrier 1 | 2/3/6/7/10/11/14/15 (+1/+1/+1/+1/+1/+1/+1/+1) | 2/3/6/7/10/11/14/15 (+1/+1/−1/−1/+1/+1/−1/−1) |
| Subcarrier 0 | 0/1/4/5/8/9/12/13 (+1/+1/+1/+1/+1/+1/+1/+1) | 0/1/4/5/8/9/12/13 (+1/+1/−1/−1/+1/+1/−1/−1) |

Third resource sub-block

FIG. 19B

| | Symbol $l'$=0 | Symbol $l'$=1 |
|---|---|---|
| Subcarrier 7 | 2/3/6/7/10/11/14/15 (+1/–1/+1/–1/–1/+1/–1/+1) | 2/3/6/7/10/11/14/15 (+1/–1/–1/+1/–1/+1/+1/–1) |
| Subcarrier 6 | 0/1/4/5/8/9/12/13 (+1/–1/+1/–1/–1/+1/–1/+1) | 0/1/4/5/8/9/12/13 (+1/–1/–1/+1/–1/+1/+1/–1) |
| Subcarrier 5 | 2/3/6/7/10/11/14/15 (+1/+1/+1/+1/–1/–1/–1/–1) | 2/3/6/7/10/11/14/15 (+1/+1/–1/–1/–1/–1/+1/+1) |
| Subcarrier 4 | 0/1/4/5/8/9/12/13 (+1/+1/+1/+1/–1/–1/–1/–1) | 0/1/4/5/8/9/12/13 (+1/+1/–1/–1/–1/–1/+1/+1) |
| Subcarrier 3 | 2/3/6/7/10/11/14/15 (+1/–1/+1/–1/+1/–1/+1/–1) | 2/3/6/7/10/11/14/15 (+1/–1/–1/+1/+1/–1/–1/+1) |
| Subcarrier 2 | 0/1/4/5/8/9/12/13 (+1/–1/+1/–1/+1/–1/+1/–1) | 0/1/4/5/8/9/12/13 (+1/–1/–1/+1/+1/–1/–1/+1) |
| Subcarrier 1 | 2/3/6/7/10/11/14/15 (+1/+1/+1/+1/+1/+1/+1/+1) | 2/3/6/7/10/11/14/15 (+1/+1/–1/–1/+1/+1/–1/–1) |
| Subcarrier 0 | 0/1/4/5/8/9/12/13 (+1/+1/+1/+1/+1/+1/+1/+1) | 0/1/4/5/8/9/12/13 (+1/+1/–1/–1/+1/+1/–1/–1) |

FIG. 20

| | Symbol $l'$=0 | Symbol $l'$=1 | |
|---|---|---|---|
| Subcarrier 11 | 2/3/6/7 (+1/−1/+1/−1) | 2/3/6/7 (+1/−1/−1/ +1) | Seventh resource sub-block |
| Subcarrier 10 | 0/1/4/5 (+1/−1/+1/−1) | 0/1/4/5 (+1/−1/−1/ +1) | |
| Subcarrier 9 | 2/3/6/7 (+1/+1/+1/++1) | 2/3/6/7 (+1/+1/−1/−1) | |
| Subcarrier 8 | 0/1/4/5 (+1/+1/+1/++1) | 0/1/4/5 (+1/+1/−1/−1) | |
| Subcarrier 7 | 8/9/10/11 (+1/−1/+1/−1) | 8/9/10/11 (+1/−1/−1/ +1) | Eighth resource sub-block |
| Subcarrier 6 | 8/9/10/11 (+1/−1/+1/−1) | 8/9/10/11 (+1/−1/−1/ +1) | |
| Subcarrier 5 | 8/9/10/11 (+1/+1/+1/++1) | 8/9/10/11 (+1/+1/−1/−1) | |
| Subcarrier 4 | 8/9/10/11 (+1/+1/+1/++1) | 8/9/10/11 (+1/+1/−1/−1) | |
| Subcarrier 3 | 2/3/6/7 (+1/−1/+1/−1) | 2/3/6/7 (+1/−1/−1/ +1) | Sixth resource sub-block |
| Subcarrier 2 | 0/1/4/5 (+1/−1/+1/−1) | 0/1/4/5 (+1/−1/−1/ +1) | |
| Subcarrier 1 | 2/3/6/7 (+1/+1/+1/++1) | 2/3/6/7 (+1/+1/−1/−1) | |
| Subcarrier 0 | 0/1/4/5 (+1/+1/+1/++1) | 0/1/4/5 (+1/+1/−1/−1) | |

FIG. 22

REFERENCE SIGNAL MAPPING METHOD AND APPARATUS

CROSS-REFERENCE TO RELATED APPLICATIONS

This application is a continuation of International Application No. PCT/CN2021/122424, filed on Sep. 30, 2021, which claims priority to Chinese Patent Application No. 202011069338.4, filed on Sep. 30, 2020. The disclosures of the aforementioned applications are hereby incorporated by reference in their entireties.

TECHNICAL FIELD

This application relates to the communication field, and in particular, to a reference signal mapping method and an apparatus.

BACKGROUND

A demodulation reference signal (DMRS) is used for channel estimation of a data channel or a control channel, to demodulate data. A precoding technology is one of key technologies of a multiple-input multiple-output (MIMO) system. A signal that needs to be sent may be processed by using the precoding technology, to improve system performance. In a new radio (NR) protocol, a reference signal is mapped to a corresponding time-frequency resource according to a preset mapping rule, and the signal is transmitted through a corresponding port. Contiguous resource blocks (RBs) using same precoding are referred to as a precoding resource block group (PRG).

Currently, a time-frequency mapping rule of the DMRS is usually defined based on a quantity of resource elements (REs) corresponding to one RB, one OFDM symbol, or two consecutive OFDM symbols. To be specific, in an existing solution, the reference signal is mapped by using a fixed quantity of time-frequency resources. A quantity of supported antennas and a quantity of transmitted streams that can be paired are small, and flexibility is poor. In addition, with subsequent evolution of MIMO, a smaller precoding frequency domain granularity needs to be supported. For example, contiguous frequency-domain bandwidth using same precoding may be reduced to one RB or 0.5 RB. Currently, the time-frequency resource mapping rule of the DMRS cannot match with a precoding frequency domain granularity less than one RB. Consequently, an existing DMRS cannot meet a communication requirement of larger-scale MIMO.

SUMMARY

Embodiments of this application provide a reference signal mapping method and an apparatus, to resolve a problem that a quantity of supported ports and a quantity of supported transmitted streams are excessively small due to an existing reference signal mapping rule in which a fixed quantity of time-frequency resources are used for mapping, so that performance and a system capacity of a MIMO system are improved.

To achieve the foregoing objectives, the following technical solutions are used in this application.

According to a first aspect, a reference signal mapping method is provided. The reference signal mapping method includes: determining a time-frequency unit based on a size of a first frequency domain unit; determining a resource group in the time-frequency unit based on a first port index, where the resource group is corresponding to one port group, and the port group includes one or more ports; and mapping a reference signal corresponding to the first port index to a first resource group in the time-frequency unit if a port corresponding to the first port index belongs to a first port group, and sending the reference signal; or mapping a reference signal corresponding to the first port index to a second resource group in the time-frequency unit if a port corresponding to the first port index belongs to a second port group, and sending the reference signal, where a port index included in the second port group is completely different from a port index included in the first port group; and for the same time-frequency unit, the first resource group and the second resource group meet one of the following conditions: a time-frequency resource included in the second resource group is a non-empty subset of a time-frequency resource included in the first resource group; or a time-frequency resource included in the second resource group does not overlap with a time-frequency resource included in the first resource group. Both the size of the first frequency domain unit and the first port index may be preset or configured.

Based on the reference signal mapping method, an existing port group and a new port group: the first port group and the second port group, are determined based on the preset or configured size of the first frequency domain unit and the preset first port index, so that corresponding reference signals are separately mapped to corresponding resource groups. In this way, it can be ensured that a quantity of supported ports is increased under same time-frequency resource overheads, to resolve a problem that the quantity of supported ports and a quantity of supported transmitted streams are excessively small in an existing reference signal mapping rule, so that a quantity of transmitted streams that can be paired between users is increased, and performance of a MIMO system is improved. In addition, one of the first port group and the second port group may be a port group specified in an existing protocol, namely, the existing port group, and the other may be a newly introduced port group, namely, the new port group. In addition, a time-frequency resource mapping rule corresponding to a port included in the existing port group is the same as a time-frequency resource mapping rule specified in the existing protocol, so that the reference signal mapping method in the first aspect is compatible with the existing technology.

The first frequency domain unit may be preset frequency domain bandwidth. For example, the first frequency domain unit may be one RB or a set of a plurality of RBs, may be one subcarrier, a set of a plurality of subcarriers, or a set of a plurality of REs, or may be one frequency domain sub-band or a set of a plurality of frequency domain sub-bands. In an implementation, the first frequency domain unit may be one PRG. The size of the first frequency domain unit may be preset, or may be determined by a network device through configuration.

The following separately describes various reference signal mapping solutions provided in this application for different PRG sizes.

In a possible design scheme, the size of the first frequency domain unit is one resource block RB, and the time-frequency unit includes one RB in frequency domain and one time unit in time domain. The first port group includes four ports, and the second port group includes four ports. The first resource group includes a first resource sub-block and a second resource sub-block, and the second resource group includes the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a first cover code element corresponding to the reference signal to a first RE set included in the first resource group, and sending the product. The first cover code element is an element in a first orthogonal cover code sequence, each port in the first port group is corresponding to one first orthogonal cover code sequence, and each port in the first port group is corresponding to one first cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and a second cover code element corresponding to the reference signal to a second RE set included in the second resource group, and sending the product. The second cover code element is an element in a second orthogonal cover code sequence, each port in the second port group is corresponding to one second orthogonal cover code sequence, and each port in the second port group is corresponding to one second cover code element on each RE in the second RE set included in the second resource group. In this case, in a scenario in which the size of the first frequency domain unit is one resource block RB, a port group is extended in some time-frequency resources in the time-frequency unit, that is, the second port group is added, so that the quantity of supported transmitted streams is increased and the performance of the MIMO system is improved under the same time-frequency resource overheads.

Further, the first cover code element may be a product of a first frequency domain cover code sub-element and a first time domain cover code sub-element, and the second cover code element may be a product of a second frequency domain cover code sub-element and a second time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, a length of the first orthogonal cover code sequence is 2, and a length of the second orthogonal cover code sequence is 4. In this case, the second orthogonal cover code sequence whose length is 4 is used in some time-frequency resources in the time-frequency unit, so that orthogonal ports can be expanded in the time-frequency resources.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the first resource sub-block and subcarriers corresponding to the second resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(6n+k');\ k = 12n + 2k' + \Delta;$$

$$k' = \begin{cases} 0, 1, 2, 3, 4, 5 & p \epsilon [1000, 1003] \\ 0, 1, 2, 3 & p \epsilon [1004, 1007] \end{cases};\ l = \bar{l} + l';$$

$$n = 0, 1, \ldots;\text{ and } l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and Δ corresponding to port p may be determined based on Table 1 shown in the following method embodiment. Table 1 is a correspondence table 1 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n+k');\ k = 12n + 2k' + \Delta;$$

$$k' = \begin{cases} 0, 1, 2, 3, 4, 5 & p\epsilon[1000, 1003] \\ 0, 1, 4, 5 & p\epsilon[1004, 1007] \end{cases};\ l = \bar{l} + l';$$

$$n = 0, 1, \ldots;\ \text{and}\ l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$ $w_t(l')$, and Δ corresponding to port p may be determined based on Table 2 shown in the following method embodiment. Table 2 is a correspondence table 2 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,2,3,4,5 & p \in [1000, 1003] \\ 2,3,4,5 & p \in [1004, 1007] \end{cases};$$

$$l = \bar{l} + l';$$

$$n = 0, 1, \ldots;\ \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f$ (k') is a frequency domain cover code sub-element corresponding to the $k^{th}$ subcarrier, m=6n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and a corresponding to port p may be determined based on Table 3 shown in the following method embodiment. Table 3 is a correspondence table 3 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In another possible design scheme, the size of the first frequency domain unit may be one resource block RB, and the time-frequency unit may include one RB in frequency domain and two consecutive time units in time domain. The first port group may include eight ports, and the second port group may include eight ports. The first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a third cover code element corresponding to the reference signal to a first RE set included in the first resource group, and sending the product. The third cover code element is an element in a third orthogonal cover code sequence, each port in the first port group is corresponding to one third orthogonal cover code sequence, and each port in the first port group is corresponding to one third cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and a fourth cover code element corresponding to the reference signal to a second RE set included in the second resource group, and sending the product. The fourth cover code element is an element in a fourth orthogonal cover code sequence, each port in the second port group is corresponding to one fourth orthogonal cover code sequence, and each port in the first port group is corresponding to one fourth cover code element on each RE in the second RE set included in the second resource group. In this case, in a scenario in which the size of the first frequency domain unit is one resource block RB, a port group may be extended in some time-frequency resources in the time-frequency unit, that is, the second port group is added, so that the quantity of supported transmitted streams is increased and the performance of the MIMO system is improved under the same time-frequency resource overheads.

Further, the third cover code element may be a product of a third frequency domain cover code sub-element and a third time domain cover code sub-element, and the fourth cover code element may be a product of a fourth frequency domain cover code sub-element and a fourth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, a length of the third orthogonal cover code sequence may be 4, and a length of the fourth orthogonal cover code sequence may be 8. In this case, the fourth orthogonal cover code sequence whose length is 8 is used in some time-frequency resources in the time-frequency unit, so that orthogonal ports can be expanded in the time-frequency resources.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the first resource sub-block and subcarriers corresponding to the second resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1007] \\ 0,1,2,3 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$ $w_t(l')$, and Δ corresponding to port p may be determined based on Table 4 shown in the following method embodiment. Table 4 is a correspondence table 4 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1007] \\ 0,1,4,5 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and Δ corresponding to port p may be determined based on Table 5 shown in the following method embodiment. Table 5 is a correspondence table 5 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1007] \\ 2,3,4,5 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and Δ corresponding to port p may be determined based on Table 6 shown in the following method embodiment. Table 6 is a correspondence table 6 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In still another possible design scheme, the size of the first frequency domain unit may be N times of a resource block RB group, where N is a positive integer, one RB group may include two contiguous RBs, and the time-frequency unit may include one RB group in frequency domain and one time unit in time domain. The first port group may include four ports, and the second port group may include four ports. The first resource group and the second resource group each include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a fifth cover code element corresponding to the reference signal to a first RE set included in the first resource group, and sending the product. The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and a sixth cover code element corresponding to the reference signal to a second RE set included in the second resource group, and sending the product. The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group. In this case, in a scenario in which the size of the first frequency domain unit is N times of the resource block RB group, for example, the size of the first frequency domain unit is two RBs or four RBs, a port group may be extended in all time-frequency resources in the time-frequency unit, that is, the second port group is added, so that the quantity of supported transmitted streams is increased and the performance of the MIMO system is improved under the same time-frequency resource overheads.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the fifth orthogonal cover code sequence and a length of the sixth orthogonal cover code sequence may be 4. In this case, an orthogonal cover code sequence whose length is 4, for example, the fifth orthogonal cover code sequence and the sixth orthogonal cover code sequence, is used in the time-frequency resources in the time-frequency unit, so that orthogonal ports can be expanded in the time-frequency resources.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain. In this case, subcarriers corresponding to the first resource group and subcarriers corresponding to the second resource group can be quickly determined by setting subcarriers corresponding to the third resource sub-block, subcarriers corresponding to the fourth resource sub-block, and subcarriers corresponding to the fifth resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$ and $\Delta$ corresponding to port p may be determined based on Table 7 shown in the following method embodiment. Table 7 is a correspondence table 7 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and $\Delta$ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and $\Delta$ corresponding to port p may be determined based on Table 8 shown in the following method embodiment. Table 8 is a correspondence table 8 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and $\Delta$ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$ $w_t(l')$, and $\Delta$ corresponding to port p may be determined based on Table 9 shown in the following method embodiment. Table 9 is a correspondence table 9 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain. In this case, in a scenario in which the size of the first frequency domain unit may be N times of the resource block RB group, a time-frequency unit including eight contiguous subcarriers in frequency domain may be used to carry a corresponding reference signal.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. In this case, in a scenario in which the size of the first frequency domain unit is N times of the resource block RB group, for example, the size of the first frequency domain unit is two RBs or four RBs, reference sequence elements that are in the DMRS and that are corresponding to different ports can be quickly mapped to corresponding time-frequency resources according to the foregoing rule, so that ports can be expanded in the time-frequency unit.

Optionally, values of $w_f(k')$, $w_t(l')$, and Δ corresponding to port p may be determined based on Table 10 shown in the following method embodiment. Table 10 is a correspondence table 10 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In yet another possible design scheme, the size of the first frequency domain unit may be N times of a resource block RB group, where N is a positive integer, one RB group may include two contiguous RBs, and the time-frequency unit may include one RB group in frequency domain and two consecutive time units in time domain. The first port group may include eight ports, and the second port group may include eight ports. The first resource group and the second resource group each may include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a seventh cover code element corresponding to the reference signal to a first RE set included in the first resource group, and sending the product. The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and an eighth cover code element corresponding to the reference signal to a second RE set included in the second resource group, and sending the product. The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group. In this case, in a scenario in which the size of the first frequency domain unit is N times of the resource block RB group, for example, the size of the first frequency domain unit is two RBs or four RBs, a port group may be extended in the time-frequency unit, that is, the second port group is added, so that the quantity of supported transmitted streams is increased and the performance of the MIMO system is improved under the same time-frequency resource overheads.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the seventh orthogonal cover code sequence and a length of the eighth orthogonal cover code sequence may be 8. In this case, an orthogonal cover code sequence whose length is 8, for example, the seventh orthogonal cover code sequence and the eighth orthogonal cover code sequence, is used in the time-frequency resources in the time-frequency unit, so that orthogonal ports can be expanded in the time-frequency resources.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain. In this case, subcarriers corresponding to the first resource group and subcarriers corresponding to the second resource group can be quickly determined by setting subcarriers corresponding to the third resource sub-block, subcarriers corresponding to the fourth resource sub-block, and subcarriers corresponding to the fifth resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and Δ corresponding to port p may be determined based on Table 11 shown in the following method embodiment. Table 11 is a correspondence table 11 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and $\Delta$ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$ and $\Delta$ corresponding to port p may be determined based on Table 12 shown in the following method embodiment. Table 12 is a correspondence table 12 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n+k');$$
$$k = 24n + 2k' + \Delta;$$
$$k' = 0, 1, 2, 3, 4, 5, 6, 7, 8, 9, 10, 11 \quad p \in [1000, 1015];$$
$$l = \bar{l} + l';$$
$$n = 0, 1, \ldots; \text{and}$$
$$l' = 0, 1,$$

where p is the first port index, $\mu$ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and $\Delta$ is a subcarrier offset factor. In this case, in a scenario in which the size of the first frequency domain unit is one resource block RB, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and $\Delta$ corresponding to port p may be determined based on Table 13 shown in the following method embodiment. Table 13 is a correspondence table 13 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain. In this case, in a scenario in which the size of the first frequency domain unit may be N times of the resource block RB group, a time-frequency unit including eight contiguous subcarriers in frequency domain may be used to carry a corresponding reference signal.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$
$$k = 8n + 2k' + \Delta;$$
$$k' = 0, 1, 2, 3 \quad p \in [1000, 1015];$$
$$l = \bar{l} + l';$$
$$n = 0, 1, \ldots; \text{and}$$
$$l' = 0, 1,$$

where p is the first port index, $\mu$ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and $\Delta$ is a subcarrier offset factor. In this case, in a scenario in which the size of the first frequency domain unit is N times of the resource block RB group, for example, the size of the first frequency domain unit is two RBs or four RBs, reference sequence elements that are in the DMRS and that are corresponding to different ports can be quickly mapped to corresponding time-frequency resources according to the foregoing rule, so that ports are expanded in the time-frequency unit.

Optionally, values of $w_f(k')$, $w_t(l')$, and $\Delta$ corresponding to port p may be determined based on Table 14 shown in the following method embodiment. Table 14 is a correspondence table 14 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In still yet another possible design scheme, the size of the first frequency domain unit may be six subcarriers, the time-frequency unit may include one RB in frequency domain and one time unit in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a ninth cover code element corresponding to the reference signal to a first RE set included in the first resource group, and sending the product. The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and a tenth cover code element corresponding to the reference signal to a second RE set included in the second resource group, and sending the product. The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group. In this case, in a scenario in which the size of the first frequency domain unit is six subcarriers, some time-frequency resources that are in the time-frequency unit and that carry existing ports may be used to carry a new port group, that is, the second port group is added, so that the quantity of supported transmitted streams is increased and the performance of the MIMO system is improved under the same time-frequency resource overheads.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the ninth orthogonal cover code sequence and a length of the tenth orthogonal cover code sequence are 2. In this case, orthogonality of ports in the time-frequency unit can be ensured by using the ninth orthogonal cover code sequence and the tenth orthogonal cover code sequence whose lengths are both 2 in the time-frequency unit.

Optionally, the time-frequency unit may include subcarrier 0 to subcarrier 11 in frequency domain. Alternatively, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the sixth resource sub-block, subcarriers corresponding to the seventh resource sub-block, and subcarriers corresponding to the eighth resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,4,5 & p \in [1000, 1003] \\ 2,3 & p \in [1004, 1005] \end{cases};$$

$$l = \bar{l} + l';$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is six subcarriers, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and Δ corresponding to port p may be determined based on Table 15 shown in the following method embodiment. Table 15 is a correspondence table 15 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In a further possible design scheme, the size of the first frequency domain unit may be six subcarriers, the time-frequency unit may include one RB in frequency domain and two consecutive time units in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and an eleventh cover code element corresponding to the reference signal to a first RE set included in the first resource group, and sending the product. The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group. The mapping a reference signal corresponding to the first port index to a second resource group in the time-frequency unit if a port corresponding to the first port index belongs to a second port group, and sending the reference signal may include: mapping a product of a reference sequence element corresponding to the reference signal and a twelfth cover code element corresponding to the reference signal to a second RE set included in the second resource group, and sending the product. The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group. In this case, in a scenario in which the size of the first frequency domain unit is six subcarriers, some time-frequency resources that are in the time-frequency unit and that carry existing ports may be used to carry a new port group, that is, the second port group is added, so that the quantity of supported transmitted streams is increased and the performance of the MIMO system is improved under the same time-frequency resource overheads.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the eleventh orthogonal cover code sequence and a length of the twelfth orthogonal cover code sequence may be 4. In this case, orthogonality of ports in the time-frequency unit can be ensured by using the eleventh orthogonal cover code sequence and the twelfth orthogonal cover code sequence whose lengths are both 4 in the time-frequency unit.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the sixth resource sub-block, subcarriers corresponding to the seventh resource sub-block, and subcarriers corresponding to the eighth resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,4,5 & p \in [1000, 1007] \\ 2,3 & p \in [1008, 1011] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is six subcarriers, reference sequence elements that are in the DMRS and that are corresponding to different ports can be quickly mapped to corresponding time-frequency resources according to the foregoing rule, so that ports can be expanded in some time-frequency resources in the time-frequency unit.

Optionally, values of $w_f(k')$, $w_t(l')$, and Δ corresponding to port p may be determined based on Table 16 shown in the following method embodiment. Table 16 is a correspondence table 16 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In a still further possible design scheme, the size of the first frequency domain unit is greater than or equal to one resource block RB, and the time-frequency unit may include one RB in frequency domain and one time unit in time domain. The first port group may include six ports, and the second port group may include six ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a thirteenth cover code element corresponding to the reference signal to a first RE set included in the first resource group, and sending the product. The thirteenth cover code element is an element in a thirteenth orthogonal cover code sequence, each port in the first port group is corresponding to one thirteenth orthogonal cover code sequence, and each port in the first port group is corresponding to one thirteenth cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and a fourteenth cover code element corresponding to the reference signal to a second RE set included in the second resource group, and sending the product. The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group. In this case, in a scenario in which the size of the first frequency domain unit is greater than or equal to one resource block RB, a port group may be extended in all time-frequency resources in the time-frequency unit, that is, the second port group is added, so that the quantity of supported transmitted streams is increased and the performance of the MIMO system is improved under the same time-frequency resource overheads.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the thirteenth orthogonal cover code sequence and a length of the fourteenth orthogonal cover code sequence are 4. In this case, an orthogonal cover code sequence whose length is 4, for example, the thirteenth orthogonal cover code sequence and the fourteenth orthogonal cover code sequence, is used in the time-frequency resources in the time-frequency unit, so that orthogonal ports can be expanded in the time-frequency resources.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain. In this case, subcarriers corresponding to the first resource group and subcarriers corresponding to the second resource group can be quickly determined by setting subcarriers corresponding to the ninth resource sub-block, subcarriers corresponding to the tenth resource sub-block, and subcarriers corresponding to the eleventh resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 12n + k' + 4 \cdot \left\lfloor \frac{k'}{2} \right\rfloor + \Delta;$$

$$k' = 0,1,2,3;$$

$$n = 0, 1, \ldots ; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. In this case, in a scenario in which the size of the first frequency domain unit is greater than or equal to one RB, reference sequence elements that are in the DMRS and that are corresponding to different ports can be quickly mapped to corresponding time-frequency resources according to the foregoing rule, so that ports can be expanded in the time-frequency unit.

Optionally, values of $w_f(k')$, $w_t(l')$, and Δ corresponding to port p may be determined based on Table 17 shown in the following method embodiment. Table 17 is a correspondence table 17 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

In a yet further possible design scheme, the size of the first frequency domain unit is greater than or equal to one resource block RB, and the time-frequency unit may include one RB in frequency domain and two consecutive time units in time domain. The first port group may include 12 ports, and the second port group may include 12 ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the mapping a reference signal corresponding to the first port index to a first resource group in the time-frequency unit if a port corresponding to the first port index belongs to a first port group, and sending the reference signal may include: mapping a product of a reference sequence element corresponding to the reference signal and a fifteenth cover code element corresponding to the reference signal to a first RE set included in the first resource group, and sending the product. The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group. Alternatively, the mapping a reference signal corresponding to the first port index to a second resource group in the time-frequency unit if a port corresponding to the first port index belongs to a second port group, and sending the reference signal may include: mapping a product of a reference sequence element corresponding to the reference signal and a sixteenth cover code element corresponding to the reference signal to a second RE set included in the second resource group, and sending the product. The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group. In this case, in a scenario in which the size of the first frequency domain unit is greater than or equal to one resource block RB, a port group may be extended in all time-frequency resources in the time-frequency unit, that is, the second port group is added, so that the quantity of supported transmitted streams is increased and the performance of the MIMO system is improved under the same time-frequency resource overheads.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the fifteenth orthogonal cover code sequence and a length of the sixteenth orthogonal cover code sequence may be 8. In this case, an orthogonal cover code sequence whose length is 8, for example, the fifteenth orthogonal cover code sequence and the sixteenth orthogonal cover code sequence, is used in the time-frequency resources in the time-frequency unit, so that orthogonal ports can be expanded in the time-frequency resources.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain. In this case, subcarriers corresponding to the first resource group and subcarriers corresponding to the second resource group can be quickly determined by setting subcarriers corresponding to the ninth resource sub-block, subcarriers corresponding to the tenth resource sub-block, and subcarriers corresponding to the eleventh resource sub-block, so that reference signal mapping efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 12n + k' + 4 \cdot \left\lfloor \frac{k'}{2} \right\rfloor + \Delta;$$

$$k' = 0,1,2,3;$$

$$n = 0, 1, \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. In this case, in a scenario in which the size of the first frequency domain unit is greater than or equal to one RB, reference sequence elements that are in the DMRS and that are corresponding to different ports can be quickly mapped to corresponding time-frequency resources according to the foregoing rule, so that ports can be expanded in the time-frequency unit.

Optionally, values of $w_f(k')$, $w_t(l')$, and Δ corresponding to port p may be determined based on Table 18 shown in the following method embodiment. Table 18 is a correspondence table 18 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS mapping efficiency.

According to a second aspect, a reference signal mapping method is provided. The reference signal mapping method includes: determining a time-frequency unit based on a size of a first frequency domain unit; determining a resource group in the time-frequency unit based on a first port index, where the resource group is corresponding to one port group, and the port group includes one or more ports; and performing channel estimation based on a reference signal that is corresponding to the first port index and that is in a first resource group in the time-frequency unit if a port corresponding to the first port index belongs to a first port group: or performing channel estimation based on a reference signal that is corresponding to the first port index and that is in a second resource group in the time-frequency unit if a port corresponding to the first port index belongs to a second port group, where a port index included in the second port group is completely different from a port index included in the first port group: and for the same time-frequency unit, the first resource group and the second resource group meet one of the following conditions: a time-frequency resource included in the second resource group is a non-empty subset of a time-frequency resource included in the first resource group: or a time-frequency resource included in the second resource group does not overlap with a time-frequency resource included in the first resource group. Both the size of the first frequency domain unit and the first port index may be preset or configured.

Based on the reference signal mapping method, an existing port group and a new port group, namely, the first port group and the second port group, may be determined based on the preset or configured size of the first frequency domain unit and the preset first port index, so that channel estimation is separately performed based on a reference signal that is corresponding to the first port index and that is in a corresponding resource group. In this way, it can be ensured that a quantity of supported ports is increased under same time-frequency resource overheads, to resolve a problem that the quantity of supported ports and a quantity of supported transmitted streams are excessively small in an existing reference signal mapping rule, so that a quantity of transmitted streams that can be paired between users is increased, and performance of a MIMO system is improved.

In addition, one of the first port group and the second port group may be a port group specified in an existing protocol, namely, the existing port group, and the other may be a newly introduced port group, namely, the new port group. In addition, a time-frequency resource mapping rule corresponding to a port included in the existing port group is the same as a time-frequency resource mapping rule specified in the existing protocol, so that the reference signal mapping method in the first aspect is compatible with the existing technology.

The following separately describes various reference signal mapping solutions provided in this application for different PRG sizes.

In a possible design scheme, the size of the first frequency domain unit is one resource block RB, and the time-frequency unit includes one RB in frequency domain and one time unit in time domain. The first port group includes four ports, and the second port group includes four ports. The first resource group includes a first resource sub-block and a second resource sub-block, and the second resource group includes the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and a first cover code element corresponding to the reference signal. The first cover code element is an element in a first orthogonal cover code sequence, each port in the first port group is corresponding to one first orthogonal cover code sequence, and each port in the first port group is corresponding to one first cover code element on each RE in the first RE set included in the first resource group. Alternatively, the performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a second cover code element corresponding to the reference signal. The second cover code element is an element in a second orthogonal cover code sequence, each port in the second port group is corresponding to one second orthogonal cover code sequence, and each port in the second port group is corresponding to one second cover code element on each RE in the second RE set included in the second resource group. In this case, in a scenario in which the size of the first frequency domain unit is one resource block RB, a port group is extended in some time-frequency resources in the time-frequency unit, that is, the second port group is added, so that the quantity of supported transmitted streams is increased and the performance of the MIMO system is improved under the same time-frequency resource overheads.

Further, the first cover code element may be a product of a first frequency domain cover code sub-element and a first time domain cover code sub-element, and the second cover code element may be a product of a second frequency domain cover code sub-element and a second time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, a length of the first orthogonal cover code sequence is 2, and a length of the second orthogonal cover code sequence is 4. In this case, the second orthogonal cover code sequence whose length is 4 is used in some time-frequency resources in the time-frequency unit, so that orthogonal ports can be expanded in the time-frequency resources.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the first resource sub-block and subcarriers corresponding to the second resource sub-block, so that reference signal detection efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1003] \\ 0,1,2,3 & p \in [1004, 1007] \end{cases};$$

$$l = \bar{l} + l';$$

-continued $$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 1 shown in the following method embodiment. Table 1 is a correspondence table 1 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1003] \\ 0,1,4,5 & p \in [1004, 1007] \end{cases};$$

$$l = \bar{l} + l';$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$ and Δ corresponding to port p may be determined based on Table 2 shown in the following method embodiment. Table 2 is a correspondence table 2 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In still another possible design scheme, the reference signal is a demodulation reference signal DMRS, and the time unit is an orthogonal frequency division multiplexing OFDM symbol. Correspondingly, for port p, an mm reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1003] \\ 2,3,4,5 & p \in [1004, 1007] \end{cases};$$

$$l = \bar{l} + l';$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 3 shown in the following method embodiment. Table 3 is a correspondence table 3 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In another possible design scheme, the size of the first frequency domain unit may be one resource block RB, and the time-frequency unit may include one RB in frequency domain and two consecutive time units in time domain. The first port group may include eight ports, and the second port group may include eight ports. The first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and a third cover code element corresponding to the reference signal. The third cover code element is an element in a third orthogonal cover code sequence, each port in the first port group is corresponding to one third orthogonal cover code sequence, and each port in the first port group is corresponding to one third cover code element on each RE in the first RE set included in the first resource group. Alternatively, the performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a fourth cover code element corresponding to the reference signal. The fourth cover code element is an element in a fourth orthogonal cover code sequence, each port in the second port group is corresponding to one fourth orthogonal cover code sequence, and each port in the first port group is corresponding to one fourth cover code element on each RE in the second RE set included in the second resource group. In this case, in a scenario in which the size of the first frequency domain unit is one resource block RB, a port group may be extended in some time-frequency resources in the time-frequency unit, that is, the second port group is added, so that the quantity of supported transmitted streams is increased and the performance of the MIMO system is improved under the same time-frequency resource overheads.

Further, the third cover code element may be a product of a third frequency domain cover code sub-element and a third time domain cover code sub-element, and the fourth cover code element may be a product of a fourth frequency domain cover code sub-element and a fourth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, a length of the third orthogonal cover code sequence may be 4, and a length of the fourth orthogonal cover code sequence may be 8. In this case, the fourth orthogonal cover code sequence whose length is 8 is used in some time-frequency resources in the time-frequency unit, so that orthogonal ports can be expanded in the time-frequency resources.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the first resource sub-block and subcarriers corresponding to the second resource sub-block, so that reference signal detection efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,2,3,4,5 & p \in [1000, 1007] \\ 0,1,2,3 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the lth OFDM symbol, $w_f(k')$ is a frequency domain cover code sub-element corresponding to the kth subcarrier, m=6n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 4 shown in the following method embodiment. Table 4 is a correspondence table 4 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In another possible design scheme, the reference signal may be a demodulation reference signal DMRS, and the time unit may be an orthogonal frequency division multiplexing OFDM symbol. For port p, an mth reference sequence element r(m) in the DMRS is determined, according to the following rule, in an RE whose index is $(k, l)_{p,\mu}$. The RE whose index is $(k, l)_{p,\mu}$ corresponding to a lth OFDM symbol in one slot in time domain and corresponding to a kth subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,2,3,4,5 & p \in [1000, 1007] \\ 0,1,4,5 & p \in [1008, 1015] \end{cases};$$

-continued $$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the lth OFDM symbol, $w_f(k')$ is a frequency domain cover code sub-element corresponding to the kth subcarrier, m=6n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$ $w_t(l')$, and Δ corresponding to port p may be determined based on Table 5 shown in the following method embodiment. Table 5 is a correspondence table 5 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In still another possible design scheme, the reference signal may be a demodulation reference signal DMRS, and the time unit may be an orthogonal frequency division multiplexing OFDM symbol. Correspondingly, for port p, an mth reference sequence element r(m) in the DMRS is determined, according to the following rule, in an RE whose index is $(k, l)_{p,\mu}$. The RE whose index is $(k, l)_{p,\mu}$ corresponding to a lth OFDM symbol in one slot in time domain and corresponding to a kth subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,2,3,4,5 & p \in [1000, 1007] \\ 2,3,4,5 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 6 shown in the following method embodiment. Table 6 is a correspondence table 6 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In still another possible design scheme, the size of the first frequency domain unit may be N times of a resource block RB group, where N is a positive integer, one RB group may include two contiguous RBs, and the time-frequency unit may include one RB group in frequency domain and one time unit in time domain. The first port group may include four ports, and the second port group may include four ports. The first resource group and the second resource group each include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the performing channel estimation based on a reference signal that is corresponding to the first port index and that is in a first resource group in the time-frequency unit if a port corresponding to the first port index belongs to a first port group may include, determining a reference sequence element corresponding to the reference signal in a first RE set included in the first resource group, and performing channel estimation based on the reference sequence element corresponding to the reference signal and a fifth cover code element corresponding to the reference signal. The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. Alternatively, the performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a sixth cover code element corresponding to the reference signal. The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group. In this case, in a scenario in which the size of the first frequency domain unit is N times of the resource block RB group, for example, the size of the first frequency domain unit is two RBs or four RBs, a port group may be extended in all time-frequency resources in the time-frequency unit, that is, the second port group is added, so that the quantity of supported transmitted streams is increased and the performance of the MIMO system is improved under the same time-frequency resource overheads.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, both a length of the fifth orthogonal cover code sequence and a length of the sixth orthogonal cover code sequence may be 4. In this case, an orthogonal cover code sequence whose length is 4, for example, the fifth orthogonal cover code sequence and the sixth orthogonal cover code sequence, is used in the time-frequency resources in the time-frequency unit, so that orthogonal ports can be expanded in the time-frequency resources.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain. In this case, subcarriers corresponding to the first resource group and subcarriers corresponding to the second resource group can be quickly determined by setting subcarriers corresponding to the third resource sub-block, subcarriers corresponding to the fourth resource sub-block, and subcarriers corresponding to the fifth resource sub-block, so that reference signal detection efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 1, 2, 3, 4, 5, 6, 7, 8, 9, 10, 11 \quad p \in [1000, 1007];$$

$$l = \bar{l} + l';$$

$$n = 0, 1, \ldots \text{ ; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 7 shown in the following method embodiment. Table 7 is a correspondence table 7 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{ ; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 8 shown in the following method embodiment. Table 8 is a correspondence table 8 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12 + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 9 shown in the following method embodiment. Table 9 is a correspondence table 9 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain. In this case, in a scenario in which the size of the first frequency domain unit may be N times of the resource block RB group, a time-frequency unit including eight contiguous subcarriers in frequency domain may be used to carry a corresponding reference signal.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1007];$$

$$l = \bar{l} + l';$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and a is a subcarrier offset factor. In this case, in a scenario in which the size of the first frequency domain unit is N times of the resource block RB group, for example, the size of the first frequency domain unit is two RBs or four RBs, reference sequence elements that are in the DMRS and that are corresponding to different ports can be quickly mapped to corresponding time-frequency resources according to the foregoing rule, so that ports can be expanded in the time-frequency unit.

Optionally, values of $w_f(k')$, $w_t(l')$, and Δ corresponding to port p may be determined based on Table 10 shown in the following method embodiment. Table 10 is a correspondence table 10 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In yet another possible design scheme, the size of the first frequency domain unit may be N times of a resource block RB group, where N is a positive integer, one RB group may include two contiguous RBs, and the time-frequency unit may include one RB group in frequency domain and two consecutive time units in time domain. The first port group may include eight ports, and the second port group may include eight ports. The first resource group and the second resource group each may include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and a seventh cover code element corresponding to the reference signal. The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. Alternatively, the performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and an eighth cover code element corresponding to the reference signal. The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group. In this case, in a scenario in which the size of the first frequency domain unit is N times of the resource block RB group, for example, the size of the first frequency domain unit is two RBs or four RBs, a port group may be extended in the time-frequency unit, that is, the second port group is added, so that the quantity of supported transmitted streams is increased and the performance of the MIMO system is improved under the same time-frequency resource overheads.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, both a length of the seventh orthogonal cover code sequence and a length of the eighth orthogonal cover code sequence may be 8. In this case, an orthogonal cover code sequence whose length is 8, for example, the seventh orthogonal cover code sequence and the eighth orthogonal cover code sequence, is used in the time-frequency resources in the time-frequency unit, so that orthogonal ports can be expanded in the time-frequency resources.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain. In this case, subcarriers corresponding to the first resource group and subcarriers corresponding to the second resource group can be quickly determined by setting subcarriers corresponding to the third resource sub-block, subcarriers corresponding to the fourth resource sub-block, and subcarriers corresponding to the fifth resource sub-block, so that reference signal detection efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12+k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 11 shown in the following method embodiment. Table 11 is a correspondence table 11 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12 + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 12 shown in the following method embodiment. Table 12 is a correspondence table 12 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12 + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. In this case, in a scenario in which the size of the first frequency domain unit is one resource block RB, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and $\Delta$ corresponding to port p may be determined based on Table 13 shown in the following method embodiment. Table 13 is a correspondence table 13 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain. In this case, in a scenario in which the size of the first frequency domain unit may be N times of the resource block RB group, a time-frequency unit including eight contiguous subcarriers in frequency domain may be used to carry a corresponding reference signal.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3 \;\; p \in [1000, 1015];$$

$$l = \bar{l} + l';$$

$$n = 0, 1, \ldots \text{ ; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. In this case, in a scenario in which the size of the first frequency domain unit is N times of the resource block RB group, for example, the size of the first frequency domain unit is two RBs or four RBs, reference sequence elements that are in the DMRS and that are corresponding to different ports can be quickly mapped to corresponding time-frequency resources according to the foregoing rule, so that ports are expanded in the time-frequency unit.

Optionally, values of $w_f(k')$, $w_t(l')$, and $\Delta$ corresponding to port p may be determined based on Table 14 shown in the following method embodiment. Table 14 is a correspondence table 14 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In a still yet another design scheme, the size of the first frequency domain unit may be six subcarriers, the time-frequency unit may include one RB in frequency domain and one time unit in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and a ninth cover code element corresponding to the reference signal. The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group. Alternatively, the performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a tenth cover code element corresponding to the reference signal. The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group. In this case, in a scenario in which the size of the first frequency domain unit is six subcarriers, some time-frequency resources that are in the time-frequency unit and that carry existing ports may be used to carry a new port group, that is, the second port group is added, so that the quantity of supported transmitted streams is increased and the performance of the MIMO system is improved under the same time-frequency resource overheads.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, both a length of the ninth orthogonal cover code sequence and a length of the tenth orthogonal cover code sequence are 2. In this case, orthogonality of ports in the time-frequency unit can be ensured by using the ninth orthogonal cover code sequence and the tenth orthogonal cover code sequence whose lengths are both 2 in the time-frequency unit.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the sixth resource sub-block, subcarriers corresponding to the seventh resource sub-block, and subcarriers corresponding to the eighth resource sub-block, so that reference signal detection efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,4,5 & p \in [1000, 1003] \\ 2,3 & p \in [1004, 1005] \end{cases};$$

$$l = \bar{l} + l';$$

-continued $$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is six subcarriers, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 15 shown in the following method embodiment. Table 15 is a correspondence table 15 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In a further possible design scheme, the size of the first frequency domain unit may be six subcarriers, the time-frequency unit may include one RB in frequency domain and two consecutive time units in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and an eleventh cover code element corresponding to the reference signal. The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group. Alternatively, the performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a twelfth cover code element corresponding to the reference signal. The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group. In this case, in a scenario in which the size of the first frequency domain unit is six subcarriers, some time-frequency resources that are in the time-frequency unit and that carry existing ports may be used to carry a new port group, that is, the second port group is added, so that the quantity of supported transmitted streams is increased and the performance of the MIMO system is improved under the same time-frequency resource overheads.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, both a length of the eleventh orthogonal cover code sequence and a length of the twelfth orthogonal cover code sequence may be 4. In this case, orthogonality of ports in the time-frequency unit can be ensured by using the eleventh orthogonal cover code sequence and the twelfth orthogonal cover code sequence whose lengths are both 4 in the time-frequency unit.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain. In this case, subcarriers corresponding to the first resource group and subcarriers corresponding to the second resource group can be quickly determined by setting subcarriers corresponding to the sixth resource sub-block, subcarriers corresponding to the seventh resource sub-block, and subcarriers corresponding to the eighth resource sub-block, so that reference signal mapping detection is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule $$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 4, 5 & p \in [1000, 1007] \\ 2, 3 & p \in [1008, 1011] \end{cases};$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. In this case, in a scenario in which the size of the first frequency domain unit is six subcarriers, corresponding reference sequence elements in DMRSs may be quickly determined according to the foregoing rule and on time-frequency resources corresponding to different ports, so that ports can be expanded in some time-frequency resources in the time-frequency unit.

Optionally, values of $w_f(k')$, $w_t(l')$, and Δ corresponding to port p may be determined based on Table 16 shown in the following method embodiment. Table 16 is a correspondence table 16 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In a still further possible design scheme, the size of the first frequency domain unit is greater than or equal to one resource block RB, and the time-frequency unit may include one RB in frequency domain and one time unit in time domain. The first port group may include six ports, and the second port group may include six ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and a thirteenth cover code element corresponding to the reference signal. The thirteenth cover code element is an element in a thirteenth orthogonal cover code sequence, each port in the first port group is corresponding to one thirteenth orthogonal cover code sequence, and each port in the first port group is corresponding to one thirteenth cover code element on each RE in the first RE set included in the first resource group. The performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a fourteenth cover code element corresponding to the reference signal. The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group. In this case, in a scenario in which the size of the first frequency domain unit is greater than or equal to one resource block RB, a port group may be extended in all time-frequency resources in the time-frequency unit, that is, the second port group is added, so that the quantity of supported transmitted streams is increased and the performance of the MIMO system is improved under the same time-frequency resource overheads.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, both a length of the thirteenth orthogonal cover code sequence and a length of the fourteenth orthogonal cover code sequence are 4. In this case, an orthogonal cover code sequence whose length is 4, for example, the thirteenth orthogonal cover code sequence and the fourteenth orthogonal cover code sequence, is used in the time-frequency resources in the time-frequency unit, so that orthogonal ports can be expanded in the time-frequency resources.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain. In this case, subcarriers corresponding to the first resource group and subcarriers corresponding to the second resource group can be quickly determined by setting subcarriers corresponding to the ninth resource sub-block, subcarriers corresponding to the tenth resource sub-block, and subcarriers corresponding to the eleventh resource sub-block, so that reference signal mapping detection is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 12n + k' + 4\cdot\left\lfloor\frac{k'}{2}\right\rfloor + \Delta;$$

$$k' = 0, 1, 2, 3;$$

$$n = 0, 1, \ldots \text{ ; and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. In this case, in a scenario in which the size of the first frequency domain unit is greater than or equal to one RB, reference sequence elements that are in the DMRS and that are corresponding to different ports can be quickly mapped to corresponding time-frequency resources according to the foregoing rule, so that ports can be expanded in the time-frequency unit.

Optionally, values of $w_f(k')$, $w_t(l')$ and $\Delta$ corresponding to port p may be determined based on Table 17 shown in the following method embodiment. Table 17 is a correspondence table 17 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

In a yet further possible design scheme, the size of the first frequency domain unit is greater than or equal to one resource block RB, and the time-frequency unit may include one RB in frequency domain and two consecutive time units in time domain. The first port group may include 12 ports, and the second port group may include 12 ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the performing channel estimation based on a reference signal that is corresponding to the first port index and that is in a first resource group in the time-frequency unit if a port corresponding to the first port index belongs to a first port group may include: determining a reference sequence element corresponding to the reference signal in a first RE set included in the first resource group, and performing channel estimation based on the reference sequence element corresponding to the reference signal and a fifteenth cover code element corresponding to the reference signal. The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group. The performing channel estimation based on a reference signal that is corresponding to the first port index and that is in a second resource group in the time-frequency unit if a port corresponding to the first port index belongs to a second port group may include: determining a reference sequence element corresponding to the reference signal in a second RE set included in the second resource group, and performing channel estimation based on the reference sequence element corresponding to the reference signal and a sixteenth cover code element corresponding to the reference signal. The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group. In this case, in a scenario in which the size of the first frequency domain unit is greater than or equal to one resource block RB, a port group may be extended in all time-frequency resources in the time-frequency unit, that is, the second port group is added, so that the quantity of supported transmitted streams is increased and the performance of the MIMO system is improved under the same time-frequency resource overheads.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element. In this case, a corresponding cover code element can be quickly determined by using a cover code sub-element in time domain and a cover code sub-element in frequency domain, so that channel estimation accuracy can be improved while port orthogonality is ensured.

Optionally, both a length of the fifteenth orthogonal cover code sequence and a length of the sixteenth orthogonal cover code sequence may be 8. In this case, an orthogonal cover code sequence whose length is 8, for example, the fifteenth orthogonal cover code sequence and the sixteenth orthogonal cover code sequence, is used in the time-frequency resources in the time-frequency unit, so that orthogonal ports can be expanded in the time-frequency resources.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain. In this case, subcarriers corresponding to the first resource group and subcarriers corresponding to the second resource group can be quickly determined by setting subcarriers corresponding to the ninth resource sub-block, subcarriers corresponding to the tenth resource sub-block, and subcarriers corresponding to the eleventh resource sub-block, so that reference signal detection efficiency is improved.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 12n + k' + 4 \cdot \left\lfloor \frac{k'}{2} \right\rfloor + \Delta;$$

$$k' = 0, 1, 2, 3;$$

$$n = 0, 1, \ldots \text{; and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. In this case, in a scenario in which the size of the first frequency domain unit is greater than or equal to one RB, reference sequence elements that are in the DMRS and that are corresponding to different ports can be quickly mapped to corresponding time-frequency resources according to the foregoing rule, so that ports can be expanded in the time-frequency unit.

Optionally, values of $w_f(k')$, $w_t(l')$, and Δ corresponding to port p may be determined based on Table 18 shown in the following method embodiment. Table 18 is a correspondence table 18 between ports and cover code sub-elements provided in this embodiment of this application. In this case, the frequency domain cover code sub-element, the time domain cover code sub-element, and the subcarrier offset factor that are corresponding to the port are quickly determined based on the table, to improve DMRS detection efficiency.

According to a third aspect, a communication apparatus is provided. The communication apparatus includes a determining module and a mapping module. The determining module is configured to: determine a time-frequency unit based on a size of a first frequency domain unit, and determine a resource group in the time-frequency unit based on a first port index. The mapping module is configured to: if a port corresponding to the first port index belongs to a first port group, map a reference signal corresponding to the first port index to a first resource group in the time-frequency unit, and send the reference signal. Alternatively, the mapping module is configured to: if a port corresponding to the first port index belongs to a second port group, map a reference signal corresponding to the first port index to a second resource group in the time-frequency unit, and send the reference signal.

The resource group is corresponding to one port group, and the port group includes one or more ports. A port index included in the second port group is completely different from a port index included in the first port group. For the same time-frequency unit, the first resource group and the second resource group meet one of the following conditions: a time-frequency resource included in the second resource group is a non-empty subset of a time-frequency resource included in the first resource group; or a time-frequency resource included in the second resource group does not overlap with a time-frequency resource included in the first resource group. Both the size of the first frequency domain unit and the first port index may be preset or configured.

In a possible design scheme, the size of the first frequency domain unit is one resource block RB, and the time-frequency unit includes one RB in frequency domain and one time unit in time domain. The first port group includes four ports, and the second port group includes four ports. The first resource group includes a first resource sub-block and a second resource sub-block, and the second resource group includes the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. Correspondingly, the mapping module is further configured to: map a product of a reference sequence element corresponding to the reference signal and a first cover code element corresponding to the reference signal to a first RE set included in the first resource group, and send the product. The mapping module is further configured to: map a product of a reference sequence element corresponding to the reference signal and a second cover code element corresponding to the reference signal to a second RE set included in the second resource group, and send the product.

The first cover code element is an element in a first orthogonal cover code sequence, each port in the first port group is corresponding to one first orthogonal cover code sequence, and each port in the first port group is corresponding to one first cover code element on each RE in the first RE set included in the first resource group. Second cover code element is an element in a second orthogonal cover code sequence, each port in the second port group is corresponding to one second orthogonal cover code sequence, and each port in the second port group is corresponding to one second cover code element on each RE in the second RE set included in the second resource group.

Further, the first cover code element may be a product of a first frequency domain cover code sub-element and a first time domain cover code sub-element, and the second cover code element may be a product of a second frequency domain cover code sub-element and a second time domain cover code sub-element.

Optionally, a length of the first orthogonal cover code sequence is 2, and a length of the second orthogonal cover code sequence is 4.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 0, 1, 2, 3 & p \in [1004, 1007] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 1 shown in the following method embodiment. Table 1 is a correspondence table 1 between ports and cover code sub-elements provided in this embodiment of this application.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 0, 1, 4, 5 & p \in [1004, 1007] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$ $w_t(l')$, and Δ corresponding to port p may be determined based on Table 2 shown in the following method embodiment. Table 2 is a correspondence table 2 between ports and cover code sub-elements provided in this embodiment of this application.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 2, 3, 4, 5 & p \in [1004, 1007] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the k subcarrier, m=6n+k', and Δ is a subcarrier offset factor.

Optionally, values of $w_f(k')$, $w_t(l')$, and Δ corresponding to port p may be determined based on Table 3 shown in the following method embodiment. Table 3 is a correspondence table 3 between ports and cover code sub-elements provided in this embodiment of this application.

In another possible design scheme, the size of the first frequency domain unit may be one resource block RB, and the time-frequency unit may include one RB in frequency domain and two consecutive time units in time domain. The first port group may include eight ports, and the second port group may include eight ports. The first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. Correspondingly, the mapping module is further configured to: map a product of a reference sequence element corresponding to the reference signal and a third cover code element corresponding to the reference signal to a first RE set included in the first resource group, and send the product. The mapping module is further configured to: map a product of a reference sequence element corresponding to the reference signal and a fourth cover code element corresponding to the reference signal to a second RE set included in the second resource group, and send the product.

The third cover code element is an element in a third orthogonal cover code sequence, each port in the first port group is corresponding to one third orthogonal cover code sequence, and each port in the first port group is corresponding to one third cover code element on each RE in the first RE set included in the first resource group. The fourth cover code element is an element in a fourth orthogonal cover code sequence, each port in the second port group is corresponding to one fourth orthogonal cover code sequence, and each port in the first port group is corresponding to one fourth cover code element on each RE in the second RE set included in the second resource group.

Further, the third cover code element may be a product of a third frequency domain cover code sub-element and a third time domain cover code sub-element, and the fourth cover code element may be a product of a fourth frequency domain cover code sub-element and a fourth time domain cover code sub-element.

Optionally, a length of the third orthogonal cover code sequence may be 4, and a length of the fourth orthogonal cover code sequence may be 8.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 0, 1, 2, 3 & p \in [1008, 1015] \end{cases};$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 4 shown in the following method embodiment. Table 4 is a correspondence table 4 between ports and cover code sub-elements provided in this embodiment of this application.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 0, 1, 4, 5 & p \in [1008, 1015] \end{cases};$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the k*subcarrier, m=6n+k', and Δ is a subcarrier offset factor.

Optionally, values of $w_f(k')$, $w_t(l')$, and Δ corresponding to port p may be determined based on Table 5 shown in the following method embodiment. Table 5 is a correspondence table 5 between ports and cover code sub-elements provided in this embodiment of this application.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1007] \\ 2, 3, 4, 5 & p \in [1008, 1015] \end{cases};$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$ $w_t(l')$, and Δ corresponding to port p may be determined based on Table 6 shown in the following method embodiment. Table 6 is a correspondence table 6 between ports and cover code sub-elements provided in this embodiment of this application.

In still another possible design scheme, the size of the first frequency domain unit may be N times of a resource block RB group, where N is a positive integer, one RB group may include two contiguous RBs, and the time-frequency unit may include one RB group in frequency domain and one time unit in time domain. The first port group may include four ports, and the second port group may include four ports. The first resource group and the second resource group each include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the mapping module is further configured to: map a product of a reference sequence element corresponding to the reference signal and a fifth cover code element corresponding to the reference signal to a first RE set included in the first resource group, and send the product. The mapping module is further configured to: map a product of a reference sequence element corresponding to the reference signal and a sixth cover code element corresponding to the reference signal to a second RE set included in the second resource group, and send the product.

The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element.

Optionally, both a length of the fifth orthogonal cover code sequence and a length of the sixth orthogonal cover code sequence may be 4.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$ $w_t(l')$, and Δ corresponding to port p may be determined based on Table 7 shown in the following method embodiment. Table 7 is a correspondence table 7 between ports and cover code sub-elements provided in this embodiment of this application.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 8 shown in the following method embodiment. Table 8 is a correspondence table 8 between ports and cover code sub-elements provided in this embodiment of this application.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$ $w_t(l')$, and Δ corresponding to port p may be determined based on Table 9 shown in the following method embodiment. Table 9 is a correspondence table 9 between ports and cover code sub-elements provided in this embodiment of this application.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 10 shown in the following method embodiment. Table 10 is a correspondence table 10 between ports and cover code sub-elements provided in this embodiment of this application.

In yet another possible design scheme, the size of the first frequency domain unit may be N times of a resource block RB group, where N is a positive integer, one RB group may include two contiguous RBs, and the time-frequency unit may include one RB group in frequency domain and two consecutive time units in time domain. The first port group may include eight ports, and the second port group may include eight ports. The first resource group and the second resource group each may include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the mapping module is further configured to: map a product of a reference sequence element corresponding to the reference signal and a seventh cover code element corresponding to the reference signal to a first RE set included in the first resource group, and send the product. The mapping module is further configured to: map a product of a reference sequence element corresponding to the reference signal and an eighth cover code element corresponding to the reference signal to a second RE set included in the second resource group, and send the product.

The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element.

Optionally, both a length of the seventh orthogonal cover code sequence and a length of the eighth orthogonal cover code sequence may be 8.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$ $w_t(l')$, and Δ corresponding to port p may be determined based on Table 11 shown in the following method embodiment. Table 11 is a correspondence table 11 between ports and cover code sub-elements provided in this embodiment of this application.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 12 shown in the following method embodiment. Table 12 is a correspondence table 12 between ports and cover code sub-elements provided in this embodiment of this application.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

-continued $$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 13 shown in the following method embodiment. Table 13 is a correspondence table 13 between ports and cover code sub-elements provided in this embodiment of this application.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1015];$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k' and Δ is a subcarrier offset factor.

Optionally, values of $w_f(k')$, $w_t(l')$, and Δ corresponding to port p may be determined based on Table 14 shown in the following method embodiment. Table 14 is a correspondence table 14 between ports and cover code sub-elements provided in this embodiment of this application.

In still yet another possible design scheme, the size of the first frequency domain unit may be six subcarriers, the time-frequency unit may include one RB in frequency domain and one time unit in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the mapping module is further configured to: map a product of a reference sequence element corresponding to the reference signal and a ninth cover code element corresponding to the reference signal to a first RE set included in the first resource group, and send the product. The mapping module is further configured to: map a product of a reference sequence element corresponding to the reference signal and a tenth cover code element corresponding to the reference signal to a second RE set included in the second resource group, and send the product.

The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group. The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element.

Optionally, both a length of the ninth orthogonal cover code sequence and a length of the tenth orthogonal cover code sequence are 2.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 4, 5 & p \in [1000, 1003] \\ 2, 3 & p \in [1004, 1005] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 15 shown in the following method embodiment. Table 15 is a correspondence table 15 between ports and cover code sub-elements provided in this embodiment of this application.

In a further possible design scheme, the size of the first frequency domain unit may be six subcarriers, the time-frequency unit may include one RB in frequency domain and two consecutive time units in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the mapping module is further configured to: map a product of a reference sequence element corresponding to the reference signal and an eleventh cover code element corresponding to the reference signal to a first RE set included in the first resource group, and send the product. The mapping module is further configured to: map a product of a reference sequence element corresponding to the reference signal and a twelfth cover code element corresponding to the reference signal to a second RE set included in the second resource group, and send the product.

The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group. The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element.

Optionally, both a length of the eleventh orthogonal cover code sequence and a length of the twelfth orthogonal cover code sequence may be 4.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 4, 5 & p \in [1000, 1007] \\ 2, 3 & p \in [1008, 1011] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 16 shown in the following method embodiment. Table 16 is a correspondence table 16 between ports and cover code sub-elements provided in this embodiment of this application.

In a still further possible design scheme, the size of the first frequency domain unit is greater than or equal to one resource block RB, and the time-frequency unit may include one RB in frequency domain and one time unit in time domain. The first port group may include six ports, and the second port group may include six ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the mapping module is further configured to: map a product of a reference sequence element corresponding to the reference signal and a thirteenth cover code element corresponding to the reference signal to a first RE set included in the first resource group, and send the product. The mapping module is further configured to: map a product of a reference sequence element corresponding to the reference signal and a fourteenth cover code element corresponding to the reference signal to a second RE set included in the second resource group, and send the product.

The thirteenth cover code element is an element in a thirteenth orthogonal cover code sequence, each port in the first port group is corresponding to one thirteenth orthogonal cover code sequence, and each port in the first port group is corresponding to one thirteenth cover code element on each RE in the first RE set included in the first resource group. The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element.

Optionally, both a length of the thirteenth orthogonal cover code sequence and a length of the fourteenth orthogonal cover code sequence are 4.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 12n + k' + 4 \cdot \left\lfloor \frac{k'}{2} \right\rfloor + \Delta;$$

$$k' = 0, 1, 2, 3;$$

$$n = 0, 1, \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the h OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 17 shown in the following method embodiment. Table 17 is a correspondence table 17 between ports and cover code sub-elements provided in this embodiment of this application.

In a yet further possible design scheme, the size of the first frequency domain unit is greater than or equal to one resource block RB, and the time-frequency unit may include one RB in frequency domain and two consecutive time units in time domain. The first port group may include 12 ports, and the second port group may include 12 ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the mapping module is further configured to: map a product of a reference sequence element corresponding to the reference signal and a fifteenth cover code element corresponding to the reference signal to a first RE set included in the first resource group, and send the product. The mapping module is further configured to: map a product of a reference sequence element corresponding to the reference signal and a sixteenth cover code element corresponding to the reference signal to a second RE set included in the second resource group, and send the product.

The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group. The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element.

Optionally, both a length of the fifteenth orthogonal cover code sequence and a length of the sixteenth orthogonal cover code sequence may be 8.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$
$$k = 12n + k' + 4 \cdot \left\lfloor \frac{k'}{2} \right\rfloor + \Delta;$$
$$k' = 0, 1, 2, 3;$$
$$n = 0, 1, \ldots \text{ ; and}$$
$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 18 shown in the following method embodiment. Table 18 is a correspondence table 18 between ports and cover code sub-elements provided in this embodiment of this application.

Optionally, the determining module and the mapping module may alternatively be integrated into one module, for example, a processing module. The processing module is configured to implement a processing function of the communication apparatus in the third aspect.

Optionally, the communication apparatus in the third aspect may further include a storage module. The storage module stores a program or instructions. When the processing module executes the program or the instructions, the communication apparatus in the third aspect is enabled to be able to perform the reference signal mapping method in the first aspect.

Optionally, the communication apparatus in the third aspect may further include a transceiver module. The transceiver module is configured to implement a transceiver function of the communication apparatus in the third aspect. Further, the transceiver module may include a receiving module and a sending module. The receiving module and the sending module are respectively configured to implement a receiving function and a sending function of the communication apparatus in the third aspect.

It should be noted that the communication apparatus in the third aspect may be a terminal device or a network device, may be a chip (system) or another part or component that may be disposed in the terminal device or the network device, or may be an apparatus including the terminal device or the network device. This is not limited in this application.

It should be understood that the communication apparatus in the third aspect includes a corresponding module, unit, or means for implementing the reference signal mapping method in the first aspect. The module, unit, or means may be implemented by hardware, software, or hardware executing corresponding software. The hardware or software includes one or more modules or units configured to perform functions related to the foregoing communication method.

In addition, for a technical effect of the communication apparatus in the third aspect, refer to a technical effect of the reference signal mapping method in the first aspect. Details are not described herein again.

According to a fourth aspect, a communication apparatus is provided. The communication apparatus includes a determining module and a detection module. The determining module is configured to: determine a time-frequency unit based on a size of a first frequency domain unit, and determine a resource group in the time-frequency unit based on a first port index. The resource group is corresponding to one port group, and the port group includes one or more ports. The detection module is configured to: if a port corresponding to the first port index belongs to a first port group, perform channel estimation based on a reference signal that is corresponding to the first port index and that is in a first resource group in the time-frequency unit. Alternatively, the detection module is configured to: if a port corresponding to the first port index belongs to a second port group, perform channel estimation based on a reference signal that is corresponding to the first port index and that is in a second resource group in the time-frequency unit.

A port index included in the second port group is completely different from a port index included in the first port group. For a same time-frequency unit, the first resource group and the second resource group meet one of the following conditions: a time-frequency resource included in the second resource group is a non-empty subset of a time-frequency resource included in the first resource group; or a time-frequency resource included in the second resource group does not overlap with a time-frequency resource included in the first resource group. Both the size of the first frequency domain unit and the first port index may be preset or configured.

In a possible design scheme, the size of the first frequency domain unit is one resource block RB, and the time-frequency unit includes one RB in frequency domain and one time unit in time domain. The first port group includes four ports, and the second port group includes four ports. The first resource group includes a first resource sub-block and a second resource sub-block, and the second resource group includes the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. Correspondingly, the detection module is further configured to: determine a reference sequence element corresponding to the reference signal in a first RE set included in the first resource group, and perform channel estimation based on the reference sequence element corresponding to the reference signal and a first cover code element corresponding to the reference signal. The first cover code element is an element in a first orthogonal cover code sequence, each port in the first port group is corresponding to one first orthogonal cover code sequence, and each port in the first port group is corresponding to one first cover code element on each RE in the first RE set included in the first resource group. Similarly, the detection module is further configured to: determine a reference sequence element corresponding to the reference signal in a second RE set included in the second resource group, and perform channel estimation based on the reference sequence element corresponding to the reference signal and a second cover code element corresponding to the reference signal. The second cover code element is an element in a second orthogonal cover code sequence, each port in the second port group is corresponding to one second orthogonal cover code sequence, and each port in the second port group is corresponding to one second cover code element on each RE in the second RE set included in the second resource group.

Further, the first cover code element may be a product of a first frequency domain cover code sub-element and a first time domain cover code sub-element, and the second cover code element may be a product of a second frequency domain cover code sub-element and a second time domain cover code sub-element.

Optionally, a length of the first orthogonal cover code sequence is 2, and a length of the second orthogonal cover code sequence is 4.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(6n + k');$$

$$k = 12n + 2k' + \Delta;$$

-continued $$k' = \begin{cases} 0, 1, 2, 3, 4, 5 & p \in [1000, 1003] \\ 0, 1, 2, 3 & p \in [1004, 1007] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 1 shown in the following method embodiment. Table 1 is a correspondence table 1 between ports and cover code sub-elements provided in this embodiment of this application.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 0, 1, 4, 5 & p \in [1004, 1007] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 2 shown in the following method embodiment. Table 2 is a correspondence table 2 between ports and cover code sub-elements provided in this embodiment of this application.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 2, 3, 4, 5 & p \in [1004, 1007] \end{cases};$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 3 shown in the following method embodiment. Table 3 is a correspondence table 3 between ports and cover code sub-elements provided in this embodiment of this application.

In another possible design scheme, the size of the first frequency domain unit may be one resource block RB, and the time-frequency unit may include one RB in frequency domain and two consecutive time units in time domain. The first port group may include eight ports, and the second port group may include eight ports. The first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. Correspondingly, the detection module is further configured to: determine a reference sequence element corresponding to the reference signal in a first RE set included in the first resource group, and perform channel estimation based on the reference sequence element corresponding to the reference signal and a third cover code element corresponding to the reference signal. The third cover code element is an element in a third orthogonal cover code sequence, each port in the first port group is corresponding to one third orthogonal cover code sequence, and each port in the first port group is corresponding to one third cover code element on each RE in the first RE set included in the first resource group. Similarly, the detection module is further configured to: determine a reference sequence element corresponding to the reference signal in a second RE set included in the second resource group, and perform channel estimation based on the reference sequence element corresponding to the reference signal and a fourth cover code element corresponding to the reference signal. The fourth cover code element is an element in a fourth orthogonal cover code sequence, each port in the second port group is corresponding to one fourth orthogonal cover code sequence, and each port in the first port group is corresponding to one fourth cover code element on each RE in the second RE set included in the second resource group.

Further, the third cover code element may be a product of a third frequency domain cover code sub-element and a third time domain cover code sub-element, and the fourth cover code element may be a product of a fourth frequency domain cover code sub-element and a fourth time domain cover code sub-element.

Optionally, a length of the third orthogonal cover code sequence may be 4, and a length of the fourth orthogonal cover code sequence may be 8.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 0, 1, 2, 3 & p \in [1008, 1015] \end{cases};$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 4 shown in the following method embodiment. Table 4 is a correspondence table 4 between ports and cover code sub-elements provided in this embodiment of this application.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 0, 1, 4, 5 & p \in [1008, 1015] \end{cases};$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 5 shown in the following method embodiment. Table 5 is a correspondence table 5 between ports and cover code sub-elements provided in this embodiment of this application.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 2, 3, 4, 5 & p \in [1008, 1015] \end{cases};$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 6 shown in the following method embodiment. Table 6 is a correspondence table 6 between ports and cover code sub-elements provided in this embodiment of this application.

In still another possible design scheme, the size of the first frequency domain unit may be N times of a resource block RB group, where N is a positive integer, one RB group may include two contiguous RBs, and the time-frequency unit may include one RB group in frequency domain and one time unit in time domain. The first port group may include four ports, and the second port group may include four ports. The first resource group and the second resource group each include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, that the detection module is further configured to perform channel estimation based on a reference signal that is corresponding to the first port index and that is in a first resource group in the time-frequency unit may include: mapping a product of a reference sequence element corresponding to the reference signal and a fifth cover code element corresponding to the reference signal to a first RE set included in the first resource group, and detecting the reference signal. The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. Similarly, the detection module is further configured to: determine a reference sequence element corresponding to the reference signal in a second RE set included in the second resource group, and perform channel estimation based on the reference sequence element corresponding to the reference signal and a sixth cover code element corresponding to the reference signal. The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element.

Optionally, both a length of the fifth orthogonal cover code sequence and a length of the sixth orthogonal cover code sequence may be 4.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(12n+k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots ; \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 7 shown in the following method embodiment. Table 7 is a correspondence table 7 between ports and cover code sub-elements provided in this embodiment of this application.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n+k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots ; \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 8 shown in the following method embodiment. Table 8 is a correspondence table 8 between ports and cover code sub-elements provided in this embodiment of this application.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n+k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots ; \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 9 shown in the following method embodiment. Table 9 is a correspondence table 9 between ports and cover code sub-elements provided in this embodiment of this application.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3 \quad p \in [1000, 1007];$$

$$l = \bar{l} + l';$$

$$n = 0, 1, \ldots \text{ ; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$ $w_t(l')$, and Δ corresponding to port p may be determined based on Table 10 shown in the following method embodiment. Table 10 is a correspondence table 10 between ports and cover code sub-elements provided in this embodiment of this application.

In yet another possible design scheme, the size of the first frequency domain unit may be N times of a resource block RB group, where N is a positive integer, one RB group may include two contiguous RBs, and the time-frequency unit may include one RB group in frequency domain and two consecutive time units in time domain. The first port group may include eight ports, and the second port group may include eight ports. The first resource group and the second resource group each may include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the detection module is further configured to: determine a reference sequence element corresponding to the reference signal in a first RE set included in the first resource group, and perform channel estimation based on the reference sequence element corresponding to the reference signal and a seventh cover code element corresponding to the reference signal. The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. Similarly, the detection module is further configured to: determine a reference sequence element corresponding to the reference signal in a second RE set included in the second resource group, and perform channel estimation based on the reference sequence element corresponding to the reference signal and an eighth cover code element corresponding to the reference signal. The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element.

Optionally, both a length of the seventh orthogonal cover code sequence and a length of the eighth orthogonal cover code sequence may be 8.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$ and Δ corresponding to port p may be determined based on Table 11 shown in the following method embodiment. Table 11 is a correspondence table 11 between ports and cover code sub-elements provided in this embodiment of this application.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 12 shown in the following method embodiment. Table 12 is a correspondence table 12 between ports and cover code sub-elements provided in this embodiment of this application.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

-continued $$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 13 shown in the following method embodiment. Table 13 is a correspondence table 13 between ports and cover code sub-elements provided in this embodiment of this application.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1015];$$

$$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 14 shown in the following method embodiment. Table 14 is a correspondence table 14 between ports and cover code sub-elements provided in this embodiment of this application.

In still yet another possible design scheme, the size of the first frequency domain unit may be six subcarriers, the time-frequency unit may include one RB in frequency domain and one time unit in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the detection module is further configured to: determine a reference sequence element corresponding to the reference signal in a first RE set included in the first resource group, and perform channel estimation based on the reference sequence element corresponding to the reference signal and a ninth cover code element corresponding to the reference signal. The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group. Similarly, the detection module is further configured to: determine a reference sequence element corresponding to the reference signal in a second RE set included in the second resource group, and perform channel estimation based on the reference sequence element corresponding to the reference signal and a tenth cover code element corresponding to the reference signal. The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element.

Optionally, both a length of the ninth orthogonal cover code sequence and a length of the tenth orthogonal cover code sequence are 2.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 4, 5 & p \in [1000, 1003] \\ 2, 3, & p \in [1004, 1005] \end{cases};$$

$$l = \bar{l} + l';$$

$$n = 0, 1, \ldots \text{ ; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$ and Δ corresponding to port p may be determined based on Table 15 shown in the following method embodiment. Table 15 is a correspondence table 15 between ports and cover code sub-elements provided in this embodiment of this application.

In a further possible design scheme, the size of the first frequency domain unit may be six subcarriers, the time-frequency unit may include one RB in frequency domain and two consecutive time units in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the detection module is further configured to: determine a reference sequence element corresponding to the reference signal in a first RE set included in the first resource group, and perform channel estimation based on the reference sequence element corresponding to the reference signal and an eleventh cover code element corresponding to the reference signal. The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group. Similarly, the detection module is further configured to: determine a reference sequence element corresponding to the reference signal in a second RE set included in the second resource group, and perform channel estimation based on the reference sequence element corresponding to the reference signal and a twelfth cover code element corresponding to the reference signal. The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element.

Optionally, both a length of the eleventh orthogonal cover code sequence and a length of the twelfth orthogonal cover code sequence may be 4.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 4, 5 & p \in [1000, 1007] \\ 2, 3, & p \in [1008, 1011] \end{cases};$$

$$l = \bar{l} + l';$$

$$n = 0, 1, \ldots \text{ ; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$ and Δ corresponding to port p may be determined based on Table 16 shown in the following method embodiment. Table 16 is a correspondence table 16 between ports and cover code sub-elements provided in this embodiment of this application.

In a still further possible design scheme, the size of the first frequency domain unit is greater than or equal to one resource block RB, and the time-frequency unit may include one RB in frequency domain and one time unit in time domain. The first port group may include six ports, and the second port group may include six ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the detection module is further configured to: determine a reference sequence element corresponding to the reference signal in a first RE set included in the first resource group, and perform channel estimation based on the reference sequence element corresponding to the reference signal and a thirteenth cover code element corresponding to the reference signal. The thirteenth cover code element is an element in a thirteenth orthogonal cover code sequence, each port in the first port group is corresponding to one thirteenth orthogonal cover code sequence, and each port in the first port group is corresponding to one thirteenth cover code element on each RE in the first RE set included in the first resource group. The detection module is further configured to: determine a reference sequence element corresponding to the reference signal in a second RE set included in the second resource group, and perform channel estimation based on the reference sequence element corresponding to the reference signal and a fourteenth cover code element corresponding to the reference signal. The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element.

Optionally, both a length of the thirteenth orthogonal cover code sequence and a length of the fourteenth orthogonal cover code sequence are 4.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 12n + k' + 4 \cdot \left\lfloor \frac{k'}{2} \right\rfloor + \Delta;$$

$$k' = 0, 1, 2, 3;$$

$$n = 0, 1, \ldots \text{ ; and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 17 shown in the following method embodiment. Table 17 is a correspondence table 17 between ports and cover code sub-elements provided in this embodiment of this application.

In a yet further possible design scheme, the size of the first frequency domain unit is greater than or equal to one resource block RB, and the time-frequency unit may include one RB in frequency domain and two consecutive time units in time domain. The first port group may include 12 ports, and the second port group may include 12 ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the detection module is further configured to: determine a reference sequence element corresponding to the reference signal in a first RE set included in the first resource group, and perform channel estimation based on the reference sequence element corresponding to the reference signal and a fifteenth cover code element corresponding to the reference signal. The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group. The detection module is further configured to; determine a reference sequence element corresponding to the reference signal in a second RE set included in the second resource group, and perform channel estimation based on the reference sequence element corresponding to the reference signal and a sixteenth cover code element corresponding to the reference signal. The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element.

Optionally, both a length of the fifteenth orthogonal cover code sequence and a length of the sixteenth orthogonal cover code sequence may be 8.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 12n + k' + 4 \cdot \left\lfloor \frac{k'}{2} \right\rfloor + \Delta;$$

$$k' = 0, 1, 2, 3;$$

$$n = 0, 1, \ldots \text{; and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 18 shown in the following method embodiment. Table 18 is a correspondence table 18 between ports and cover code sub-elements provided in this embodiment of this application.

According to a fifth aspect, a communication apparatus is provided. The communication apparatus includes a processor. The processor is configured to perform the reference signal mapping method in the first aspect or the second aspect.

In a possible design scheme, the communication apparatus in the fifth aspect may further include a transceiver. The transceiver may be a transceiver circuit or an interface circuit. The transceiver may be used by the communication apparatus in the fifth aspect to communicate with another communication apparatus.

In a possible design scheme, the communication apparatus in the fifth aspect may further include a memory. The memory and the processor may be integrated together, or may be disposed separately. The memory may be configured to store a computer program and/or data related to the reference signal mapping method in the first aspect or the second aspect.

In this application, the communication apparatus in the fifth aspect may be a network device or a terminal device, a chip (system) or another part or component that may be disposed in the foregoing devices, or an apparatus including the network device or the terminal device.

In addition, for a technical effect of the communication apparatus in the fifth aspect, refer to a technical effect of the reference signal mapping method in the first aspect or the second aspect. Details are not described herein again.

According to a sixth aspect, a communication apparatus is provided. The communication apparatus includes a processor. The processor is coupled to a memory, and the processor is configured to execute a computer program stored in the memory, so that the communication apparatus performs the reference signal mapping method in the first aspect or the second aspect.

In a possible design scheme, the communication apparatus in the sixth aspect may further include a transceiver. The transceiver may be a transceiver circuit or an interface circuit. The transceiver may be used by the communication apparatus in the sixth aspect to communicate with another communication apparatus.

In this application, the communication apparatus in the sixth aspect may be a network device or a terminal device, a chip (system) or another part or component that may be disposed in the foregoing devices, or an apparatus including the network device or the terminal device.

In addition, for a technical effect of the communication apparatus in the sixth aspect, refer to a technical effect of the reference signal mapping method in the first aspect or the second aspect. Details are not described herein again.

According to a seventh aspect, a communication apparatus is provided. The communication apparatus includes a processor and a memory. The memory is configured to store computer instructions, and when the processor executes the instructions, the communication apparatus is enabled to perform the reference signal mapping method in the first aspect or the second aspect.

In a possible design scheme, the communication apparatus in the seventh aspect may further include a transceiver. The transceiver may be a transceiver circuit or an interface circuit. The transceiver may be used by the communication apparatus in the seventh aspect to communicate with another communication apparatus.

In this application, the communication apparatus in the seventh aspect may be a network device or a terminal device, a chip (system) or another part or component that may be disposed in the foregoing devices, or an apparatus including the network device or the terminal device.

In addition, for a technical effect of the communication apparatus in the seventh aspect, refer to a technical effect of the reference signal mapping method in the first aspect or the second aspect. Details are not described herein again.

According to an eighth aspect, a communication apparatus is provided. The communication apparatus includes a processor. The processor is configured to: after being coupled to a memory and reading a computer program in the memory, perform the reference signal mapping method in the first aspect or the second aspect based on the computer program.

In a possible design scheme, the communication apparatus in the eighth aspect may further include a transceiver. The transceiver may be a transceiver circuit or an interface circuit. The transceiver may be used by the communication apparatus in the eighth aspect to communicate with another communication apparatus.

In this application, the communication apparatus in the eighth aspect may be a network device or a terminal device, a chip (system) or another part or component that may be disposed in the foregoing devices, or an apparatus including the network device or the terminal device.

In addition, for a technical effect of the communication apparatus in the eighth aspect, refer to a technical effect of the reference signal mapping method in the first aspect or the second aspect. Details are not described herein again.

According to a ninth aspect, a processor is provided. The processor is configured to perform the reference signal mapping method in the first aspect or the second aspect.

According to a tenth aspect, a communication system is provided. The communication system includes one or more terminal devices and one or more network devices.

According to an eleventh aspect, a computer-readable storage medium is provided. The computer-readable storage medium includes a computer program or instructions. When the computer program or the instructions are run on a computer, the computer is enabled to perform the reference signal mapping method in the first aspect or the second aspect.

According to a twelfth aspect, a computer program product is provided. The computer program product includes a computer program or instructions. When the computer program or the instructions are run on a computer, the computer is enabled to perform the reference signal mapping method in the first aspect or the second aspect.

BRIEF DESCRIPTION OF DRAWINGS

FIG. 1 is an example diagram 1 of a mapping rule according to the existing technology;

FIG. 2 is an example diagram 2 of a mapping rule according to the existing technology:

FIG. 3 is an example diagram 3 of a mapping rule according to the existing technology;

FIG. 4 is an example diagram 4 of a mapping rule according to the existing technology;

FIG. 10 is an example diagram 4 of a mapping rule according to an embodiment of this application:

FIG. 11 is an example diagram 5 of a mapping rule according to an embodiment of this application;

FIG. 12 is an example diagram 6 of a mapping rule according to an embodiment of this application;

FIG. 16 is an example diagram 10 of a mapping rule according to an embodiment of this application:

FIG. 17A and FIG. 17B are an example diagram 11 of a mapping rule according to an embodiment of this application;

FIG. 18A and FIG. 18B are an example diagram 12 of a mapping rule according to an embodiment of this application;

FIG. 19A and FIG. 19B are an example diagram 13 of a mapping rule according to an embodiment of this application;

FIG. 20 is an example diagram 14 of a mapping rule according to an embodiment of this application;

FIG. 22 is an example diagram 16 of a mapping rule according to an embodiment of this application:

DESCRIPTION OF EMBODIMENTS

Figure 5:
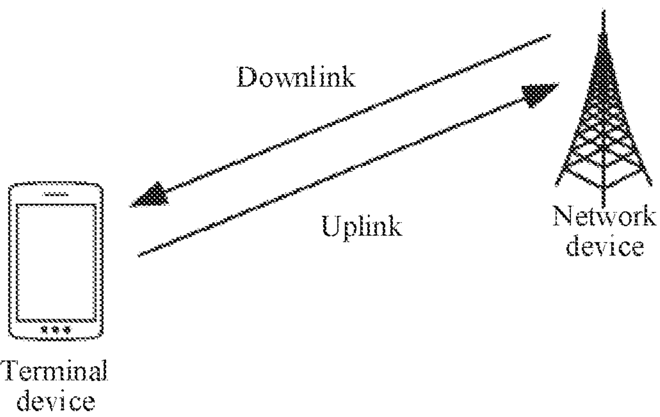
FIG. 5 is a schematic architectural diagram of a communication system according to an embodiment of this application.

The following describes technical solutions of this application with reference to the accompanying drawings.

1. Channel estimation: Estimate, based on a preset reference signal, a channel through which the reference signal passes. The channel estimation may be based on algorithms such as least square (LS) estimation and minimum mean square error (minimum mean square error, MMSE) estimation.

2. Demodulation reference signal (DMRS): It is a reference signal used by a receiving device (for example, a network device or a terminal device) to perform equivalent channel estimation. It is assumed that the DMRS signal is s. Same precoding processing is usually performed on the DMRS and transmitted data, that is, a same precoding matrix P is used. In this case, an equivalent received signal of the receiving device is y=HPs+n, where y is the received signal, H is a channel frequency domain response, P is the precoding matrix, and s is the DMRS signal. Therefore, an equivalent channel HP may be estimated based on the DMRS, and MIMO equalization and subsequent demodulation are completed based on the obtained HP, to obtain an estimation result of the sent data. One demodulation reference signal symbol may be corresponding to one port. One port may be corresponding to one spatial layer.

To ensure channel estimation quality and meet channel estimation of a plurality of time-frequency resources, a plurality of DMRS symbols are sent on different time-frequency resources. Different DMRS symbols may be corresponding to a same port or different ports. For one port, a plurality of DMRS symbols may occupy different time-frequency resources, the plurality of DMRS symbols are corresponding to one reference sequence, and the reference sequence includes a plurality of reference sequence elements. A DMRS reference sequence may be a gold sequence or a zadoff-chu (ZC) sequence. For example, the DMRS reference sequence is a gold sequence, and the reference sequence may be expressed as:

$$r(n)=\frac{1}{\sqrt{2}}(1-2\cdot c(2n))+j\frac{1}{\sqrt{2}}(1-2\cdot c(2n+1)),$$

where a pseudo-random sequence c(n) may be a gold sequence whose sequence length is 31, and a sequence c(n) whose output length is $M_{PN}$, n=0, 1 . . . , $M_{PN}-1$, may be defined as:

$$c(n)=(x_1(n+N_C)+x_1(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_C=1600$, the 1st m-sequence $x_1(n)$ may be initialized to $x_1(0)=1$, $x_1(n)=0$, n=1, 2, . . . , 3, and the 2nd m-sequence $x_2(n)$ is initialized by the parameter $c_{init}$. $c_{init}$ may be defined as $$c_{init}=\left(2^{17}\left(N_{symb}^{slot}n_{s,f}^{\mu}+l+1\right)\left(2N_{ID}^{\bar{n}_{SCID}^{\lambda}}+1\right)+2^{17}\left\lfloor\frac{\lambda}{2}\right\rfloor+2N_{ID}^{\bar{n}_{SCID}^{\lambda}}+\bar{n}_{SCID}^{\lambda}\right)\bmod 2^{31}.$$

Herein, l represents an index of an OFDM symbol included in a slot, $$n_{s,f}^{\mu}$$

represents an index of a slot in a system frame, and $$N_{ID}^{0},N_{ID}^{1}\in\{0,1,\ldots,65535\}$$

may be configured by using higher layer signaling.

$$N_{ID}^{\bar{n}_{SCID}^{\lambda}}$$

is related to a cell ID (identification), and may be usually equal to the cell ID:

$$N_{ID}^{\bar{n}_{SCID}^{\lambda}}=N_{ID}^{cell}\cdot\bar{n}_{SCID}^{\lambda}$$

is an initialization parameter, and a value may be 0 or 1. λ represents an index of a CDM group.

3. Precoding technology: When a channel status is known, a sending device (for example, a network device) may process a to-be-sent signal by using a precoding matrix matched with a channel resource, so that the precoded to-be-sent signal is adapted to a channel, and complexity of eliminating influence between channels by a receiving device (for example, a terminal device) is reduced. Therefore, after the to-be-sent signal is precoded, received signal quality (for example, a signal to interference plus noise ratio (SINR)) is improved. Therefore, performance of transmission performed between a sending device and a plurality of receiving devices on a same time-frequency resource can be improved by using the precoding technology, that is, performance of a multiple-user multiple-input multiple-output (MU-MIMO) system is improved.

It should be understood that related descriptions of the precoding technology are merely an example for ease of understanding, and are not intended to limit the protection scope of embodiments of this application. In a specific implementation process, the sending device may alternatively perform precoding in another manner. For example, when channel information (for example, but not limited to a channel matrix) cannot be obtained, precoding is performed by using a preset precoding matrix or in a weighting processing manner. For brevity, specific content thereof is not described in this specification.

4. Precoding resource block group (PRG): It is a set of a plurality of contiguous resource blocks that use same precoding. A multiple-input multiple-output orthogonal frequency division multiplexing (MIMO-OFDM) system is used as an example. Assuming that one RB includes 12 subcarriers in frequency domain, time-frequency resources in a plurality of contiguous RBs usually need to use a same precoding matrix. Currently, a size of the PRG supported by an NR protocol may include two RBs, four RBs, or complete scheduling bandwidth. Specifically, if the size of the PRG is two RBs, a same precoding matrix is used for sent signals corresponding to resources in the two contiguous RBs. If the size of the PRG is 4 RBs, a same precoding matrix is used for sent signals corresponding to resources in the four contiguous RBs.

It should be understood that the foregoing listed specific implementations of the size of the PRG are merely examples, and should not constitute any limitation on this application. For a specific implementation of the precoding matrix, refer to the existing technology. For brevity, details are not exhaustively described herein.

5. Spatial layer: For a spatial multiplexing MIMO system, a plurality of parallel data streams may be simultaneously transmitted on a same frequency domain resource, and each data stream is referred to as a spatial layer or spatial stream.

6. Orthogonal cover code (OCC): It is a sequence group in which any two sequences are orthogonal. In a code division multiplexing group, OCC coding may be used for different ports to ensure orthogonality of the ports, to reduce interference between reference signals transmitted through antenna ports.

The following describes technical solutions in the existing technology with reference to the accompanying drawings.

In the current NR protocol, two DMRS configuration types are defined. The following separately describes mapping rules applicable to different configuration types in the existing technology.

For a configuration type 1, the existing technology provides a mapping rule A, applicable to the following scenario: The configuration type 1 is used, a time-frequency resource to which the DMRS needs to be mapped occupies one time unit in time domain, and four ports are supported.

FIG. 1 is an example diagram 1 of a mapping rule according to the existing technology. As shown in FIG. 1, the four ports are divided into two code division multiplexing (CDM) groups. A first CDM group includes port 0 and port 1, and a second CDM group includes port 2 and port 3. The first CDM group and the second CDM group may be mapped to different frequency domain resources. Ports in the CDM group are distinguished by using an orthogonal cover code (OCC), to ensure orthogonality of DMRS ports in the CDM group, so that interference between DMRSs transmitted through different antenna ports is suppressed.

For example, a time-frequency resource to which the DMRS can be mapped is one RB, and adjacent resources occupied by port 0 and port 1 may be spaced by one subcarrier in frequency domain. For subcarrier 0, subcarrier 2, and OFDM symbol 0, port 0 and port 1 use a group of OCC codes (+1/+1 and +1/−1). Similarly, port 2 and port 3 are located in a same resource element (RE), and are mapped, in a frequency division multiplexing (comb) manner in frequency domain, to REs that are not occupied by port 0 and port 1. For subcarrier 1 and subcarrier 3, port 2 and port 3 use a group of OCC codes (+1/+1 and +1/−1).

For the configuration type 1, the existing technology further provides a mapping rule B, applicable to the following scenario: The configuration type 1 is used, a time-frequency resource to which the DMRS needs to be mapped occupies two time units in time domain, and eight ports are supported.

FIG. 2 is an example diagram 2 of a mapping rule according to the existing technology. As shown in FIG. 2, the eight ports are divided into two code division multiplexing (CDM) groups. A first CDM group includes port 0, port 1, port 4, and port 5, and a second CDM group includes port 2, port 3, port 6, and port 7.

For example, a time-frequency resource to which the DMRS can be mapped is one RB, and adjacent resources occupied by port 0, port 1, port 4, and port 5 may be spaced by one subcarrier in frequency domain. For subcarrier 0, subcarrier 2, OFDM symbol 0, and OFDM symbol 1, port 0, port 1, port 4, and port 5 use a group of OCC codes (+1/+1/+1/+1, +1/+1/−1/−1, +1/−1/+1/−1, +1/−1/−1/+1). Similarly, port 2, port 3, port 6, and port 7 are located in a same resource element (RE), and are mapped in a frequency division multiplexing (comb) manner in frequency domain to REs that are not occupied by port 0, port 1, port 4, and port 5. For subcarrier 1, subcarrier 3, OFDM symbol 0, and OFDM symbol 1, port 2, port 3, port 6, and port 7 use a group of OCC codes (+1/+1/+1/+1, +1/+1/−1/−1, +1/−1/+1/−1, +1/−1/−1/+1).

It should be noted that, the existing technology provides a formula and a table applicable to the configuration type 1, to describe the mapping rule A shown in FIG. 1. The reference signal is a demodulation reference signal DMRS, and the time unit is an orthogonal frequency division multiplexing OFDM symbol.

For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule A meets:

$$a_{k,l}^{(p,\mu)} = \beta_{PDSCH}^{DMRS} w_f(k') w_t(l') r(2n+k');$$
$$k = 4n + 2k' + \Delta;$$
$$k' = 0, 1;$$
$$l = \bar{l} + l';$$
$$n = 0, 1, \ldots \text{ ; and}$$
$$l' = 0,$$

where μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $l^{th}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=2n+k', and Δ is a subcarrier offset factor.

It should be further noted that, the existing technology further provides a formula and a table applicable to the configuration type 1, to describe the mapping rule B shown in FIG. 2. The reference signal is a demodulation reference signal DMRS, and the time unit is an orthogonal frequency division multiplexing OFDM symbol.

For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a subcarrier in the time-frequency unit in frequency domain, and the mapping rule B meets:

$$a_{k,l}^{(p,\mu)} = \beta_{PDSCH}^{DMRS} w_f(k') w_t(l') r(2n+k');$$
$$k = 4n + 2k' + \Delta;$$
$$k' = 0, 1;$$
$$l = \bar{l} + l';$$
$$n = 0, 1, \ldots ;$$
$$l' = 0, 1,$$

where μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $l^{th}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=2n+k', and Δ is a subcarrier offset factor.

In addition, values of $w_f(k')$, $w_t(l')$, and Δ corresponding to port p in the mapping rule A and the mapping rule B may be determined based on Table A. Table A is a correspondence table 1 between ports and cover code sub-elements provided in the existing technology.

TABLE A

| | | | $w_f$(k') | | $w_t$ (l') | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

λ is an index of an orthogonal multiplexing group to which port p belongs, and ports in a same orthogonal multiplexing group occupy a same time-frequency resource.

For the configuration type 2, the existing technology further provides a mapping rule C, applicable to the following scenario: The configuration type 2 is used, a time-frequency resource to which the DMRS needs to be mapped occupies one time unit in time domain, and six ports are supported.

FIG. 3 is an example diagram 3 of a mapping rule according to the existing technology. As shown in FIG. 3, the six ports are divided into three code division multiplexing (CDM) groups. A first CDM group includes port 0 and port 1, a second CDM group includes port 2 and port 3, and a third CDM group includes port 4 and port 5.

For example, a time-frequency resource to which the DMRS can be mapped is one RB. Port 0 and port 1 occupy a same subcarrier, and resource mapping is performed in a frequency division multiplexing (comb) manner. For subcarrier 0, subcarrier 1, and OFDM symbol 0, port 0 and port 1 use a group of OCC codes (+1/+1 and +1/−1). Similarly, port 2 and port 3 are located in a same subcarrier, and port 4 and port 5 are also located in a same subcarrier. Mapping is performed in the frequency division multiplexing (comb) manner. For subcarrier 2 and subcarrier 3, port 2 and port 3 use a group of OCC codes (+1/+1 and +1/−1). For subcarrier 4 and subcarrier 5, port 4 and port 5 use a group of OCC codes (+1/+1 and +1/−1).

For the configuration type 2, the existing technology further provides a mapping rule D, applicable to the following scenario: The configuration type 2 is used, a time-frequency resource to which the DMRS needs to be mapped occupies two time units in time domain, and 12 ports are supported.

FIG. 4 is an example diagram 4 of a mapping rule according to the existing technology. As shown in FIG. 4, the 12 ports are divided into three code division multiplexing (CDM) groups. A first CDM group includes port 0, port 1, port 6, and port 7, a second CDM group includes port 2, port 3, port 8, and port 9, and a third CDM group includes port 4, port 5, port 10, and port 11.

For example, a time-frequency resource to which the DMRS can be mapped is one RB. Port 0 and port 1 occupy a same RE, and resource mapping is performed in a comb manner. For subcarrier 0, subcarrier 1. OFDM symbol 0, and OFDM symbol 1, port 0, port 1, port 6, and port 7 use a group of OCC codes (+1/+1/+1/+1, +1/+1/−1/−1, +1/−1/+1/−1, +1/−1/−1/+1). Similarly, port 2, port 3, port 8, and port 9 are located in a same RE, and port 4, port 5, port 10, and port 11 are also located in a same RE Mapping is performed in the frequency division multiplexing (comb) manner.

It should be noted that, the existing technology further provides a formula and a table applicable to the configuration type 2, to describe the mapping rule C shown in FIG. 3. The reference signal is a demodulation reference signal DMRS, and the time unit is an orthogonal frequency division multiplexing OFDM symbol.

For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule C meets:

$$a_{k,l}^{(p,\mu)} = \beta_{PDSCH}^{DMRS} w_f(k') w_t(l') r(2n+k');$$
$$k = 6n + k' + \Delta;$$
$$k' = 0, 1;$$
$$l = \bar{l} + l';$$
$$n = 0, 1, \ldots \text{; and}$$
$$l' = 0,$$

where μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $l^{th}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=2n+k', and Δ is a subcarrier offset factor.

It should be further noted that, the existing technology further provides a formula and a table applicable to the configuration type 1, to describe the mapping rule D shown in FIG. 4. The reference signal is a demodulation reference signal DMRS, and the time unit is an orthogonal frequency division multiplexing OFDM symbol.

For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a subcarrier in the time-frequency unit in frequency domain, and the mapping rule D meets:

$$a_{k,l}^{(p,\mu)} = \beta_{PDSCH}^{DMRS} w_f(k') w_t(l') r(2n+k');$$
$$k = 6n + k' + \Delta;$$
$$k' = 0, 1;$$
$$l = \bar{l} + l';$$
$$n = 0, 1, \ldots \text{; and}$$
$$l' = 0, 1,$$

where μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $l^{th}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=2n+k', and Δ is a subcarrier offset factor.

In addition, values of $w_f(k')$, $w_t(l')$, and Δ corresponding to port p in the mapping rule C and the mapping rule D may be determined based on Table B. Table B is a correspondence table 2 between ports and cover code sub-elements provided in the existing technology.

TABLE B

| | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

λ is an index of an orthogonal multiplexing group to which port p belongs, and ports in a same orthogonal multiplexing group occupy a same time-frequency resource.

The following describes the technical solutions of this application with reference to the accompanying drawings.

The technical solutions in embodiments of this application may be applied to various communication systems that have a reference signal mapping function, for example, a wireless fidelity (Wi-Fi) system, a vehicle-to-everything (V2X) communication system, a device-to-device (D2D)

communication system, an internet of vehicles communication system, a 4th generation (4G) mobile communication system such as a long term evolution (LTE) system or a worldwide interoperability for microwave access (WiMAX) communication system, a 5th generation (5G) mobile communication system such as a new radio (NR) system, or a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, the terms "information", "signal", "message", "channel", and "signaling" may be interchangeably used sometimes. It should be noted that meanings expressed by the terms are consistent when differences between the terms are not emphasized. The terms "of", "corresponding", and "corresponding" may be interchangeably used sometimes. It should be noted that meanings expressed by the terms are consistent when differences between the terms are not emphasized.

In embodiments of this application, sometimes a subscript such as $W_1$ may be written in an incorrect form such as W1. Expressed meanings are consistent when differences between them are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

The NR system is used as an example for description in embodiments of this application. It should be noted that the technical solutions provided in embodiments of this application may be further applied to another communication system, for example, an LTE system, an evolved LTE system, or a 6G system, and a corresponding name may also be replaced with a name of a corresponding function in another communication network.

For ease of understanding embodiments of this application, a communication system shown in FIG. 5 is first used as an example to describe in detail a communication system applicable to embodiments of this application. For example, FIG. 5 is a schematic architectural diagram of a communication system to which a reference signal mapping method is applicable according to an embodiment of this application.

As shown in FIG. 5, the reference signal mapping system includes a terminal device and a network device. There may be one or more terminal devices and network devices, and the terminal device and the network device each may be configured with one or more antennas. When the terminal device and the network device are each configured with a plurality of antennas, the terminal device and the network device may implement the foregoing MIMO technology-based communication.

The network device is a device that is located on a network side of the reference signal mapping system and that has a wireless transceiver function, or a chip or a chip system that can be disposed in the device. The network device includes but is not limited to, an access point (AP) in a wireless fidelity (Wi-Fi) system, for example, a home gateway, a router, a server, a switch, or a bridge, an evolved NodeB (eNB), a radio network controller (RNC), a NodeB (NB), a base station controller (BSC), a base transceiver station (BTS), a home base station. (for example, a home evolved NodeB or a home NodeB, HNB), a baseband unit (BBU), a wireless relay node, a wireless backhaul node, and a transmission reception point (TRP or transmission point, TP) (also referred to as a transceiver node): may be a gNB in 5G such as a new radio (NR) system, or one or one group (including a plurality of antenna panels) of antenna panels of a base station in the 5G system; or may be a network node forming a gNB or a transmission point, for example, a baseband unit (BBU), a distributed unit (DU), or a roadside unit (RSU) having a base station function.

The terminal device is a terminal that can access the communication system and that has a wireless transceiver function, or a chip or a chip system that may be disposed in the terminal. The terminal device may also be referred to as customer premise equipment (CPE). It may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a vehicle-mounted terminal, an RSU having a terminal function, a wireless relay node, or the like. The terminal device in this application may alternatively be a vehicle-mounted module, a vehicle-mounted part, a vehicle-mounted chip, or a vehicle-mounted unit that is built in a vehicle as one or more parts or units. The vehicle can implement a reference signal mapping method provided in this application by using the vehicle-mounted module, the vehicle-mounted part, the vehicle-mounted chip, or the vehicle-mounted unit that is built in the vehicle.

It should be noted that the reference signal mapping method provided in embodiments of this application is applicable to any node shown in FIG. 5, for example, the terminal device or the network device. For specific implementation, refer to the following method embodiments. Details are not described herein.

It should be noted that, the solutions in embodiments of this application may also be used in another communication system, and a corresponding name may also be replaced with a name of a corresponding function in the another communication system.

It should be understood that FIG. 5 is merely a simplified schematic diagram of an example for ease of understanding.

The reference signal mapping system may further include another network device and/or another terminal device that are/is not shown in FIG. 5.

The following describes in detail the communication method provided in embodiments of this application with reference to FIG. 6 to FIG. 24.

Figure 6:
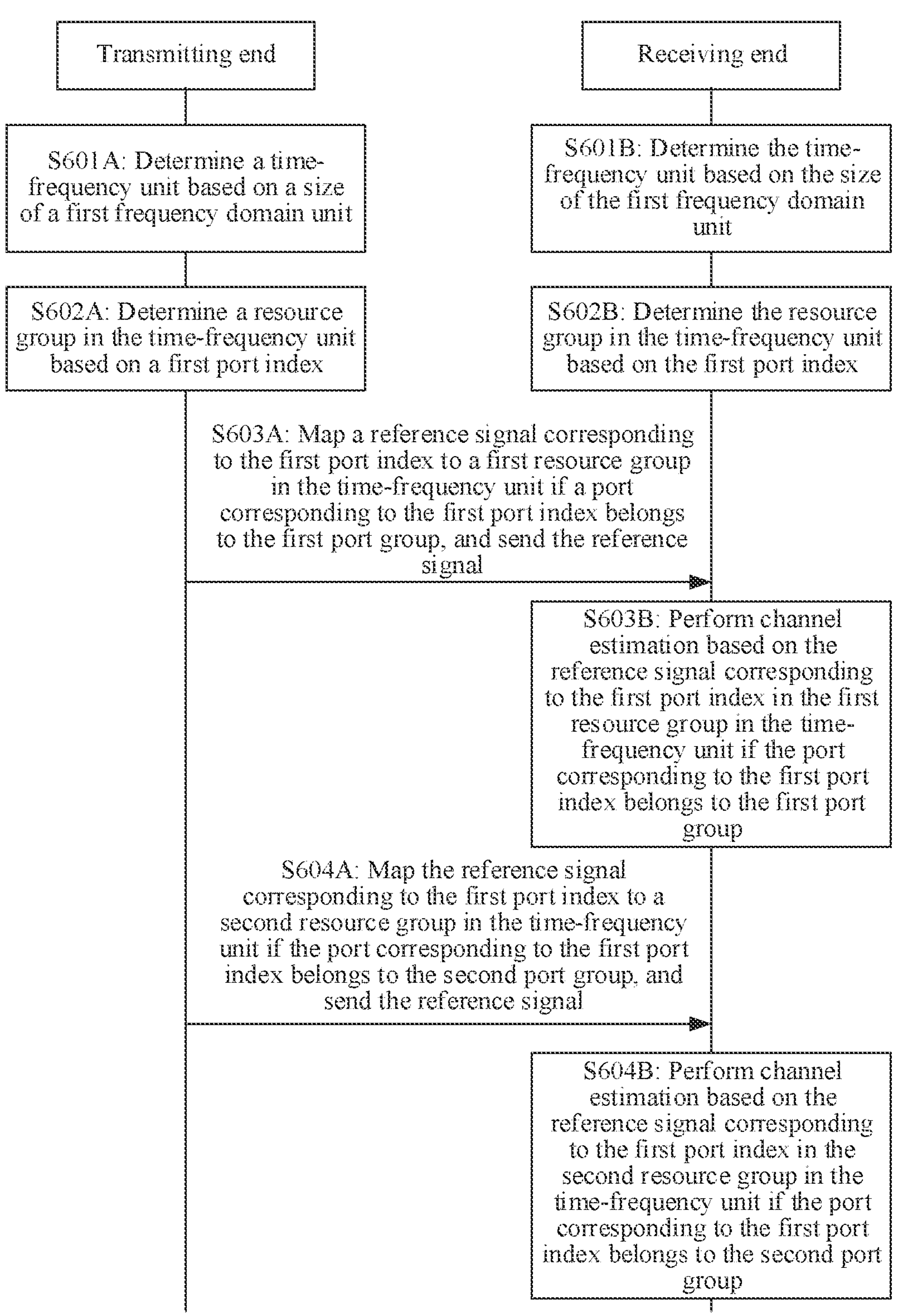
FIG. 6 is a schematic flowchart of a reference signal mapping method according to an embodiment of this application.

For example, FIG. 6 is a schematic flowchart of a reference signal mapping method according to an embodiment of this application. The method may be applied to the communication system shown in FIG. 5. As shown in FIG. 6, the reference signal mapping method includes the following steps.

S601A: A transmitting end determines a time-frequency unit based on a size of a first frequency domain unit.

S601B: A receiving end determines the time-frequency unit based on the size of the first frequency domain unit.

For example, the transmitting end and the receiving end each may be the terminal device or the network device shown in FIG. 5. For example, both the transmitting end and the receiving end are terminal devices. For another example, both the transmitting end and the receiving end are network devices. For still another example, the transmitting end is a terminal device, and the receiving end is a network device. For yet another example, the transmitting end is a network device, and the receiving end is a terminal device.

The first frequency domain unit may be a set of a plurality of contiguous resource blocks that use a same precoding matrix, that is, a PRG, or may be a preset frequency domain bandwidth length or a preset frequency domain sub-band size. The time-frequency unit may include one or more contiguous subcarriers in frequency domain, and may include one or more OFDM symbols in time domain. Alternatively, the time-frequency unit may include a plurality of consecutive resource elements (REs). The time-frequency unit is used to carry a corresponding reference signal. The transmitting end in S601A may map a sent reference signal symbol to the time-frequency unit according to a preset mapping rule. The receiving end in S601B may detect a received reference signal symbol in the time-frequency unit according to the preset mapping rule.

A size of the time-frequency unit is corresponding to the size of the first frequency domain unit, that is, corresponding to a size of the PRG.

For example, if the size of the first frequency domain unit is one RB, a frequency domain size of the time-frequency unit may be equal to one PRG. That is, the time-frequency unit occupies one RB in frequency domain. For another example, if the size of the first frequency domain unit is two RBs, four RBs, or complete scheduling bandwidth, the frequency domain size of the time-frequency unit may be one RB or two RBs. To be specific, the following correspondence exists between the size of the time-frequency unit and the size of the PRG: Frequency domain size of the time-frequency unit=1/n PRG, where n is a quotient of the size of the first frequency domain unit and the two RBs, and a value thereof is a positive integer, for example, n=1, 2, 3, . . . . For another example, if the size of the first frequency domain unit is six REs, the frequency domain size of the time-frequency unit is one RB. To be specific, the following correspondence exists between the frequency domain size of the time-frequency unit and the size of the PRG: Frequency domain size of the time-frequency unit=two PRGs.

In addition, the size of the time-frequency unit further includes a time domain size of the time-frequency unit, and the time domain size of the time-frequency unit may be represented by using a quantity of time units occupied by the time-frequency unit. The time unit may be one of the following: an OFDM symbol, a slot, a subframe, a radio frame (also referred to as a system frame or a data frame), a transmission time interval (TTI), or the like.

To be specific, a quantity of time-frequency resources included in the time-frequency unit may be determined based on the frequency domain size and the time domain size of the time-frequency unit. For example, the frequency domain size of the time-frequency unit is one RB, and the time domain size is one OFDM symbol: a single symbol. In this case, one time-frequency unit includes 12 REs in total. For another example, the frequency domain size of the time-frequency unit is one RB, and the time domain size is two OFDM symbols: double symbols. In this case, one time-frequency unit includes 24 REs in total. The RE may be a time-frequency resource corresponding to one OFDM symbol in time domain and one subcarrier in frequency domain.

It should be noted that the PRG may include one or more contiguous resource blocks (RBs), and may be used to represent a frequency domain granularity at which the network device or the terminal device performs precoding by using a same precoding matrix. For example, one PRG may be two RBs, four RBs, or full bandwidth. When sending data (for example, a PDSCH signal) and sending a demodulation reference signal (DMRS), the network device or the terminal device may precode all time-frequency resources included in one PRG by using a same precoding matrix.

Correspondingly, the terminal device detects the data and the demodulation reference signal assuming that the terminal device is corresponding to a same precoding matrix in a PRG. The terminal device may assume that a basic granularity of precoding performed by the network device is n contiguous RBs in frequency domain. A value of n may be {0.5, 2, 4, full bandwidth}. If the value of n is the full bandwidth, downlink data scheduling does not support scheduling of non-contiguous RBs. In addition, for a scheduled time-frequency resource, a precoding matrix and a precoding processing manner that are the same as those for the sent data and the demodulation reference signal may be used. If the value of n is 2 or 4, a bandwidth part (BWP) is divided into PRGs by using n contiguous RBs as a basic granularity, and each PRG may include one or more RBs. If the value of n is 0.5, the BWP is divided into PRGs by using frequency domain bandwidth corresponding to n contiguous RBs as a basic granularity, and each PRG may include six subcarriers in frequency domain.

In addition, one time-frequency unit may be used to represent a basic time-frequency resource granularity for performing time-frequency resource mapping on the reference signal. In other words, in one time-frequency unit, a pattern for performing time-frequency resource mapping on the reference signal is fixed. The scheduled time-frequency resource includes one or more time-frequency units, and a pattern for performing time-frequency resource mapping on the reference signal in any time-frequency unit is the same.

In addition, for any port, for example, a modulation symbol of a reference signal corresponding to a port corresponding to a first port index in S202A, may be mapped to one or more time-frequency units. A quantity of time-frequency units and a location of any time-frequency unit, for example, a frequency domain location and a time domain location, may be determined based on a size of the time-frequency unit. It is assumed that the complete scheduling bandwidth is B, the frequency domain size of the time-frequency unit is F subcarriers, the time domain size is L OFDM symbols, and a start symbol of the time-frequency unit is a $Q^{th}$ OFDM symbol in a subframe. In this case, a total quantity of time-frequency units is B/F. If B cannot be exactly divided by F, that is, B/F has a remainder, a round-up operation or a round-down operation is performed on B/F. That is, the total quantity of time-frequency units is $\lceil B/F \rceil$ or the total quantity of time-frequency units is $\lceil B/F \rceil$. A frequency domain location of an $x^{th}$ time-frequency unit may include a start subcarrier and an end subcarrier, where the start subcarrier is an $(x*F)^{th}$ subcarrier, and the end subcarrier is an $((x+1)*F-1)^{th}$ subcarrier. If L=1, that is, in a single symbol scenario, the time-frequency unit includes the $Q^{th}$ OFDM symbol in the subframe. If L=2, that is, in a double symbol scenario, the time-frequency unit includes the $Q^{th}$ OFDM symbol and the $(Q+1)^{th}$ OFDM symbol in the subframe. A value of x is 0, 1, . . . , and B/F−1, and a value of Q is 0, 1, . . . , and a total quantity of OFDM symbols included in the subframe−1.

It should be further noted that the size of the first frequency domain unit and the first port index may be determined based on higher layer signaling, or may be preconfigured. This is not specifically limited in this embodiment of this application.

S602A: The transmitting end determines a resource group in the time-frequency unit based on the first port index.

S602B: The receiving end determines the resource group in the time-frequency unit based on the first port index.

For example, the first port index may be a port number, the port corresponding to the first port index is used for transmission of the reference signal, and the resource group in the time-frequency unit is used to carry reference signals corresponding to different ports.

The first port index is used to determine a mapping rule of the reference signal and a port group to which the port corresponding to the first port index belongs, where the mapping rule is corresponding to the port group and one resource group in the time-frequency unit, and the port group includes one or more ports. Specifically, the port group may include a first port group, for example, a port group including a port index corresponding to a reference signal port supported by an existing protocol, and a second port group, for example, a port group including a port index corresponding to a new reference signal port. In addition, the port index included in the second port group is completely different from the port index included in the first port group. A resource group in a time-frequency unit includes a first resource group and a second resource group, where the first port group is corresponding to the first resource group, and the second port group is corresponding to the second resource group.

In a possible design scheme, if the first port index is less than a quantity of ports included in the first port group, the port corresponding to the first port index belongs to the first port group: or if the first port index is greater than or equal to a quantity of ports included in the first port group, the port corresponding to the first port index belongs to the second port group.

For example, it is assumed that port indexes included in the first port group are 0 to 3, and port indexes included in the second port group are 4 to 7. That is, the first port group and the second port group each include four ports. If the first port index is less than 4, the port corresponding to the first port index belongs to the first port group; or if the first port index is greater than or equal to 4, the port corresponding to the first port index belongs to the second port group.

In addition, one of the first port group and the second port group may be a port group specified in the existing protocol, namely, an existing port group, and the other may be a newly introduced port group, namely, a new port group. In addition, a time-frequency resource mapping rule corresponding to a port included in the existing port group is the same as a time-frequency resource mapping rule specified in the existing protocol, so that the reference signal mapping method in this embodiment of this application is compatible with the existing technology.

It should be noted that all or some of the port indexes included in the second port group may be greater than or less than the port indexes included in the first port group. Values of the port indexes included in the first port group and second port group are not specifically limited in this embodiment of this application.

For a same time-frequency unit, the first resource group and the second resource group meet one of the following conditions:

Condition 1: A time-frequency resource included in the second resource group is a non-empty subset of a time-frequency resource included in the first resource group.

To be specific, the time-frequency resource included in the second resource group may be a part of the time-frequency resource included in the first resource group, or the time-frequency resource included in the second resource group may be the same as the time-frequency resource included in the first resource group.

Condition 2: A time-frequency resource included in the second resource group does not overlap with a time-frequency resource included in the first resource group.

To be specific, any time-frequency resource in the second resource group does not belong to the first resource group, and any time-frequency resource in the first resource group does not belong to the second resource group. That is, the second resource group and the first resource group are mutually exclusive.

Optionally, the transmitting end in S602A may map, according to the mapping rule corresponding to the port group and the resource group, the reference signal to the time-frequency unit in the port corresponding to the first port index, that is, perform S603A or S604A.

S603A: The transmitting end maps the reference signal corresponding to the first port index to the first resource group in the time-frequency unit if the port corresponding to the first port index belongs to the first port group, and sends the reference signal.

S604A: The transmitting end maps the reference signal corresponding to the first port index to the second resource group in the time-frequency unit if the port corresponding to the first port index belongs to the second port group, and sends the reference signal.

A port index included in the second port group is completely different from a port index included in the first port group.

For example, the first port group may be the port group supported by the existing technology, namely, the existing port group, and the second port group may be an extended port group, namely, the new port group. The port index included in the existing port group is different from the port index included in the new port group. Both the time-frequency resource in the first resource group and the time-frequency resource in the second resource group are time-frequency resources in the time-frequency unit, a correspondence exists between the first resource group and the first port group, and a correspondence exists between the second resource group and the second port group.

Optionally, the receiving end in S602A may detect, according to the mapping rule corresponding to the port group and the resource group, the reference signal in the time-frequency unit in the port corresponding to the first port index, that is, perform S603B or S604B.

S603B: The receiving end performs channel estimation based on the reference signal that is corresponding to the first port index and that is in the first resource group in the time-frequency unit if the port corresponding to the first port index belongs to the first port group.

S604B: The receiving end performs channel estimation based on the reference signal that is corresponding to the first port index and that is in the second resource group in the time-frequency unit if the port corresponding to the first port index belongs to the second port group.

Based on the reference signal mapping method shown in FIG. 6, the time-frequency unit may be determined based on the size of the first frequency domain unit, and the resource group in the time-frequency unit and the port group to which the port corresponding to the first port index belongs are determined based on the first port index. Then, the mapping rule of the reference signal in the resource group is determined, and the reference signal corresponding to the first port index is mapped to the time-frequency resource in the resource group according to the mapping rule. Specifically, the reference signal corresponding to the first port index is mapped to the first resource group in the time-frequency unit if the port corresponding to the first port index belongs to the first port group. Similarly, the reference signal corresponding to the first port index is mapped to the second resource group in the time-frequency unit if the port corresponding to the first port index belongs to the first port group. The port index included in the first port group is completely different from the port index included in the second port group, so that more ports and more transmitted streams are supported without increasing a quantity of time-frequency resources or limitedly increasing the quantity of time-frequency resources. This can resolve a problem that a quantity of supported ports and a quantity of supported transmitted streams are excessively small due to an existing reference signal mapping rule in which a fixed quantity of time-frequency resources are used for mapping, so that a quantity of transmitted streams that can be paired between users is increased, and performance and a system capacity of a MIMO system are effectively improved.

With reference to several scenarios and examples shown in FIG. 7 to FIG. 22, the following describes in detail specific implementation of the reference signal mapping method shown in FIG. 6 when a mapping type of the reference signal is type 1.

In a possible design scheme, embodiments of this application provide three mapping rules: a mapping rule 1, a mapping rule 2, and a mapping rule 3, applicable to Scenario 1: A mapping type of the reference signal is a mapping type 1, and the size of the first frequency domain unit is one resource block RB. The frequency domain size of the time-frequency unit is one RB (a total of 12 contiguous subcarriers, denoted as subcarrier 0 to subcarrier 11), the time domain size of the time-frequency unit is one time unit, the first port group includes four ports, and the second port group includes four ports. The first frequency domain unit may be a PRG, and the time unit may be an OFDM symbol.

For example, if there is one time-frequency unit, indexes of 12 contiguous subcarriers may be subcarrier 0 to subcarrier 11; or if there are a plurality of time-frequency units, for an $c^{th}$ time-frequency unit, indexes of 12 contiguous subcarriers may be subcarrier $c_0+(c-1)*12$ to subcarrier $c_0+(c-1)*12+11$, where $c_0$ is an index of the $1^{st}$ subcarrier of the $1^{st}$ time-frequency unit in the plurality of time-frequency units, and c is a positive integer. For one time-frequency unit, an index of one time unit may be an OFDM symbol $l_0$. If there are a plurality of time-frequency units, for a $d^{th}$ time-frequency unit, an index of one time unit may be an OFDM symbol $l_0+\Delta l_d-1$, where $l_0$ is an index of a time unit corresponding to the $1^{st}$ time-frequency unit in the plurality of time-frequency units, and d is a positive integer. $\Delta l_d$ is an integer greater than or equal to 0, and represents an offset in time domain relative to the time unit corresponding to the $1^{st}$ time-frequency unit. The first port group may include port 0 to port 3, and the second port group may include port 4 to port 7.

Figure 7:
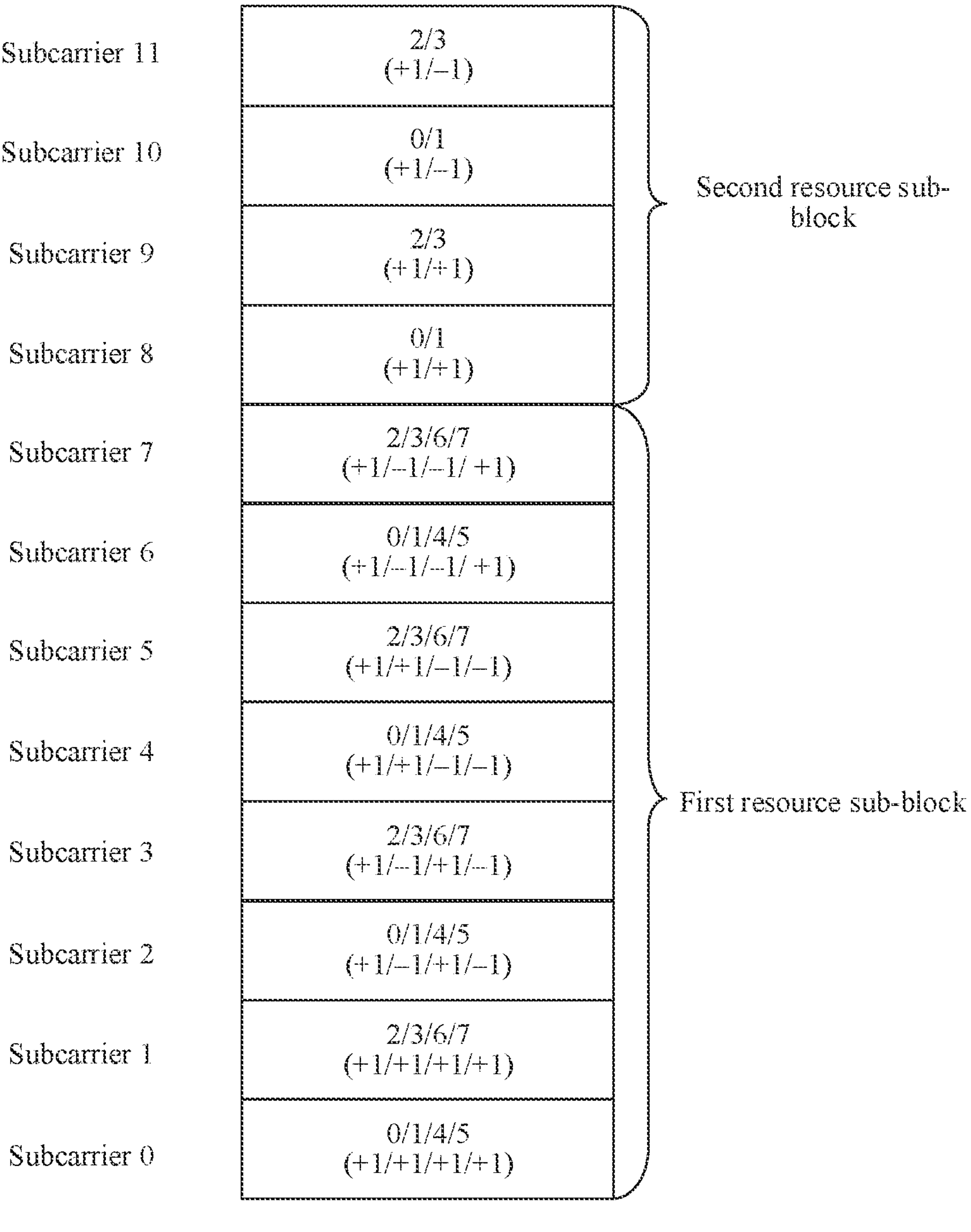
FIG. 7 is an example diagram 1 of a mapping rule according to an embodiment of this application.

The following specifically describes the mapping rules applicable to Scenario 1. FIG. 7 is an example diagram 1 of a mapping rule according to an embodiment of this application, FIG. 8 is an example diagram 2 of a mapping rule according to an embodiment of this application, and FIG. 9 is an example diagram 3 of a mapping rule according to an embodiment of this application.

Figure 8:
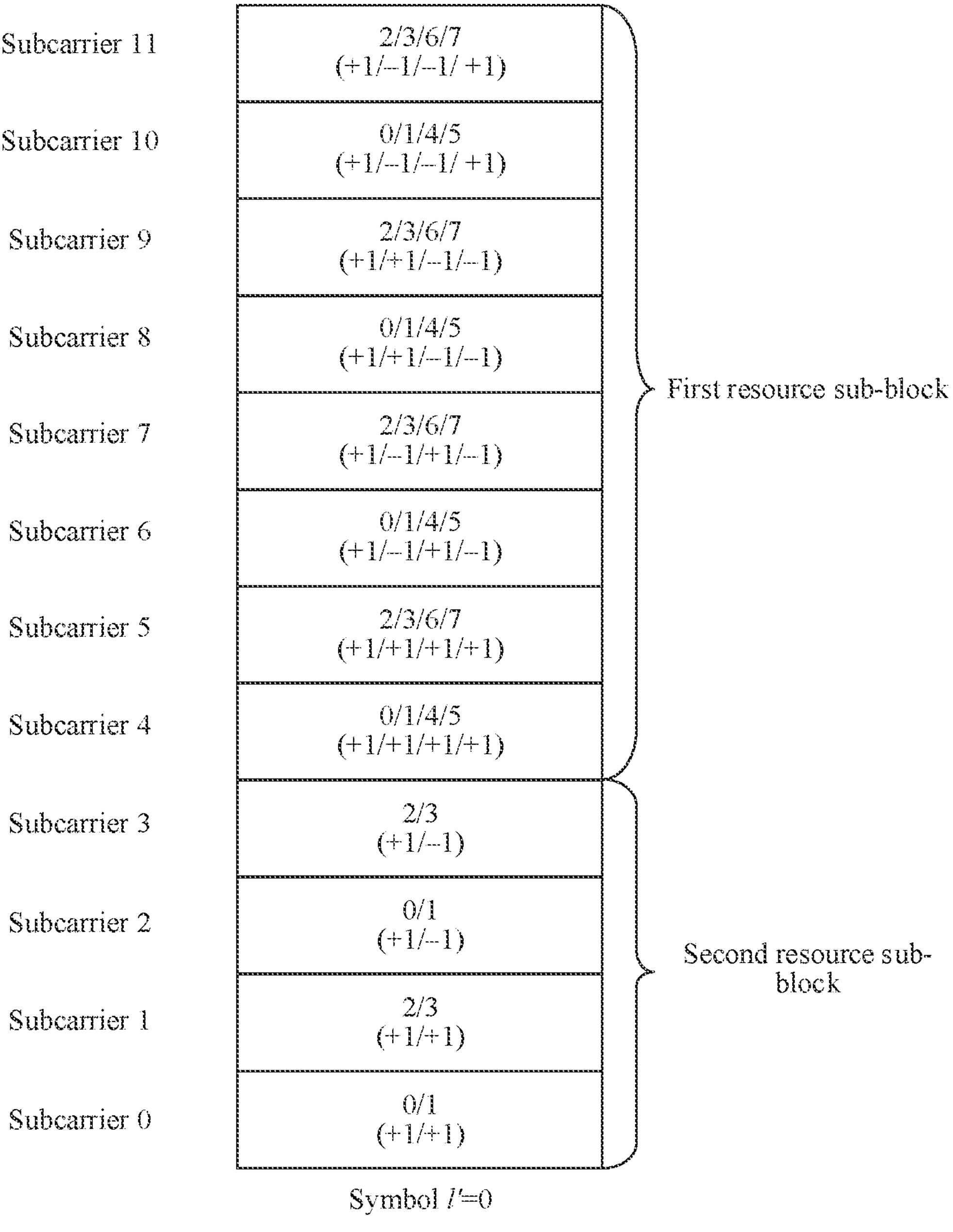
FIG. 8 is an example diagram 2 of a mapping rule according to an embodiment of this application.
Figure 9:
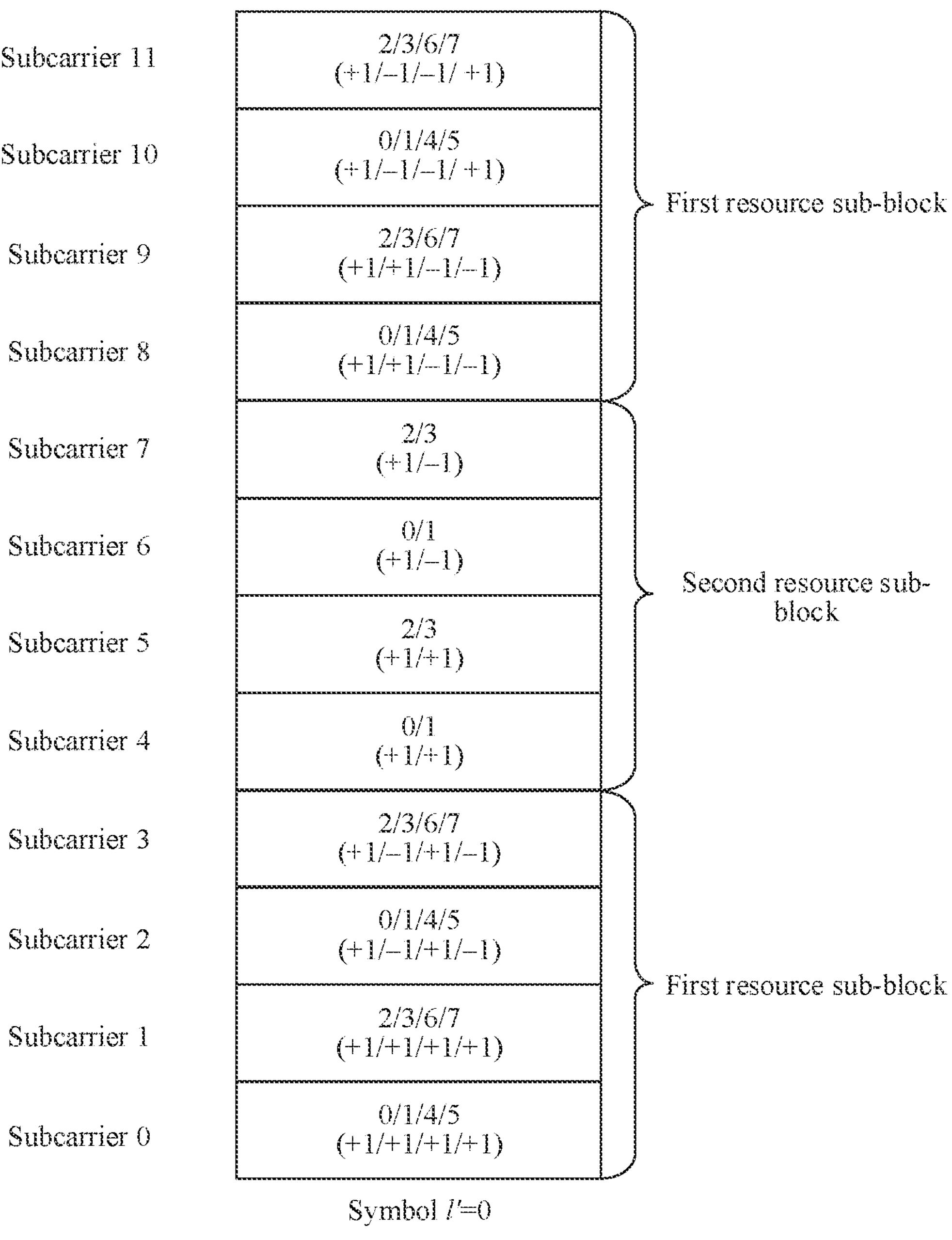
FIG. 9 is an example diagram 3 of a mapping rule according to an embodiment of this application.

As shown in any one of FIG. 7 to FIG. 9, the first resource group may include a first resource sub-block and a second resource sub-block, and the second resource group may include the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. That is, the first resource group and the second resource group meet Condition 1.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a first cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a first cover code element corresponding to the reference signal.

The first cover code element is an element in a first orthogonal cover code sequence, each port in the first port group is corresponding to one first orthogonal cover code sequence, and each port in the first port group is corresponding to one first cover code element on each RE in the first RE set included in the first resource group.

For example, the reference sequence element is an element in a reference sequence corresponding to the reference signal, the first orthogonal cover code sequence is a sequence in a first orthogonal cover code sequence set, and the first orthogonal cover code sequence set is corresponding to one port in the first port group. The first resource group may include one or more first RE sets. In the mapping type 1, the first RE set may be a set including a plurality of REs that are in the first resource group and that have a fixed interval between each other in frequency domain. In the first resource group, REs included in different first RE sets do not overlap, and one port in the first port group is corresponding to one orthogonal cover code sequence in a first RE set. During channel estimation, joint despreading or joint channel estimation may be performed on reference signals in the first RE set.

For example, refer to FIG. 7 to FIG. 9. The first RE set may be an RE set including REs corresponding to subcarrier 0 and subcarrier 2 in symbol l'=0, an RE set including REs corresponding to subcarrier 4 and subcarrier 6 in symbol l'=0, or an RE set including REs corresponding to subcarrier 1 and subcarrier 3 in symbol l'=0. That is, any two adjacent REs in a same first RE set are spaced by one subcarrier in frequency domain. In this case, the reference sequence element is multiplied by the corresponding first cover code element, and the product is mapped to the corresponding first RE set. This can ensure that ports in the first port group are orthogonal in a transmission process, and reduce signal transmission interference.

It should be noted that one first RE set is corresponding to one first orthogonal cover code sequence. In this case, a quantity of subcarriers in the first RE set or a quantity of REs included in the first RE set may be determined based on a length of the first orthogonal cover code sequence. For example, if the length of the first orthogonal cover code sequence is 2, the first RE set may include two subcarriers, or the first RE set may include two REs.

In addition, for an RE corresponding to subcarrier 0, subcarrier 2, subcarrier 4, or subcarrier 6, a port group that includes ports of reference signals mapped to the foregoing time-frequency resources is referred to as a CDM group. In addition, for an RE corresponding to subcarrier 1, subcarrier 3, subcarrier 5, or subcarrier 7, a port group that includes ports of reference signals mapped to the foregoing time-frequency resources is referred to as a CDM group. Reference signal symbols sent through corresponding reference signal ports included in a same CDM group occupy a same RE. Reference signal symbols sent through corresponding reference signal ports included in a same CDM group occupy a same first RE set.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and a second cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a second cover code element corresponding to the reference signal.

The second cover code element is an element in a second orthogonal cover code sequence, each port in the second port group is corresponding to one second orthogonal cover code sequence, and each port in the second port group is corresponding to one second cover code element on each RE in the second RE set included in the second resource group.

For example, the second orthogonal cover code sequence is a sequence in a second orthogonal cover code sequence set, and one second orthogonal cover code sequence set is corresponding to one port in the second port group. The second resource group may include one or more second RE sets, and the second RE set may be a set of a plurality of subcarriers that are in the second resource group and that have a fixed spacing between each other in frequency domain. For example, refer to FIG. 7. The second RE set may be an RE set including REs corresponding to subcarrier 0, subcarrier 2, subcarrier 4, and subcarrier 6 in symbol l'=0, or an RE set including REs corresponding to subcarrier 1, subcarrier 3, subcarrier 5, and subcarrier 7 in symbol l'=0. For example, refer to FIG. 8. The second RE set may be an RE set including REs corresponding to subcarrier 4, subcarrier 6, subcarrier 8, and subcarrier 10 in symbol l'=0, or an RE set including REs corresponding to subcarrier 5, subcarrier 7, subcarrier 9, and subcarrier 11 in symbol l'=0. That is, any two adjacent subcarriers in a same first RE set are spaced by one subcarrier in frequency domain. Refer to FIG. 9. The second RE set may be an RE set including REs corresponding to subcarrier 0, subcarrier 2, subcarrier 8, and subcarrier 10 in symbol l'=0, or an RE set including REs corresponding to subcarrier 1, subcarrier 3, subcarrier 9, and subcarrier 11 in symbol l'=0. For a specific implementation of the port group including the reference signal ports in the time-frequency resource, refer to S603A. Details are not described herein again.

In this case, the reference sequence element is multiplied by the corresponding second cover code element, and the product is mapped to the corresponding second RE set. This can ensure that ports in the second port group are orthogonal in a transmission process, and reduce signal transmission interference. In this case, in a scenario in which the size of the first frequency domain unit is one RB, compared with the mapping rule A in FIG. 1, in this embodiment of this application, a port group may be extended in some time-frequency resources in the time-frequency unit, that is, the second port group is added, so that the quantity of supported transmitted streams is increased and the performance of the MIMO system is improved.

Further, the first cover code element is a product of a first frequency domain cover code sub-element and a first time domain cover code sub-element, and the second cover code element is a product of a second frequency domain cover code sub-element and a second time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, a length of the first orthogonal cover code sequence is 2, and a length of the second orthogonal cover code sequence is 4.

For example, the first orthogonal cover code sequence is used to ensure orthogonality of ports in the first port group, and the second orthogonal cover code sequence is used to ensure orthogonality of ports in the second port group. Because the ports in the second port group and some of the ports in the first port group are located in a same RE, the length of the second orthogonal cover code sequence corresponding to the second port group is greater than the length of the first orthogonal cover code sequence corresponding to the first port group. For example, port 0 in the first port group may be corresponding to a first orthogonal cover code sequence whose length is 2, for example, +1/+1. Port 4 in the second port group may be corresponding to a second orthogonal cover code sequence whose length is 4, for example, +1/+1/−1/−1.

The first orthogonal cover code sequence may be selected from a preset orthogonal cover code sequence set. To be specific, the first orthogonal cover code sequence may be a vector or a sequence in the preset orthogonal cover code sequence set. The orthogonal cover code sequence set may be a Walsh sequence set whose sequence length is 2. In an implementation, the orthogonal cover code sequence set may be $$\left\{\begin{pmatrix}+1\\+1\end{pmatrix},\begin{pmatrix}+1\\-1\end{pmatrix}\right\}.$$

Similarly, the second orthogonal cover code sequence may also be selected from a preset orthogonal cover code sequence set. To be specific, the second orthogonal cover code sequence may be a vector or a sequence in the preset orthogonal cover code sequence set. The orthogonal cover code sequence set may be a Walsh sequence set whose sequence length is 4. In an implementation, the orthogonal cover code sequence set may be $$\left\{\begin{pmatrix}+1\\+1\\+1\\+1\end{pmatrix},\begin{pmatrix}+1\\-1\\+1\\-1\end{pmatrix},\begin{pmatrix}+1\\+1\\-1\\-1\end{pmatrix},\begin{pmatrix}+1\\-1\\-1\\+1\end{pmatrix}\right\}.$$

It should be noted that ports in the first port group and the second port group, for example, port 0 to port 7, may be divided into two code division multiplexing groups, where a CDM group 1 includes ports 0/1/4/5, and a CDM group 2 includes ports 2/3/6/7. Reference signal symbols sent through corresponding different ports included in a CDM group occupy a same time-frequency resource. Ports in the CDM group are distinguished by using an orthogonal cover code (OCC), to ensure orthogonality of the ports in the CDM group, so that interference between DMRS symbols transmitted through different antenna ports is suppressed. An example in which the time-frequency unit is one RB is used for description. Ports 0/1/4/5 may be located in a same RE, and are distinguished by using a group of OCC codes, for example, +1/+/+1/+1/−1/+1/−1, +1/+1/−1/−1 and +1/−1/−1/+1. This may indicate that a reference signal port group included in one CDM group is corresponding to all orthogonal cover code sequences included in one OCC group.

It should be further noted that, for the reference signal ports in the first port group and the second port group, an orthogonal cover code sequence corresponding to each port may be further determined. For example, the first orthogonal cover code sequence corresponding to port 0 in the first port group is {+1, +1}. In the first RE set, port 0 sends corresponding reference signal sequence elements on the two REs in the first RE set, and port 0 is respectively corresponding to the orthogonal cover code sequence elements +1 and +1 on the two REs. The two REs in the first RE set may be REs corresponding to subcarrier 0 and subcarrier 2 in symbol l'=0.

Similarly, a second orthogonal cover code sequence corresponding to port 4 in the second port group is {+1, +1, −1, −1}. In the second RE set, port 4 sends corresponding reference signal sequence elements on four REs in the second RE set, and port 4 is respectively corresponding to the orthogonal cover code sequence elements +1, +1, −1, and −1 on the four REs. The four REs in the second RE set may be REs corresponding to subcarrier 0, subcarrier 2, subcarrier 4, and subcarrier 6 in symbol l'=0 shown in FIG. 7, REs corresponding to subcarrier 4, subcarrier 6, subcarrier 8, and subcarrier 10 in symbol l'=0 shown in FIG. 8, or REs corresponding to subcarrier 0, subcarrier 2, subcarrier 8, and subcarrier 10 in symbol l'=0 shown in FIG. 9.

In addition, the first orthogonal cover code sequence and the second orthogonal cover code sequence are corresponding to a same OCC group. For example, port 0 and port 4 each occupy two same REs, and in the two REs, orthogonal cover code sequences corresponding to port 0 and port 4 are both +1 and +1.

The second RE set may include two first RE sets. For example, refer to FIG. 7. The second RE set may be a set of REs corresponding to subcarrier 0, subcarrier 2, subcarrier 4, and subcarrier 6 in symbol l'=0, a first RE set 1 may be a set of the REs corresponding to subcarrier 0 and subcarrier 2 in symbol l'=0, and a first RE set 2 may be a set of the REs corresponding to subcarrier 4 and subcarrier 6 in symbol l'=0. Correspondingly, the second RE set may include the two first RE sets.

Further, it is assumed that the first port group includes port 0 to port 3, the second port group includes port 4 to port 7, the CDM group 1 includes ports 0/1/4/5, and the CDM group 2 includes ports 2/3/6/7. In this case, the first port group is corresponding to the first two ports in the CDM group 1 and the CDM group 2, and the second port group is corresponding to the last two ports in the CDM group 1 and the CDM group 2.

Optionally, the time-frequency unit may include subcarrier 0 to subcarrier 11 in frequency domain. According to the mapping rule 1 shown in FIG. 7, the first resource sub-block may include subcarrier 0 to subcarrier 7 in the time-frequency unit in frequency domain, and the second resource sub-block includes subcarrier 8 to subcarrier 11 in the time-frequency unit in frequency domain.

Therefore, the first resource group may include subcarrier 0 to subcarrier 11 in the time-frequency unit in frequency domain, and the second resource group may include subcarrier 0 to subcarrier 7 in the time-frequency unit in frequency domain. In this case, based on FIG. 7, the transmitting end may map the product of the reference sequence element corresponding to the first port group and the first cover code element corresponding to the reference signal to the first RE set included in the first resource group, and send the product; and may map the product of the reference sequence element corresponding to the second port group and the second cover code element corresponding to the reference signal to the second RE set included in the second resource group and send the product. Based on FIG. 7, the receiving end may detect, in the first RE set included in the first resource group, the product of the reference sequence element and the first cover code element corresponding to the reference signal; and detect, in the second RE set included in the second resource group, the product of the reference sequence element and the second cover code element corresponding to the reference signal.

During specific implementation, the mapping rules may be implemented by using a mapping pattern, a formula, a table or in another manner. The following describes the mapping rule by using the formula and the table.

An embodiment of this application provides a formula and a table applicable to Scenario 1, to describe the mapping rule 1 shown in FIG. 7. The reference signal is a demodulation reference signal DMRS, and the time unit is an orthogonal frequency division multiplexing OFDM symbol.

In the mapping rule 1, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 1 meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 0, 1, 2, 3, & p \in [1004, 1007] \end{cases};$$

$$l = \bar{l} + l';$$

$$n = 0, 1, \ldots \text{ ; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

For example, k' may be used to set a resource group corresponding to port p in the time-frequency unit in the mapping rule 1. The DMRS modulation symbol may be a symbol that needs to be transmitted through port p. The symbol index $\bar{l}$ may be used to represent a start location of the time-frequency unit in a corresponding slot in time domain. l' may be used to represent a quantity of OFDM symbols occupied by the time-frequency unit in the slot. The subcarrier offset factor Δ may be used to represent a start location of a corresponding CDM group in frequency domain in the time-frequency unit, and the subcarrier offset factor Δ may be a subcarrier index of the $1^{st}$ subcarrier occupied by each CDM group in the time-frequency unit.

It should be further noted that, in this embodiment of this application, the $k^{th}$ subcarrier is a subcarrier whose subcarrier index is k, the $l^{th}$ OFDM symbol is an OFDM symbol whose symbol index is 1, and the $m^{th}$ reference sequence element r(m) is a reference sequence element whose index is m.

Therefore, according to the formula in the mapping rule 1, the transmitting end may determine, by using the first port index p, the time domain cover code sub-element $w_t(l')$ and the frequency domain cover code sub-element $w_f(k')$ that are corresponding to the reference sequence element r(m), to map a product of the reference sequence element r(m) and corresponding time domain cover code sub-element $w_t(l')$ and frequency domain cover code sub-element $w_f(k')$ to the RE whose index is $(k, l)_{p,\mu}$. Correspondingly, the receiving end may detect, by using the first port index p, the product of the reference sequence element r(m) and the corresponding time domain cover code sub-element $w_t(l')$ and frequency domain cover code sub-element $w_f(k')$ in the RE whose index is $(k, l)_{p,\mu}$, to determine the corresponding reference sequence element r(m) based on the time domain cover code sub-element and the frequency domain cover code sub-element $w_f(k')$.

Optionally, values of $w_f(k')$, $w_t(l')$, and Δ corresponding to port p may be determined based on Table 1. Table 1 is a correspondence table 1 between ports and cover code sub-elements provided in this embodiment of this application.

TABLE 1

| | | | $w_f$(k') | | | | | | $w_t$(l') |
|---|---|---|---|---|---|---|---|---|---|
| p | λ | Δ | k' = 0 | k' = 1 | k' = 2 | k' = 3 | k' = 4 | k' = 5 | l' = 0 |
| 1000 | 0 | 0 | +1 | +1 | +1 | +1 | +1 | +1 | +1 |
| 1001 | 0 | 0 | +1 | −1 | +1 | −1 | +1 | −1 | +1 |
| 1002 | 1 | 1 | +1 | +1 | +1 | +1 | +1 | +1 | +1 |
| 1003 | 1 | 1 | +1 | −1 | +1 | −1 | +1 | −1 | +1 |
| 1004 | 0 | 0 | +1 | +1 | −1 | −1 | | | +1 |
| 1005 | 0 | 0 | +1 | −1 | −1 | +1 | | | +1 |
| 1006 | 1 | 1 | +1 | +1 | −1 | −1 | | | +1 |
| 1007 | 1 | 1 | +1 | −1 | −1 | +1 | | | +1 |

λ is an index of an orthogonal multiplexing group to which port p belongs, and ports in a same orthogonal multiplexing group occupy a same time-frequency resource.

For example, the orthogonal multiplexing group to which port p belongs may be the foregoing CDM group, so that the index λ may be used to represent the CDM group to which port p belongs. A plurality of ports in a same CDM group occupy a same time-frequency resource. For example, ports 0/1/4/5 that belong to a same CDM group may occupy a same time-frequency resource, for example, subcarrier 0, subcarrier 2, subcarrier 4, and subcarrier 6 that are corresponding to OFDM symbol 0.

Specifically, the frequency domain cover code sub-element, the time domain cover code sub-element, and the subcarrier offset factor that are corresponding to the port may be quickly determined based on Table 1. For example, if port p is 1005, by querying information corresponding to port 1005 in Table 1, namely, the 6 row in the table, it may be determined that the index of the orthogonal multiplexing group to which port 1005 belongs is 0, the subcarrier offset factor Δ is 0, and a value of k' may be 0, 1, 2, or 3, to determine a time domain cover code sub-element $w_t(l')$ and frequency domain cover code sub-elements $w_f(k')$ corresponding to different values of k'. For example, a value of the time domain cover code sub-element $w_t(l')$ corresponding to port p of 1005 is +1; and when the value of k' is 0, the value of the frequency domain cover code sub-element $w_f(k')$ is +1; when the value of k' is 1, the value of the frequency domain cover code sub-element $w_f(k')$ is −1: when the value of k' is 2, the value of the frequency domain cover code sub-element $w_f(k')$ is −1; or when the value of k' is 3, the value of the frequency domain cover code sub-element $w_f(k')$ is +1.

Optionally, the time-frequency unit may include subcarrier 0 to subcarrier 11 in frequency domain. According to the mapping rule 2 shown in FIG. 8, the first resource sub-block includes subcarrier 4 to subcarrier 11 in the time-frequency unit in frequency domain, and the second resource sub-block includes subcarrier 0 to subcarrier 3 in the time-frequency unit in frequency domain. For specific implementations of the first resource sub-block and the second resource sub-block in the mapping rule 2, refer to the mapping rule 1 shown in FIG. 7. Details are not described herein again.

In a specific implementation process, an embodiment of this application provides a formula and a table applicable to Scenario 1, to describe the mapping rule 2 shown in FIG. 8. The reference signal is a demodulation reference signal DMRS, and the time unit is an orthogonal frequency division multiplexing OFDM symbol.

In the mapping rule 2, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 2 may alternatively meet:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1003] \\ 2, 3, 4, 5, & p \in [1004, 1007] \end{cases};$$

$$l = \bar{l} + l';$$

$$n = 0, 1, \ldots ; \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 2, refer to the formula of the mapping rule 1. Details are not described herein again.

Optionally, values of $w_f(k')$, $w_t(l')$, and Δ corresponding to port p may be determined based on Table 2. Table 2 is a correspondence table 2 between ports and cover code sub-elements provided in this embodiment of this application.

λ is an index of an orthogonal multiplexing group to which port p belongs, and ports in a same orthogonal multiplexing group occupy a same time-frequency resource.

For a specific implementation of the table in the mapping rule 2, refer to the table in the mapping rule 1. Details are not described herein again.

TABLE 2

| | | | $w_f(k')$ | | | | | | $w_t(l')$ |
|---|---|---|---|---|---|---|---|---|---|
| p | λ | Δ | k' = 0 | k' = 1 | k' = 2 | k' = 3 | k' = 4 | k' = 5 | l' = 0 |
| 1000 | 0 | 0 | +1 | +1 | +1 | +1 | +1 | +1 | +1 |
| 1001 | 0 | 0 | +1 | −1 | +1 | −1 | +1 | −1 | +1 |
| 1002 | 1 | 1 | +1 | +1 | +1 | +1 | +1 | +1 | +1 |
| 1003 | 1 | 1 | +1 | −1 | +1 | −1 | +1 | −1 | +1 |
| 1004 | 0 | 0 | | | +1 | +1 | −1 | −1 | +1 |
| 1005 | 0 | 0 | | | +1 | −1 | −1 | +1 | +1 |
| 1006 | 1 | 1 | | | +1 | +1 | −1 | −1 | +1 |
| 1007 | 1 | 1 | | | +1 | −1 | −1 | +1 | +1 |

Optionally, the time-frequency unit may include subcarrier 0 to subcarrier 11 in frequency domain. According to the mapping rule 3 shown in FIG. 9, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain. For specific implementations of the first resource sub-block and the second resource sub-block in the mapping rule 3, refer to the mapping rule 1 shown in FIG. 7. Details are not described herein again.

In a specific implementation process, an embodiment of this application provides a formula and a table applicable to Scenario 1, to describe the mapping rule 3 shown in FIG. 9. This is further applicable to a scenario in which the reference signal is a demodulation reference signal DMRS, and the time unit is an orthogonal frequency division multiplexing OFDM symbol.

In the mapping rule 3, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 3 may alternatively meet:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1003] \\ 0, 1, 4, 5, & p \in [1004, 1007] \end{cases};$$

$$l = \bar{l} + l';$$

$$n = 0, 1, \ldots ; \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $\beta_{PDSCH}^{DMRS}$ is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 3, refer to the formula of the mapping rule 1. Details are not described herein again.

Optionally, values of $w_f(k')$, $w_t(l')$, and Δ corresponding to port p may be determined based on Table 3. Table 3 is a correspondence table 3 between ports and cover code sub-elements provided in this embodiment of this application.

λ is an index of an orthogonal multiplexing group to which port p belongs, and ports in a same orthogonal multiplexing group occupy a same time-frequency resource. For a specific implementation of the table in the mapping rule 3, refer to the table in the mapping rule 1. Details are not described herein again.

TABLE 3

| | | | $w_f(k')$ | | | | | | $w_t(l')$ |
|---|---|---|---|---|---|---|---|---|---|
| p | λ | Δ | k' = 0 | k' = 1 | k' = 2 | k' = 3 | k' = 4 | k' = 5 | l' = 0 |
| 1000 | 0 | 0 | +1 | +1 | +1 | +1 | +1 | +1 | +1 |
| 1001 | 0 | 0 | +1 | −1 | +1 | −1 | +1 | −1 | +1 |
| 1002 | 1 | 1 | +1 | +1 | +1 | +1 | +1 | +1 | +1 |
| 1003 | 1 | 1 | +1 | −1 | +1 | −1 | +1 | −1 | +1 |
| 1004 | 0 | 0 | +1 | +1 | | | −1 | −1 | +1 |
| 1005 | 0 | 0 | +1 | −1 | | | −1 | +1 | +1 |
| 1006 | 1 | 1 | +1 | +1 | | | −1 | −1 | +1 |
| 1007 | 1 | 1 | +1 | −1 | | | −1 | +1 | +1 |

In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$, to improve DMRS mapping efficiency.

In another possible design scheme, embodiments of this application further provide three mapping rules: a mapping rule 4, a mapping rule 5, and a mapping rule 6, applicable to Scenario 2: A mapping type of the reference signal is a mapping type 1, and the size of the first frequency domain unit is one resource block RB. A frequency domain size of the time-frequency unit may be one RB (a total of 12 contiguous subcarriers, denoted as subcarrier 0 to subcarrier 11), a time domain size of the time-frequency unit may be two time units, the first port group may include eight ports, and the second port group may include eight ports. The first frequency domain unit may be a PRG, and the time unit may be an OFDM symbol.

For example, in frequency domain, if there is one time-frequency unit, indexes of the 12 contiguous subcarriers may be subcarrier 0 to subcarrier 11: or if there are a plurality of time-frequency units, for an $c^{th}$ time-frequency unit, indexes of the 12 contiguous subcarriers may be subcarrier $c_0+(c-1)*12$ to subcarrier $c_0+(c-1)*12+11$. $c_0$ is an index of the $1^{st}$ subcarrier of the first time-frequency unit in the plurality of time-frequency units, and c is a positive integer. In time domain, for one time-frequency unit, indexes of the two time units may be OFDM symbol 0 and OFDM symbol 1. For one time-frequency unit, an index of one time unit may be a symbol $l_0$. If there are a plurality of time-frequency units, for a $1^{st}$ time-frequency unit, indexes of two time units may be OFDM symbols $l_0+\Delta l_d-1$ and $l_0+\Delta l_d$. $l_0$ is an index of a time unit corresponding to the $1^{st}$ time-frequency unit in the plurality of time-frequency units, and d is a positive integer. $\Delta l_d$ is an integer greater than or equal to 0, and represents an offset in time domain relative to a time unit corresponding to the $1^{st}$ time-frequency unit. The first port group may include port 0 to port 7, and the second port group may include port 8 to port 15.

The following specifically describes the mapping rules applicable to Scenario 2. FIG. 10 is an example diagram 4 of a mapping rule according to an embodiment of this application, FIG. 11 is an example diagram 5 of a mapping rule according to an embodiment of this application, and FIG. 12 is an example diagram 6 of a mapping rule according to an embodiment of this application.

As shown in any one of FIG. 10 to FIG. 12, the first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. That is, the first resource group and the second resource group meet Condition 1.

For example, the first resource sub-block and the second resource sub-block each may include two symbols in time domain. As shown in FIG. 10 to FIG. 12, the first resource sub-block and the second resource sub-block each may include symbol 0 and symbol 1.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a third cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a third cover code element corresponding to the reference signal.

The third cover code element is an element in a third orthogonal cover code sequence, each port in the first port group is corresponding to one third orthogonal cover code sequence, and each port in the first port group is corresponding to one third cover code element on each RE in the first RE set included in the first resource group.

For example, the third orthogonal cover code sequence is a sequence in a third orthogonal cover code sequence set, and one third orthogonal cover code sequence set is corresponding to one port in the first port group. The first resource group may include one or more first RE sets, and the first RE set may be a set including a plurality of REs that have a fixed interval between each other in frequency domain and that are consecutive in time domain. For a specific implementation of the first RE set, refer to Scenario 1. Details are not described herein again.

For example, refer to FIG. 10 to FIG. 12. The first RE set may be an RE set including REs corresponding to subcarrier 0 and subcarrier 2 in symbol l'=0 and symbol l'=1, an RE set including REs corresponding to subcarrier 4 and subcarrier 6 in symbol l'=0 and symbol l'=1, or an RE set including REs corresponding to subcarrier 1 and subcarrier 3 in symbol l'=0 and symbol l'=1. In this case, the reference sequence element is multiplied by the corresponding third cover code element, and the product is mapped to the corresponding first RE set. This can ensure that ports in the first port group are orthogonal in a transmission process, and reduce signal transmission interference.

In addition, for REs corresponding to subcarrier 0, subcarrier 2, subcarrier 4, and subcarrier 6 in symbol l'=0 and symbol l'=1, a port group that includes ports of reference signals mapped to the foregoing time-frequency resources is referred to as a CDM group. For REs corresponding to subcarrier 1, subcarrier 3, subcarrier 5, and subcarrier 7 in symbol l'=0 and symbol l'=1, a port group that includes ports of reference signals mapped to the foregoing time-frequency resources is referred to as a CDM group. Reference signal ports included in a same CDM group occupy a same RE, that is, occupy a same first RE set.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and a fourth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a fourth cover code element corresponding to the reference signal.

The fourth cover code element is an element in a fourth orthogonal cover code sequence, each port in the second port group is corresponding to one fourth orthogonal cover code sequence, and each port in the first port group is corresponding to one fourth cover code element on each subcarrier in the second RE set included in the second resource group.

For example, the fourth orthogonal cover code sequence is a sequence in a fourth orthogonal cover code sequence set, and one second orthogonal cover code sequence set is corresponding to one port in the second port group. The second resource group may include one or more second RE sets, and the second RE set may be a set including a plurality of REs that have a fixed interval between each other in frequency domain and that are consecutive in time domain.

For example, refer to FIG. 10. The second RE set may be an RE set including REs corresponding to subcarrier 0, subcarrier 2, subcarrier 4, and subcarrier 6 in symbol l'=0 and symbol l'=1, or an RE set including REs corresponding to subcarrier 1, subcarrier 3, subcarrier 5, and subcarrier 7 in symbol l'=0 and symbol l'=1. For example, refer to FIG. 11. The second RE set may be an RE set including REs corresponding to subcarrier 4, subcarrier 6, subcarrier 8, and subcarrier 10 in symbol l'=0 and symbol l'=1, or an RE set including REs corresponding to subcarrier 1, subcarrier 3, subcarrier 5, and subcarrier 7 in symbol l'=0 and symbol l'=1. For example, refer to FIG. 12. The second RE set may be an RE set including REs corresponding to subcarrier 0, subcarrier 2, subcarrier 8, and subcarrier 10 in symbol l'=0 and symbol l'=1, or an RE set including REs corresponding to subcarrier 1, subcarrier 3, subcarrier 9, and subcarrier 11 in symbol l'=0 and symbol l'=1. For a specific implementation of the port group including the reference signal ports in the time-frequency resource, refer to S603A. Details are not described herein again.

In this case, the reference sequence element is multiplied by the corresponding fourth cover code element, and the product is mapped to the corresponding second RE set. This can ensure that ports in the second port group are orthogonal in a transmission process, and reduce signal transmission interference. In addition, in Scenario 2 in which the size of the first frequency domain unit is one RB, compared with the mapping rule B in FIG. 2, in this embodiment of this application, a port group may be extended in some time-frequency resources in the time-frequency unit occupying double symbols, that is, the second port group is added, so that the quantity of transmitted streams supported by the mapping rule is increased and the capacity of the MIMO system is increased.

Further, the third cover code element may be a product of a third frequency domain cover code sub-element and a third time domain cover code sub-element, and the fourth cover code element may be a product of a fourth frequency domain cover code sub-element and a fourth time domain cover code sub-element.

Optionally, a length of the third orthogonal cover code sequence is 4, and a length of the fourth orthogonal cover code sequence is 8.

For example, the third orthogonal cover code sequence is used to ensure orthogonality of ports in the first port group, and the fourth orthogonal cover code sequence is used to ensure orthogonality of ports in the second port group. Because the ports in the second port group and some of the ports in the first port group are located in a same RE, the length of the fourth orthogonal cover code sequence corresponding to the second port group is greater than the length of the third orthogonal cover code sequence corresponding to the first port group. For example, port 3 in the first port group may be corresponding to a third orthogonal cover code sequence whose length is 4, for example, +1/+1/−1/−1. Port 14 in the second port group may be corresponding to a fourth orthogonal cover code sequence whose length is 8, for example, +1/−1/+1/−1/−1/+1/−1/+1.

The third orthogonal cover code sequence may be a vector or a sequence in a preset orthogonal cover code sequence set. For example, the orthogonal sequence set may be a Walsh sequence set whose sequence length is 4. In an implementation, the orthogonal cover code sequence set may be $$\left\{\begin{pmatrix}+1\\+1\\+1\\+1\end{pmatrix},\begin{pmatrix}+1\\-1\\+1\\-1\end{pmatrix},\begin{pmatrix}+1\\+1\\-1\\-1\end{pmatrix},\begin{pmatrix}+1\\-1\\-1\\+1\end{pmatrix}\right\}.$$

Similarly, the fourth orthogonal cover code sequence may also be a vector or a sequence in a preset orthogonal cover code sequence set. For example, the orthogonal sequence set may be a Walsh sequence set whose sequence length is 8. In an implementation, the orthogonal cover code sequence set may be $$\left\{\begin{pmatrix}+1\\+1\\+1\\+1\\+1\\+1\\+1\\+1\end{pmatrix},\begin{pmatrix}+1\\-1\\+1\\-1\\+1\\-1\\+1\\-1\end{pmatrix},\begin{pmatrix}+1\\+1\\+1\\+1\\-1\\-1\\-1\\-1\end{pmatrix},\begin{pmatrix}+1\\-1\\+1\\-1\\-1\\+1\\-1\\+1\end{pmatrix},\begin{pmatrix}+1\\+1\\-1\\-1\\+1\\+1\\-1\\-1\end{pmatrix},\begin{pmatrix}+1\\-1\\-1\\+1\\+1\\-1\\-1\\+1\end{pmatrix},\begin{pmatrix}+1\\+1\\-1\\-1\\-1\\-1\\+1\\+1\end{pmatrix},\begin{pmatrix}+1\\-1\\-1\\+1\\-1\\+1\\+1\\-1\end{pmatrix}\right\}.$$

It should be noted that ports in the first port group and the second port group may be divided into two CDM groups. A CDM group 3 may include ports 0/1/4/5/8/9/12/13, and a CDM group 4 may include ports 2/3/6/7/10/11/14/15. In a CDM group, different ports occupy a same time-frequency resource, and different OCC codes may be used to distinguish the ports in the same time-frequency resource. As shown in any one of FIG. 10 to FIG. 12, ports 0/1/4/5/8/9/12/13 may be located in a same RE, and a group of OCC codes are used to distinguish the ports in the RE, for example: +1/+1/+1/+/+1/+1/+1/+1/+1/+1/−1/−1/+1/+1/−1/−1, +1/−1/+1/−1/+1/−1/+1/−1, +1/−1/−11+1/−1/−1/+1, +1/+1/+1/+1/−1/−1/−1/−1, +1/+1/−1/−1/−1/−1/+1/+1, +1/−1/+1/−1/−1/+1/−1/+1, or +1/−1/−1/+1/−1/+1/+1/−1. It may indicate that one CDM group is corresponding to one OCC group.

It should be further noted that, for the reference signal ports in the first port group and the second port group, an orthogonal cover code sequence corresponding to each port may be further determined. For example, the third orthogonal cover code sequence corresponding to port 0 in the first port group is {+1, +1, +1, +1}. In a first RE set, port 0 sends corresponding reference signal sequence elements on four REs in the first RE set, and port 0 is respectively corresponding to the orthogonal cover code sequence elements +1, +1, +1, and +1 on the four REs. The four REs in the first RE set may be REs corresponding to subcarrier 0 and subcarrier 2 in symbol l'=0 and symbol l'=1.

Similarly, a fourth orthogonal cover code sequence corresponding to port 14 in the second port group is {+1, −1, +1, −1, −1, +1, −1, +1}. In a second RE set, port 14 sends corresponding reference signal sequence elements on eight REs in the second RE set, and port 14 is respectively corresponding to the orthogonal cover code sequence elements +1, −1, +1, −1, −1, +1, −1, and +1 on the eight REs. The eight REs in the second RE set may be REs corresponding to subcarrier 0, subcarrier 2, subcarrier 4, and subcarrier 6 in symbol l'=0 and symbol l'=1. For a specific implementation of the eight REs in the second RE set, refer to S604A or S604B. Details are not described herein again. For a specific implementation of a relationship between an orthogonal cover code sequence and an OCC group and specific implementations of the first RE set and the second RE set, refer to Scenario 1. Details are not described herein again.

Optionally, the time-frequency unit may include subcarrier 0 to subcarrier 11 in frequency domain, and may include symbol 0 and symbol 1 in time domain. According to the mapping rule 4 shown in FIG. 10, the first resource sub-block may include subcarrier 0 to subcarrier 7 in the time-frequency unit in frequency domain, and the second resource sub-block may include subcarrier 8 to subcarrier 11 in the time-frequency unit in frequency domain.

Therefore, the first resource group and the second resource group each may include symbol 0 and symbol 1 in the time-frequency unit, the first resource group may include subcarrier 0 to subcarrier 11 in the time-frequency unit in frequency domain, and the second resource group may include subcarrier 0 to subcarrier 7 in the time-frequency unit in frequency domain. For a specific implementation of mapping the reference signal to the first resource group and the second resource group based on FIG. 10, refer to Scenario 1. Details are not described herein again.

An embodiment of this application provides a formula and a table applicable to Scenario 2, to describe the mapping rule 4 shown in FIG. 10. The reference signal is a demodulation reference signal DMRS, and the time unit is an orthogonal frequency division multiplexing OFDM symbol.

In the mapping rule 4, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 4 meets.

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1007] \\ 0,1,2,3 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{p,\mu}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 4, refer to the mapping rule 1. Details are not described herein again.

Therefore, in Scenario 2, according to the formula in the mapping rule 4, by using the first port index p, the time domain cover code sub-element $w_t(l')$ and the frequency domain cover code sub-element $w_f(k')$ that are corresponding to the reference sequence element r(m) may be determined, so that a product of the reference sequence element r(m) and corresponding time domain cover code sub-element $w_t(l')$ and frequency domain cover code sub-element $w_f(k')$ is mapped to the RE whose index is $(k, l)_{p,\mu}$.

Optionally, values of $w_f(k')$, $w_t(l')$, and $\Delta$ corresponding to port p may be determined based on Table 4. Table 4 is a correspondence table 4 between ports and cover code sub-elements provided in this embodiment of this application.

TABLE 4

| | | | $w_f(k')$ | | | | | | $w_t(l')$ | |
|---|---|---|---|---|---|---|---|---|---|---|
| p | λ | Δ | k' = 0 | k' = 1 | k' = 2 | k' = 3 | k' = 4 | k' = 5 | l' = 0 | l' = 1 |
| 1000 | 0 | 0 | +1 | +1 | +1 | +1 | +1 | +1 | +1 | +1 |
| 1001 | 0 | 0 | +1 | −1 | +1 | −1 | +1 | −1 | +1 | +1 |
| 1002 | 1 | 1 | +1 | +1 | +1 | +1 | +1 | +1 | +1 | +1 |
| 1003 | 1 | 1 | +1 | −1 | +1 | −1 | +1 | −1 | +1 | +1 |
| 1004 | 0 | 0 | +1 | +1 | +1 | +1 | +1 | +1 | +1 | −1 |
| 1005 | 0 | 0 | +1 | −1 | +1 | −1 | +1 | −1 | +1 | −1 |
| 1006 | 1 | 1 | +1 | +1 | +1 | +1 | +1 | +1 | +1 | −1 |
| 1007 | 1 | 1 | +1 | −1 | +1 | −1 | +1 | −1 | +1 | −1 |
| 1008 | 0 | 0 | +1 | +1 | −1 | −1 | | | +1 | +1 |
| 1009 | 0 | 0 | +1 | −1 | −1 | +1 | | | +1 | +1 |
| 1010 | 1 | 1 | +1 | +1 | −1 | −1 | | | +1 | +1 |
| 1011 | 1 | 1 | +1 | −1 | −1 | +1 | | | +1 | +1 |
| 1012 | 0 | 0 | +1 | +1 | −1 | −1 | | | +1 | −1 |
| 1013 | 0 | 0 | +1 | −1 | −1 | +1 | | | +1 | −1 |
| 1014 | 1 | 1 | +1 | +1 | −1 | −1 | | | +1 | −1 |
| 1015 | 1 | 1 | +1 | −1 | −1 | +1 | | | +1 | −1 |

λ is an index of an orthogonal multiplexing group to which port p belongs, and ports in a same orthogonal multiplexing group occupy a same time-frequency resource. For a specific implementation of table 4 in the mapping rule 4, refer to the table in the mapping rule 1. Details are not described herein again.

Optionally, the time-frequency unit may include subcarrier 0 to subcarrier 11 in frequency domain, and may include symbol 0 and symbol 1 in time domain. According to the mapping rule 5 shown in FIG. 11, the first resource sub-block may include subcarrier 4 to subcarrier 11 in the time-frequency unit in frequency domain, and the second resource sub-block may include subcarrier 0 to subcarrier 3 in the time-frequency unit in frequency domain. For specific implementations of the first resource sub-block and the second resource sub-block in the mapping rule 5, refer to the mapping rule 4 shown in FIG. 10. Details are not described herein again.

In a specific implementation process, an embodiment of this application provides a formula and a table applicable to Scenario 2, to describe the mapping rule 5 shown in FIG. 12. This is further applicable to a scenario in which the reference signal is a demodulation reference signal DMRS, and the time unit is an orthogonal frequency division multiplexing OFDM symbol.

In the mapping rule 5, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{h}$ subcarrier in the time-frequency unit in frequency domain, and the mapping rule 5 meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,2,3,4,5 & p \in [1000, 1007] \\ 2,3,4,5 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{p,\mu}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 5, refer to the formula in the mapping rule 1. Details are not described herein again.

Optionally, values of $w_f(k')$, $w_t(l')$, and Δ corresponding to port p may be determined based on Table 5. Table 5 is a correspondence table 5 between ports and cover code sub-elements provided in this embodiment of this application.

TABLE 5

| | | | $w_f(k')$ | | | | | | $w_t(l')$ | |
|---|---|---|---|---|---|---|---|---|---|---|
| p | λ | Δ | k' = 0 | k' = 1 | k' = 2 | k' = 3 | k' = 4 | k' = 5 | l' = 0 | l' = 1 |
| 1000 | 0 | 0 | +1 | +1 | +1 | +1 | +1 | +1 | +1 | +1 |
| 1001 | 0 | 0 | +1 | −1 | +1 | −1 | +1 | −1 | +1 | +1 |
| 1002 | 1 | 1 | +1 | +1 | +1 | +1 | +1 | +1 | +1 | +1 |
| 1003 | 1 | 1 | +1 | −1 | +1 | −1 | +1 | −1 | +1 | +1 |
| 1004 | 0 | 0 | +1 | +1 | +1 | +1 | +1 | +1 | +1 | −1 |
| 1005 | 0 | 0 | +1 | −1 | +1 | −1 | +1 | −1 | +1 | −1 |
| 1006 | 1 | 1 | +1 | +1 | +1 | +1 | +1 | −1 | +1 | −1 |
| 1007 | 1 | 1 | +1 | −1 | +1 | −1 | +1 | −1 | +1 | −1 |
| 1008 | 0 | 0 | | | +1 | +1 | −1 | −1 | +1 | +1 |
| 1009 | 0 | 0 | | | +1 | −1 | −1 | +1 | +1 | +1 |
| 1010 | 1 | 1 | | | +1 | +1 | −1 | −1 | +1 | +1 |
| 1011 | 1 | 1 | | | +1 | −1 | −1 | −1 | +1 | +1 |
| 1012 | 0 | 0 | | | +1 | −1 | −1 | −1 | +1 | −1 |
| 1013 | 0 | 0 | | | +1 | −1 | −1 | +1 | +1 | −1 |
| 1014 | 1 | 1 | | | +1 | +1 | −1 | −1 | +1 | −1 |
| 1015 | 1 | 1 | | | +1 | −1 | −1 | +1 | +1 | −1 |

A is an index of an orthogonal multiplexing group to which port p belongs, and ports in a same orthogonal multiplexing group occupy a same time-frequency resource. For a specific implementation of table in the mapping rule 5, refer to the table in the mapping rule 1. Details are not described herein again. Optionally, the time-frequency unit may include subcarrier 0 to subcarrier 11 in frequency domain. According to the mapping rule 6 shown in FIG. 12, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain. For specific implementations of the first resource sub-block and the second resource sub-block in the mapping rule 6, refer to the mapping rule 4 shown in FIG. 10. Details are not described herein again.

In a specific implementation process, an embodiment of this application provides a formula and a table applicable to Scenario 2, to describe the mapping rule 6 shown in FIG. 12. The reference signal is a demodulation reference signal DMRS, and the time unit is an orthogonal frequency division multiplexing OFDM symbol.

In the mapping rule 6, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 6 meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1007] \\ 0,1,4,5 & p \in [1008, 1015] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{p,\mu}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 6, refer to the formula in the mapping rule 1. Details are not described herein again.

Optionally, values of $w_f(k')$, $w_t(l')$, and Δ corresponding to port p may be determined based on Table 6. Table 6 is a correspondence table 6 between ports and cover code sub-elements provided in this embodiment of this application.

TABLE 6

| | | | $w_f(k')$ | | | | | | $w_t(l')$ | |
|---|---|---|---|---|---|---|---|---|---|---|
| p | λ | Δ | k' = 0 | k' = 1 | k' = 2 | k' = 3 | k' = 4 | k' = 5 | l' = 0 | l' = 1 |
| 1000 | 0 | 0 | +1 | +1 | +1 | +1 | +1 | +1 | +1 | +1 |
| 1001 | 0 | 0 | +1 | −1 | +1 | −1 | +1 | −1 | +1 | +1 |
| 1002 | 1 | 1 | +1 | +1 | +1 | +1 | +1 | +1 | +1 | +1 |
| 1003 | 1 | 1 | +1 | −1 | +1 | −1 | +1 | −1 | +1 | +1 |
| 1004 | 0 | 0 | +1 | +1 | +1 | +1 | +1 | +1 | +1 | −1 |
| 1005 | 0 | 0 | +1 | −1 | +1 | −1 | +1 | −1 | +1 | −1 |
| 1006 | 1 | 1 | +1 | +1 | +1 | +1 | +1 | +1 | +1 | −1 |
| 1007 | 1 | 1 | +1 | −1 | +1 | −1 | +1 | −1 | +1 | −1 |
| 1008 | 0 | 0 | +1 | +1 | | | −1 | −1 | +1 | +1 |
| 1009 | 0 | 0 | +1 | −1 | | | −1 | +1 | +1 | +1 |
| 1010 | 1 | 1 | +1 | +1 | | | −1 | −1 | +1 | +1 |
| 1011 | 1 | 1 | +1 | −1 | | | −1 | +1 | +1 | +1 |
| 1012 | 0 | 0 | +1 | +1 | | | −1 | −1 | +1 | −1 |
| 1013 | 0 | 0 | +1 | −1 | | | −1 | +1 | +1 | −1 |
| 1014 | 1 | 1 | +1 | +1 | | | −1 | −1 | +1 | −1 |
| 1015 | 1 | 1 | +1 | −1 | | | −1 | +1 | +1 | −1 |

λ is an index of an orthogonal multiplexing group to which port p belongs, and ports in a same orthogonal multiplexing group occupy a same time-frequency resource. For a specific implementation of the table in the mapping rule 6, refer to the table in the mapping rule 1. Details are not described herein again.

In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$ to improve DMRS mapping efficiency.

In still another possible design scheme, embodiments of this application further provide three mapping rules: a mapping rule 7, a mapping rule 8, and a mapping rule 9, applicable to Scenario 3: A mapping type of the reference signal is a mapping type 1, and the size of the first frequency domain unit is N times of a resource block RB group, where N is a positive integer, and the RB group may include two contiguous RBs. The time-frequency unit may include one RB group (a total of 24 contiguous subcarriers, denoted as subcarrier 0 to subcarrier 23) in frequency domain, and may include one time unit in time domain. The first port group may include four ports, and the second port group may include four ports. The first frequency domain unit may be a PRG, and the time unit may be an OFDM symbol.

For example, the RB group is a set including two contiguous RBs in frequency domain. If there is one time-frequency unit, an RB group may be denoted as subcarrier 0 to subcarrier 23; or if there are a plurality of time-frequency units, for a c time-frequency unit, an RB group may be denoted as subcarrier $c_0+(c-1)*24$ to subcarrier $c_0+(c-1)*24+23$. $c_0$ is an index of the $1^{st}$ subcarrier of the first time-frequency unit in the plurality of time-frequency units, and c is a positive integer. For a specific implementation of the time-frequency unit in time domain in Scenario 3, refer to Scenario 1. Details are not described herein again. In addition, the first port group may include port 0 to port 3, and the second port group may include port 4 to port 7.

Figure 13A:
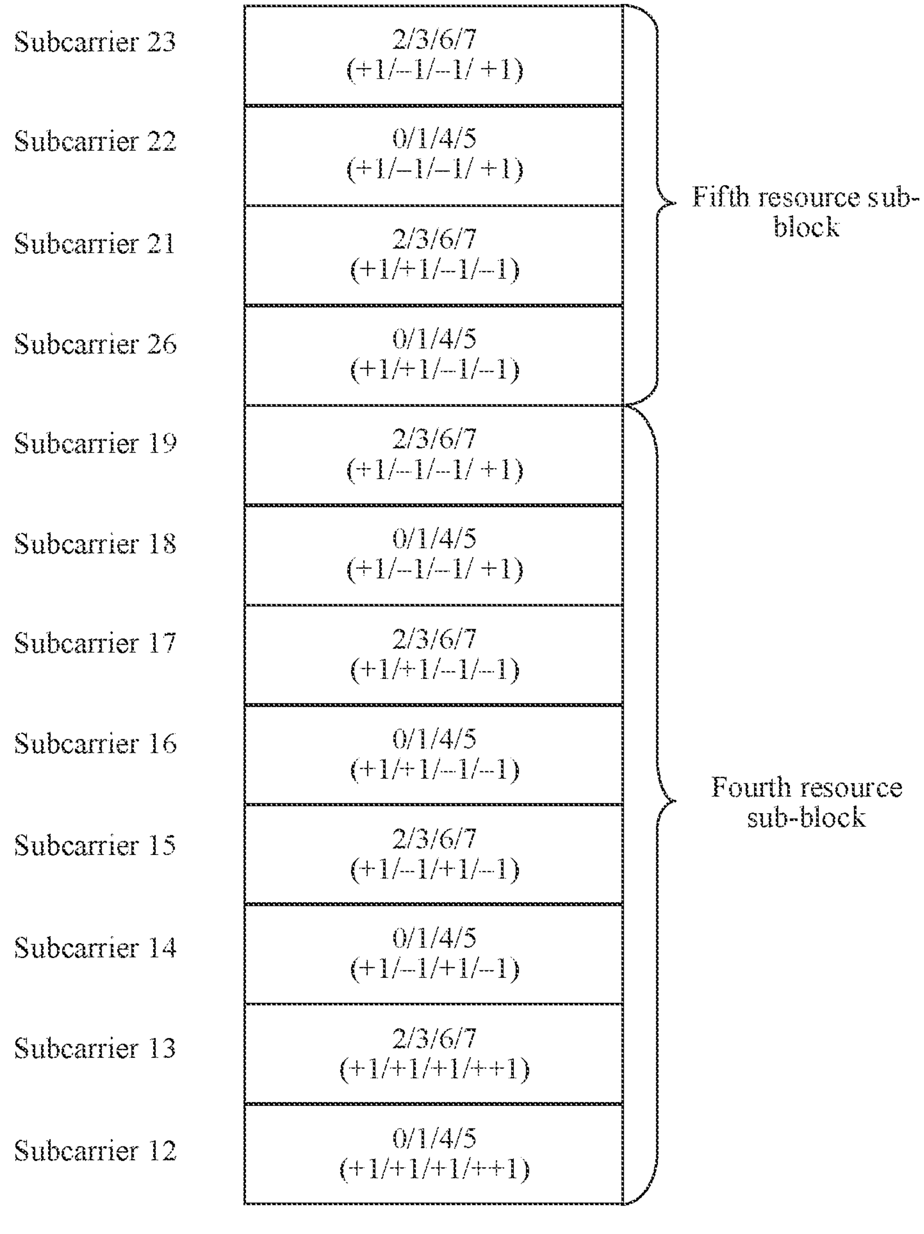
FIG. 13A and FIG. 13B are an example diagram 7 of a mapping rule according to an embodiment of this application.
Figure 13B:
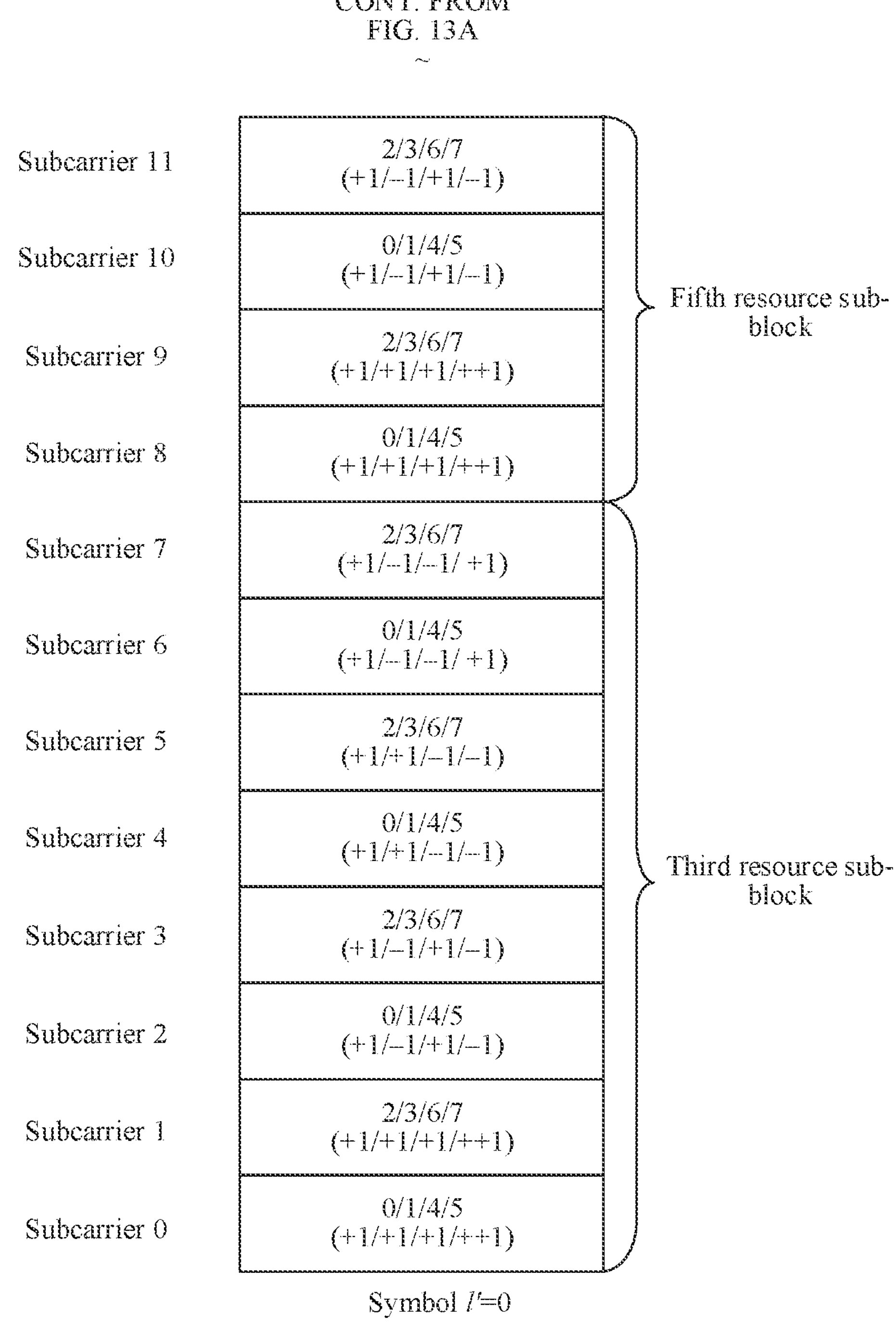
Figure 14A:
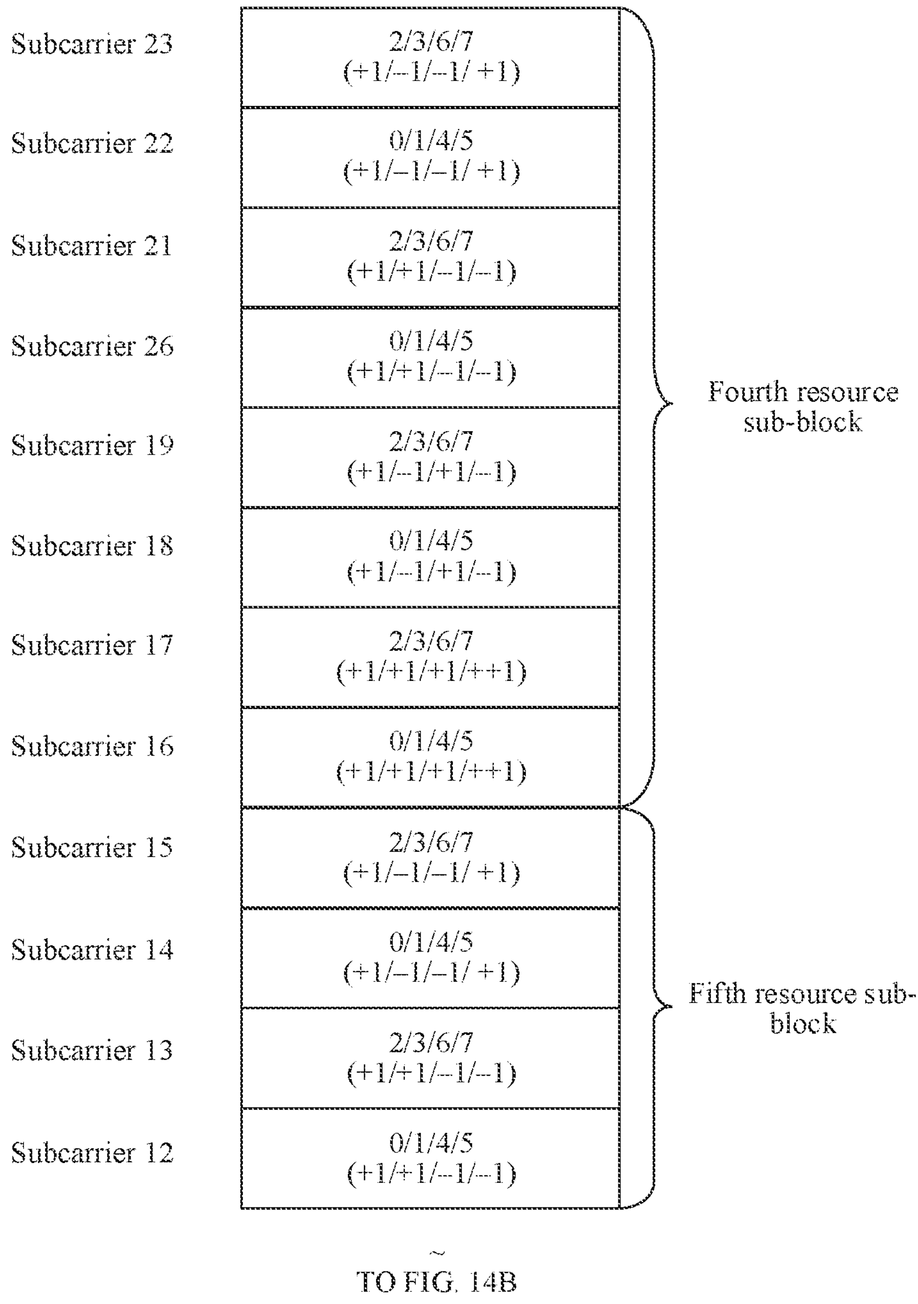
FIG. 14A and FIG. 14B are an example diagram 8 of a mapping rule according to an embodiment of this application.
Figure 14B:
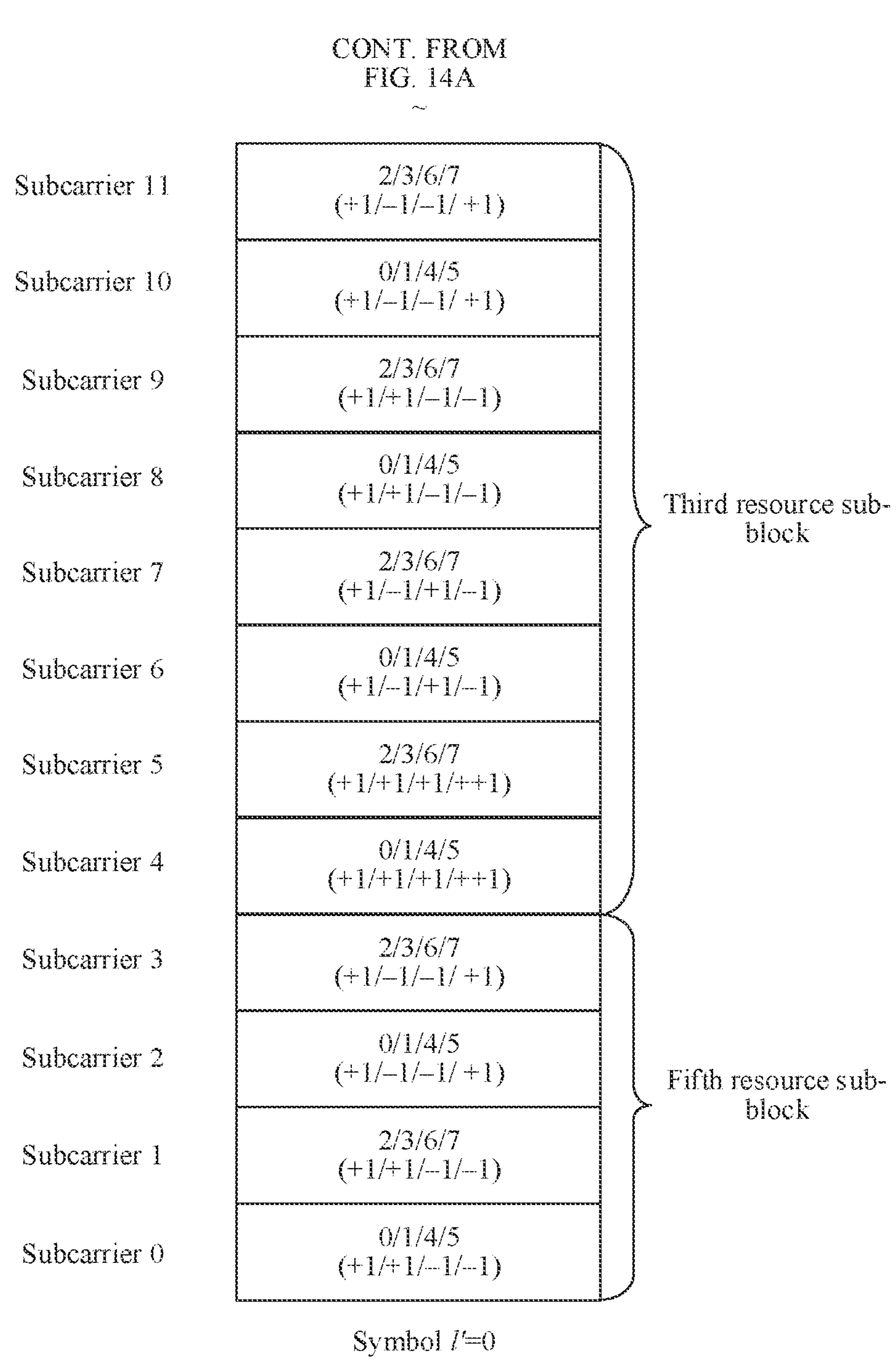
Figure 15A:
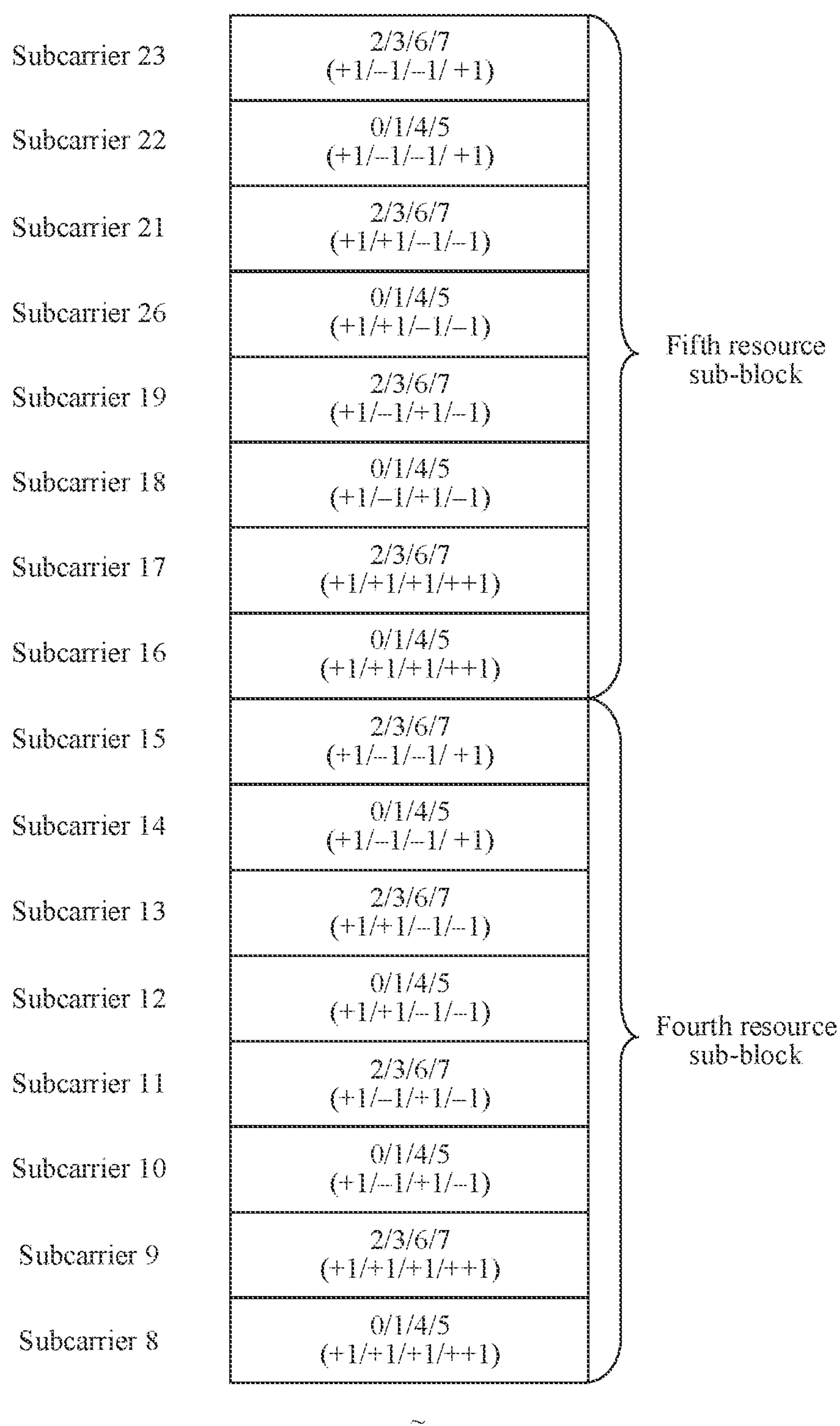
FIG. 15A and FIG. 15B are an example diagram 9 of a mapping rule according to an embodiment of this application.
Figure 15B:
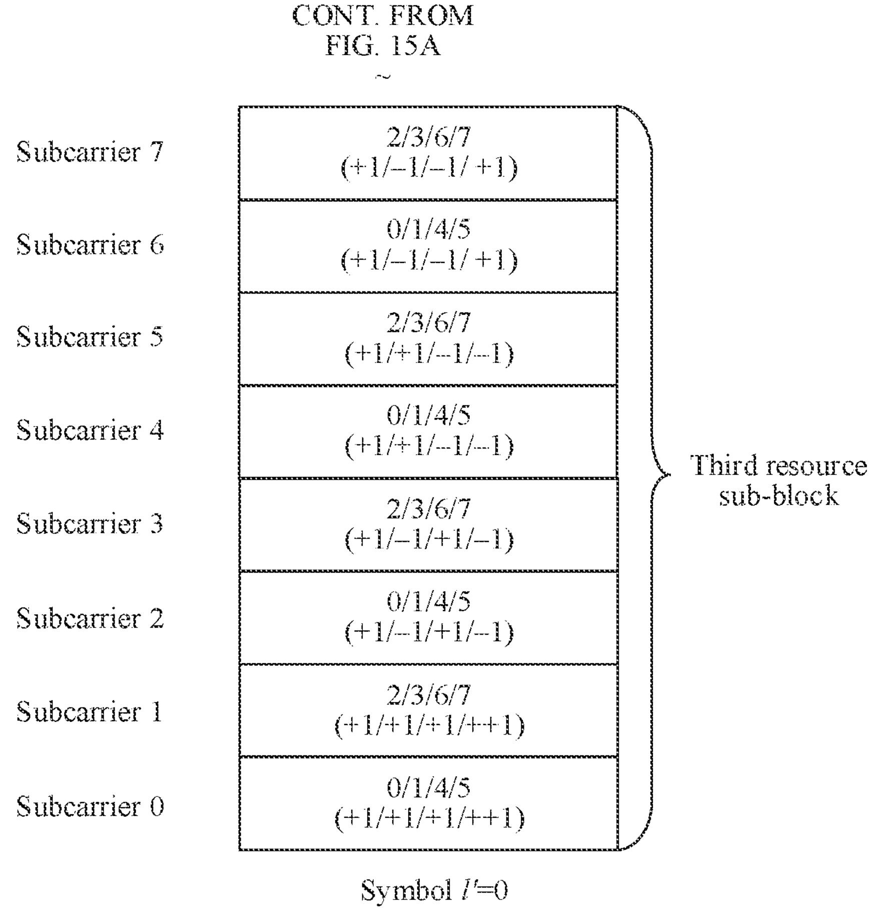

The following specifically describes the mapping rules applicable to Scenario 3. FIG. 13A and FIG. 13B are an example diagram 7 of a mapping rule according to an embodiment of this application, FIG. 14A and FIG. 14B are an example diagram 8 of a mapping rule according to an embodiment of this application, and FIG. 15A and FIG. 15B are an example diagram 9 of a mapping rule according to an embodiment of this application.

As shown in any one of FIG. 13A and FIG. 13B to FIG. 15A and FIG. 15B, each of the first resource group and the second resource group includes a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. That is, the first resource group and the second resource group meet Condition 1.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a fifth cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a fifth cover code element corresponding to the reference signal.

The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. For a specific implementation of the fifth cover code element, refer to Scenario 1. Details are not described herein again.

For example, as shown in FIG. 13A and FIG. 13B or FIG. 15A and FIG. 15B, the first RE set may be an RE set including REs corresponding to subcarrier 0, subcarrier 2, subcarrier 4, and subcarrier 6 in symbol l'=0, an RE set including REs corresponding to subcarrier 12, subcarrier 14, subcarrier 16, and subcarrier 18 in symbol l'=0, or an RE set including REs corresponding to subcarrier 1, subcarrier 3, subcarrier 5, and subcarrier 7 in symbol l'=0. As shown in FIG. 14A and FIG. 14B or FIG. 15A and FIG. 15B, the first RE set may alternatively be an RE set including REs corresponding to subcarrier 4, subcarrier 6, subcarrier 8, and subcarrier 10 in symbol l'=0, or an RE set including REs corresponding to subcarrier 5, subcarrier 7, subcarrier 9, and subcarrier 11 in symbol l'=0. For a specific implementation of the first RE set in Scenario 2, refer to a specific implementation of the second RE set in Scenario 1. Details are not described herein again.

In this case, the reference sequence element is multiplied by the corresponding fifth cover code element, and the product is mapped to the corresponding first RE set. This can ensure that ports in the first port group are orthogonal in a transmission process, and reduce signal transmission interference.

In addition, for REs corresponding to subcarrier 0, subcarrier 2, . . . , subcarrier 20, and subcarrier 22 in symbol l'=0, a port group that includes ports of reference signals mapped to the foregoing time-frequency resources may be referred to as a CDM group. For REs corresponding to subcarrier 1, subcarrier 3, . . . , subcarrier 21, and subcarrier 23 in symbol l'=0, a port group that includes ports of reference signals mapped to the foregoing time-frequency resources is referred to as a CDM group. Reference signal ports included in a same CDM group occupy a same RE, that is, occupy a same first RE set. For specific implementations of the CDM group and the first RE set, refer to Scenario 1. Details are not described herein again.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and a sixth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a sixth cover code element corresponding to the reference signal.

The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group. For a specific implementation of the sixth cover code element, refer to Scenario 1. Details are not described herein again.

As shown in FIG. 13A and FIG. 13B to FIG. 15A and FIG. 15B, the second RE set in the second resource group is similar to the foregoing first RE set. For a specific implementation of the second RE set, refer to a specific implementation of the first RE set in Scenario 2. Details are not described herein again.

In this case, the reference sequence element is multiplied by the corresponding sixth cover code element, and the product is mapped to the corresponding second RE set. This can ensure that ports in the second port group are orthogonal in a transmission process, and reduce signal transmission interference. In addition, in Scenario 3 in which the size of the first frequency domain unit is N times of the size of the RB group (two RBs), for example, the size of the first frequency domain unit is two RBs or four RBs, compared with the mapping rule A shown in FIG. 1, in this embodiment of this application, a port capacity can be doubled in all time-frequency resources in the time-frequency unit, that is, the second port group whose quantity of ports is the same as that of ports in the first port group is added, to increase the quantity of supported transmitted streams, and improve the performance of the MIMO system.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the fifth orthogonal cover code sequence and a length of the sixth orthogonal cover code sequence may be 4.

For example, port 1 in the first port group may be corresponding to a fifth orthogonal cover code sequence whose length is 4, for example, +1/−1/+1/−1, and port 7 in the second port group may be corresponding to a sixth orthogonal cover code sequence whose length is 4, for example, +1/−1/−1/+1. For specific implementations of the fifth orthogonal cover code sequence and the sixth orthogonal cover code sequence, refer to Scenario 1. Details are not described herein again. In this case, an orthogonal cover code sequence whose length is 4, for example, the fifth orthogonal cover code sequence and the sixth orthogonal cover code sequence, is used in the time-frequency resources in the time-frequency unit, so that orthogonal ports can be expanded in the time-frequency resources.

The fifth orthogonal cover code sequence and the sixth orthogonal cover code sequence may be selected from a preset orthogonal cover code sequence set. For example, the fifth orthogonal cover code sequence and the sixth orthogonal cover code sequence each may be a vector or a sequence in the preset orthogonal cover code sequence set. The orthogonal cover code sequence set may be a Walsh sequence set whose sequence length is 4. In an implementation, the orthogonal cover code sequence set may be $$\left\{\begin{pmatrix}+1\\+1\\+1\\+1\end{pmatrix},\begin{pmatrix}+1\\-1\\+1\\-1\end{pmatrix},\begin{pmatrix}+1\\+1\\-1\\-1\end{pmatrix},\begin{pmatrix}+1\\-1\\-1\\+1\end{pmatrix}\right\}.$$

It should be noted that ports in the first port group and the second port group may be divided into two CDM groups. A CDM group 5 may include ports 0/1/4/5, and a CDM group 6 may include ports 2/3/6/7. In a CDM group, different ports occupy a same time-frequency resource, and different OCC codes may be used to distinguish the ports in the same time-frequency resource. For a specific implementation of using OCC codes to distinguish port located in a same RE, refer to Scenario 1. Details are not described herein again.

It should be further noted that, for the reference signal ports in the first port group and the second port group, an orthogonal cover code sequence corresponding to each port may be further determined. For example, the fifth orthogonal cover code sequence corresponding to port 0 in the first port group is (+1, +1, +1, +1). In a first RE set, port 0 sends corresponding reference signal sequence elements on four REs in the first RE set, and port 0 is respectively corresponding to the orthogonal cover code sequence elements +1, +1.+1, and +1 on the four REs. The four REs in the first RE set may be REs corresponding to subcarrier 0, subcarrier 2, subcarrier 4, and subcarrier 6 in symbol l'=0.

Similarly, a sixth orthogonal cover code sequence corresponding to port 4 in the second port group is {+1, +1, −1, −1}. In the second RE set, port 4 sends corresponding reference signal sequence elements on four REs in the second RE set, and port 4 is respectively corresponding to the orthogonal cover code sequence elements +1, +1, −1, and −1 on the four subcarriers. The four REs in the second RE set may be REs corresponding to subcarrier 0, subcarrier 2, subcarrier 4, and subcarrier 6 in symbol l'=0. For a specific implementation of a relationship between an orthogonal cover code sequence and an OCC group and specific implementations of the first RE set and the second RE set, refer to Scenario 1. Details are not described herein again.

Optionally, the time-frequency unit may include subcarrier 0 to subcarrier 23 in frequency domain, and may include symbol 0 in time domain. According to the mapping rule 7 shown in FIG. 13A and FIG. 13B, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain.

Therefore, the first resource group and the second resource group occupy a same time-frequency resource in the time-frequency unit, and each may include symbol 0 in the time-frequency unit in time domain, and may include subcarrier 0 to subcarrier 23 in the time-frequency unit in frequency domain. For a specific implementation of mapping the reference signal to the first resource group and the second resource group based on FIG. 13A and FIG. 13B, refer to Scenario 1. Details are not described herein again.

In a specific implementation process, an embodiment of this application provides a formula and a table applicable to Scenario 3, to describe the mapping rule 7 shown in FIG. 13A and FIG. 13B. The reference signal is a demodulation reference signal DMRS, and the time unit is an orthogonal frequency division multiplexing OFDM symbol.

In the mapping rule 7, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 7 may meet:

$$a_{k,l}^{p,\mu} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \hat{l} + l';$$

$$n = 0, 1, \ldots ; \text{and}$$

$$l' = 0,$$

where p is the first port index, μ is a subcarrier spacing parameter, $$a_{k,l}^{p,\mu}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and $\Delta$ is a subcarrier offset factor. For a specific implementation of the formula in the mapping rule 7, refer to the mapping rule 1. Details are not described herein again.

Optionally, values of $w_f(k')$, $w_t(l')$, and $\Delta$ corresponding to port p may be determined based on Table 7. Table 7 is a correspondence table 7 between ports and cover code sub-elements provided in this embodiment of this application.

index is $(k, l)_{p,\mu}$ according to the following rule. The RE whose $(k, l)_{p,\mu}$ index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 8 may alternatively meet:

$$a_{k,l}^{p,\mu} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \hat{l} + l';$$

$$n = 0, 1, \ldots ; \text{and}$$

$$l' = 0,$$

TABLE 7

| | | | $w_f(k')$ | | | | | | | | | | | | $w_t(l')$ |
|---|---|---|---|---|---|---|---|---|---|---|---|---|---|---|---|
| p | λ | Δ | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 |
| 1000 | 0 | 0 | +1 | +1 | +1 | +1 | +1 | +1 | +1 | +1 | +1 | +1 | +1 | +1 | +1 |
| 1001 | 0 | 0 | +1 | −1 | +1 | −1 | +1 | −1 | +1 | −1 | +1 | −1 | +1 | −1 | +1 |
| 1002 | 1 | 1 | +1 | +1 | +1 | +1 | +1 | +1 | +1 | +1 | +1 | +1 | +1 | +1 | +1 |
| 1003 | 1 | 1 | +1 | −1 | +1 | −1 | +1 | −1 | +1 | −1 | +1 | −1 | +1 | −1 | +1 |
| 1004 | 0 | 0 | +1 | +1 | −1 | −1 | +1 | +1 | +1 | +1 | −1 | −1 | −1 | −1 | +1 |
| 1005 | 0 | 0 | +1 | −1 | −1 | +1 | +1 | −1 | +1 | −1 | −1 | +1 | −1 | +1 | +1 |
| 1006 | 1 | 1 | +1 | +1 | −1 | −1 | +1 | +1 | +1 | +1 | −1 | −1 | −1 | −1 | +1 |
| 1007 | 1 | 1 | +1 | −1 | −1 | +1 | +1 | −1 | +1 | −1 | −1 | +1 | −1 | +1 | +1 |

λ is an index of an orthogonal multiplexing group to which port p belongs, and ports in a same orthogonal multiplexing group occupy a same time-frequency resource. For a specific implementation of table in the mapping rule 7, refer to the table in the mapping rule 1. Details are not described herein again.

Optionally, the time-frequency unit may include subcarrier 0 to subcarrier 23 in frequency domain, and may include symbol 0 in time domain. According to the mapping rule 8 shown in FIG. 14A and FIG. 141B, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. For specific implementations of the third resource sub-block, the fourth resource sub-block, and the fifth resource sub-block in the mapping rule 8, refer to the mapping rule 7 shown in FIG. 13A and FIG. 13B. Details are not described herein again.

In a specific implementation process, an embodiment of this application provides a formula and a table applicable to Scenario 3, to describe the mapping rule 8 shown in FIG. 14A and FIG. 14B. The reference signal is a demodulation reference signal DMRS, and the time unit is an orthogonal frequency division multiplexing OFDM symbol.

In the mapping rule 8, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose where p is the first port index, μ is a subcarrier spacing parameter, $$a_{k,l}^{p,\mu}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and $\Delta$ is a subcarrier offset factor. For a specific implementation of the formula in the mapping rule 8, refer to the formula in the mapping rule 1. Details are not described herein again.

Optionally, values of $w_f(k')$, $w_t(l')$ and $\Delta$ corresponding to port p may be determined based on Table 8. Table 8 is a correspondence table 8 between ports and cover code sub-elements provided in this embodiment of this application.

TABLE 8

| | | | $w_f$(k') | | | | | | | | | | | | $w_t$ (l') |
|---|---|---|---|---|---|---|---|---|---|---|---|---|---|---|---|
| p | λ | Δ | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 |
| 1000 | 0 | 0 | +1 | +1 | +1 | +1 | +1 | +1 | +1 | +1 | +1 | +1 | +1 | +1 | +1 |
| 1001 | 0 | 0 | +1 | −1 | +1 | −1 | +1 | −1 | +1 | −1 | +1 | −1 | +1 | −1 | +1 |
| 1002 | 1 | 1 | +1 | +1 | +1 | +1 | +1 | +1 | +1 | +1 | +1 | +1 | +1 | +1 | +1 |
| 1003 | 1 | 1 | +1 | −1 | +1 | −1 | +1 | −1 | +1 | −1 | +1 | −1 | +1 | −1 | +1 |
| 1004 | 0 | 0 | +1 | +1 | +1 | +1 | −1 | −1 | −1 | −1 | +1 | +1 | −1 | −1 | +1 |
| 1005 | 0 | 0 | +1 | −1 | +1 | −1 | −1 | +1 | −1 | +1 | +1 | −1 | −1 | +1 | +1 |
| 1006 | 1 | 1 | +1 | +1 | +1 | +1 | −1 | −1 | −1 | −1 | +1 | +1 | −1 | −1 | +1 |
| 1007 | 1 | 1 | +1 | −1 | +1 | −1 | −1 | +1 | −1 | +1 | +1 | −1 | −1 | +1 | +1 |

λ is an index of an orthogonal multiplexing group to which port p belongs, and ports in a same orthogonal multiplexing group occupy a same time-frequency resource. For a specific implementation of table in the mapping rule 8, refer to the table in the mapping rule 1. Details are not described herein again.

Optionally, the time-frequency unit may include subcarrier 0 to subcarrier 23 in frequency domain, and may include symbol 0 in time domain. According to the mapping rule 9 shown in FIG. 15A and FIG. 15B, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain. For specific implementations of the third resource sub-block, the fourth resource sub-block, and the fifth resource sub-block in the mapping rule 9, refer to the mapping rule 7 shown in FIG. 13A and FIG. 13B. Details are not described herein again.

In a specific implementation process, an embodiment of this application provides a formula and a table applicable to Scenario 3, to describe the mapping rule 9 shown in FIG. 15A and FIG. 15B. The reference signal is a demodulation reference signal DMRS, and the time unit is an orthogonal frequency division multiplexing OFDM symbol.

In the mapping rule 9, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 9 may alternatively meet:

$$a_{k,l}^{p,\mu} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \hat{l} + l';$$

$$n = 0, 1, \ldots \text{; and}$$

$$l' = 0,$$

where p is the first port index, μ is a subcarrier spacing parameter, $$a_{k,l}^{p,\mu}$$

is a DMRS modulation symbol mapped to the RE whose index is $(k, l)_{p,\mu}$, $\hat{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. For a specific implementation of the formula in the mapping rule 9, refer to the mapping rule 1. Details are not described herein again.

Optionally, values of $w_f(k')$, $w_t(l')$, and Δ corresponding to port p may be determined based on Table 9. Table 9 is a correspondence table 9 between ports and cover code sub-elements provided in this embodiment of this application.

TABLE 9

| | | | $w_f$(k') | | | | | | | | | | | | $w_t$ (l') |
|---|---|---|---|---|---|---|---|---|---|---|---|---|---|---|---|
| p | λ | Δ | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 |
| 1000 | 0 | 0 | +1 | +1 | +1 | +1 | +1 | +1 | +1 | +1 | +1 | +1 | +1 | +1 | +1 |
| 1001 | 0 | 0 | +1 | −1 | +1 | −1 | +1 | −1 | +1 | −1 | +1 | −1 | +1 | −1 | +1 |
| 1002 | 1 | 1 | +1 | +1 | +1 | +1 | +1 | +1 | +1 | +1 | +1 | +1 | +1 | +1 | +1 |
| 1003 | 1 | 1 | +1 | −1 | +1 | −1 | +1 | −1 | +1 | −1 | +1 | −1 | +1 | −1 | +1 |
| 1004 | 0 | 0 | +1 | +1 | −1 | −1 | +1 | +1 | −1 | −1 | +1 | +1 | −1 | −1 | +1 |
| 1005 | 0 | 0 | +1 | −1 | −1 | +1 | +1 | −1 | −1 | +1 | +1 | −1 | −1 | +1 | +1 |
| 1006 | 1 | 1 | +1 | +1 | −1 | −1 | +1 | +1 | −1 | −1 | +1 | +1 | −1 | −1 | +1 |
| 1007 | 1 | 1 | +1 | −1 | −1 | +1 | +1 | −1 | −1 | +1 | +1 | −1 | −1 | +1 | +1 |

λ is an index of an orthogonal multiplexing group to which port p belongs, and ports in a same orthogonal multiplexing group occupy a same time-frequency resource. For a specific implementation of table in the mapping rule 9, refer to the table in the mapping rule 1. Details are not described herein again.

In addition, in the mapping rule 9, in the scenario in which the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain. In this case, in a scenario in which the size of the first frequency domain unit may be N times of the resource block RB group, a time-frequency unit including eight contiguous subcarriers in frequency domain may be used to design a corresponding mapping rule 10.

An embodiment of this application provides a mapping rule: a mapping rule 10, applicable to Scenario 3. FIG. 16 is an example diagram 10 of a mapping rule according to an embodiment of this application. According to the mapping rule 10 shown in FIG. 16, the time-frequency unit includes eight contiguous subcarriers (a total of eight contiguous subcarriers, denoted as subcarrier 0 to subcarrier 7) in frequency domain and one time unit (denoted as symbol 0) in time domain. Correspondingly, the time-frequency unit shown in FIG. 16 may be any one of the third resource sub-block, the fourth resource sub-block, and the fifth resource sub-block.

In a specific implementation process, an embodiment of this application provides a formula and a table applicable to Scenario 3, to describe the mapping rule 10 shown in FIG. 16. The reference signal is a demodulation reference signal DMRS, and the time unit is an orthogonal frequency division multiplexing OFDM symbol.

In the mapping rule 10, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 10 meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3 \quad p \in [1000, 1007];$$

$$l = \bar{l} + l';$$

$$n = 0, 1, \ldots \text{ ; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. For a specific implementation of the formula in the mapping rule 10, refer to the formula in the mapping rule 1. Details are not described herein again.

Optionally, values of $w_f(k')$, $w_t(l')$, and Δ corresponding to port p may be determined based on Table 10. Table 10 is a correspondence table 10 between ports and cover code sub-elements provided in this embodiment of this application.

TABLE 10

| | | | $w_f(k')$ | | | | $w_t(l')$ |
|---|---|---|---|---|---|---|---|
| p | λ | Δ | k' = 0 | k' = 1 | k' = 2 | k' = 3 | l' = 0 |
| 1000 | 0 | 0 | +1 | +1 | +1 | +1 | +1 |
| 1001 | 0 | 0 | +1 | −1 | +1 | −1 | +1 |
| 1002 | 1 | 1 | +1 | +1 | +1 | +1 | +1 |
| 1003 | 1 | 1 | +1 | −1 | +1 | −1 | +1 |
| 1004 | 0 | 0 | +1 | +1 | −1 | −1 | +1 |
| 1005 | 0 | 0 | +1 | −1 | −1 | +1 | +1 |
| 1006 | 1 | 1 | +1 | +1 | −1 | −1 | +1 |
| 1007 | 1 | 1 | +1 | −1 | −1 | +1 | +1 |

λ is an index of an orthogonal multiplexing group to which port p belongs, and ports in a same orthogonal multiplexing group occupy a same time-frequency resource. For a specific implementation of table in the mapping rule 10, refer to the table in the mapping rule 1. Details are not described herein again.

In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$, to improve DMRS mapping efficiency.

In yet another possible design scheme, embodiments of this application further provide three mapping rules: a mapping rule 11, a mapping rule 12, and a mapping rule 13, applicable to Scenario 4: A mapping type of the reference signal is a mapping type 1, and the size of the first frequency domain unit is N times of a resource block RB group, where N is a positive integer, and the RB group may include two contiguous RBs. The time-frequency unit may include one RB group (a total of 24 contiguous subcarriers, denoted as subcarrier 0 to subcarrier 23) in frequency domain and two consecutive time units in time domain. The first port group may include eight ports, and the second port group may include eight ports. The first frequency domain unit may be a PRG, and the time unit may be an OFDM symbol. For a specific implementation of the time-frequency unit in Scenario 4, refer to Scenario 3. Details are not described herein again.

The following specifically describes the mapping rules applicable to Scenario 4. FIG. 17A and FIG. 17B are an example diagram 11 of a mapping rule according to an embodiment of this application, FIG. 18A and FIG. 18B are an example diagram 12 of a mapping rule according to an embodiment of this application, and FIG. 19A and FIG. 19B are an example diagram 13 of a mapping rule according to an embodiment of this application.

As shown in any one of FIG. 17A and FIG. 17B to FIG. 19A and FIG. 19B, each of the first resource group and the second resource group includes a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. That is, the first resource group and the second resource group meet Condition 1.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a seventh cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a seventh cover code element corresponding to the reference signal.

The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. For a specific implementation of the first RE set, refer to a specific implementation of the second RE set in Scenario 2. Details are not described herein again. For a specific implementation of the seventh cover code element, refer to Scenario 3. Details are not described herein again.

In this case, the reference sequence element is multiplied by the corresponding seventh cover code element, and the product is mapped to the corresponding first RE set. This can ensure that ports in the first port group are orthogonal in a transmission process, and reduce signal transmission interference.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and an eighth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and an eighth cover code element corresponding to the reference signal.

The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group.

As shown in FIG. 17A and FIG. 17B to FIG. 19A and FIG. 19B, the second RE set in the second resource group is similar to the first RE set. For a specific implementation of the second RE set, refer to a specific implementation of the first RE set. Details are not described herein again.

In this case, the reference sequence element is multiplied by the corresponding eighth cover code element, and the product is mapped to the corresponding second RE set. This can ensure that ports in the second port group are orthogonal in a transmission process, and reduce signal transmission interference. In addition, in Scenario 4 in which the size of the first frequency domain unit is N times of the RB group (two RBs), for example, the size of the first frequency domain unit is two RBs or four RBs, compared with the mapping rule B shown in FIG. 2, in this embodiment of this application, a port capacity can be doubled in all time-frequency resources in the time-frequency unit, that is, the second port group whose quantity of ports is the same as that of ports in the first port group is added, to increase the quantity of supported transmitted streams, and improve the performance of the MIMO system.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the seventh orthogonal cover code sequence and a length of the eighth orthogonal cover code sequence may be 8.

For example, port 3 in the first port group may be corresponding to the seventh orthogonal cover code sequence whose length is 8, for example, +1/−1/+1/−1/+1/−1/+1/−1. To be specific, in the first RE set, port 3 sends corresponding reference signal sequence elements on eight REs in the first RE set, and port 3 is respectively corresponding to the orthogonal cover code sequence elements +1, −1, +1, −1, +1, −1, +1, and −1 on the eight REs. The eight REs in the first RE set may be REs corresponding to subcarrier 1, subcarrier 3, subcarrier 5, and subcarrier 7 in symbol l'=0 and symbol l'=1.

Similarly, port 12 in the second port group may be corresponding to the eighth orthogonal cover code sequence whose length is 8, for example, +1/+1/−1/−1/+1/+1/−1/−1. To be specific, in the second RE set, port 12 sends corresponding reference signal sequence elements on eight REs in the second RE set, and port 12 is respectively corresponding to the orthogonal cover code sequence elements +1, +1, −1, −1, +1, +1, −1, and −1 on the eight REs. The eight REs in the second RE set may be REs corresponding to subcarrier 0, subcarrier 2, subcarrier 4, and subcarrier 6 in symbol l'=0 and symbol l'=1. For specific implementations of the seventh orthogonal sequence and the eighth orthogonal sequence, refer to Scenario 2. Details are not described herein again.

In this case, an orthogonal cover code sequence whose length is 8, for example, the seventh orthogonal cover code sequence and the eighth orthogonal cover code sequence, is used in the time-frequency resources in the time-frequency unit, so that orthogonal ports can be expanded in the time-frequency resources.

It should be noted that ports in the first port group and the second port group may be divided into two CDM groups. A CDM group 7 may include ports 0/1/4/5/8/9/12/13, and a CDM group 8 may include ports 2/3/6/7/10/11/14/15. For specific implementations of the CDM group 7 and the CDM group 8, refer to Scenario 3. Details are not described herein again.

Optionally, the time-frequency unit may include subcarrier 0 to subcarrier 23 in frequency domain, and may include symbol 0 and symbol 1 in time domain. According to the mapping rule 11 shown in FIG. 17A and FIG. 17B, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain.

Therefore, the first resource group and the second resource group occupy a same time-frequency resource in the time-frequency unit, and each may include symbol 0 and symbol 1 in the time-frequency unit in time domain and include subcarrier 0 to subcarrier 23 in the time-frequency unit in frequency domain. For a specific implementation of mapping the reference signal to the first resource group and the second resource group based on FIG. 17A and FIG. 17B, refer to Scenario 1. Details are not described herein again.

In a specific implementation process, an embodiment of this application provides a formula and a table applicable to Scenario 4, to describe the mapping rule 11 shown in FIG. 17A and FIG. 17B. The reference signal is a demodulation reference signal DMRS, and the time unit is an orthogonal frequency division multiplexing OFDM symbol.

In the mapping rule 11, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 11 meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor. For a specific implementation of the formula in the mapping rule 11, refer to the formula in the mapping rule 1. Details are not described herein again.

Optionally, values of $w_f(k')$, $w_t(l')$, and Δ corresponding to port p may be determined based on Table 11. Table 11 is a correspondence table 11 between ports and cover code sub-elements provided in this embodiment of this application.

TABLE 11

| | | | $w_f'$ (k') | | | | | | | | | | | | $w_t$ (l') | |
|---|---|---|---|---|---|---|---|---|---|---|---|---|---|---|---|---|
| p | λ | Δ | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 | l' = 1 |
| 1000 | 0 | 0 | +1 | +1 | +1 | +1 | +1 | +1 | +1 | +1 | +1 | +1 | +1 | +1 | +1 | +1 |
| 1001 | 0 | 0 | +1 | −1 | +1 | −1 | +1 | −1 | +1 | −1 | +1 | −1 | +1 | −1 | +1 | +1 |
| 1002 | 1 | 1 | +1 | +1 | +1 | +1 | +1 | +1 | +1 | +1 | +1 | +1 | +1 | +1 | +1 | +1 |
| 1003 | 1 | 1 | +1 | −1 | +1 | −1 | +1 | −1 | +1 | −1 | +1 | −1 | +1 | −1 | +1 | +1 |
| 1004 | 0 | 0 | +1 | +1 | +1 | +1 | +1 | +1 | +1 | +1 | +1 | +1 | +1 | +1 | +1 | −1 |
| 1005 | 0 | 0 | +1 | −1 | +1 | −1 | +1 | −1 | +1 | −1 | +1 | −1 | +1 | −1 | +1 | −1 |
| 1006 | 1 | 1 | +1 | +1 | +1 | +1 | +1 | +1 | +1 | +1 | +1 | +1 | +1 | +1 | +1 | −1 |
| 1007 | 1 | 1 | +1 | −1 | +1 | −1 | +1 | −1 | +1 | −1 | +1 | −1 | +1 | −1 | +1 | −1 |
| 1008 | 0 | 0 | +1 | +1 | −1 | −1 | +1 | +1 | +1 | +1 | −1 | −1 | −1 | −1 | +1 | +1 |
| 1009 | 0 | 0 | +1 | −1 | −1 | +1 | +1 | −1 | +1 | −1 | −1 | +1 | −1 | +1 | +1 | +1 |

TABLE 11-continued

| | | | $w_f'$ (k') | | | | | | | | | | | | $w_t$ (l') | |
|---|---|---|---|---|---|---|---|---|---|---|---|---|---|---|---|---|
| p | λ | Δ | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 | l' = 1 |
| 1010 | 1 | 1 | +1 | +1 | −1 | −1 | +1 | +1 | +1 | +1 | −1 | −1 | −1 | −1 | +1 | +1 |
| 1011 | 1 | 1 | +1 | −1 | −1 | +1 | +1 | −1 | +1 | −1 | −1 | +1 | −1 | +1 | +1 | +1 |
| 1012 | 0 | 0 | +1 | +1 | −1 | −1 | +1 | +1 | +1 | +1 | −1 | −1 | −1 | −1 | +1 | −1 |
| 1013 | 0 | 0 | +1 | −1 | −1 | +1 | +1 | −1 | +1 | −1 | −1 | +1 | −1 | +1 | +1 | −1 |
| 1014 | 1 | 1 | +1 | +1 | −1 | −1 | +1 | +1 | +1 | +1 | −1 | −1 | −1 | −1 | +1 | −1 |
| 1015 | 1 | 1 | +1 | −1 | −1 | +1 | +1 | −1 | +1 | −1 | −1 | +1 | −1 | +1 | +1 | −1 |

λ is an index of an orthogonal multiplexing group to which port p belongs, and ports in a same orthogonal multiplexing group occupy a same time-frequency resource. For a specific implementation of table in the mapping rule 11, refer to the table in the mapping rule 1. Details are not described herein again.

Optionally, the time-frequency unit may include subcarrier 0 to subcarrier 23 in frequency domain, and may include symbol 0 and symbol 1 in time domain. According to the mapping rule 12 shown in FIG. 18A and FIG. 181B, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. For specific implementations of the third resource sub-block, the fourth resource sub-block, and the fifth resource sub-block in the mapping rule 12, refer to the mapping rule 11 shown in FIG. 17A and FIG. 17B. Details are not described herein again.

In a specific implementation process, an embodiment of this application provides a formula and a table applicable to Scenario 4, to describe the mapping rule 12 shown in FIG. 18A and FIG. 18B. The reference signal is a demodulation reference signal DMRS, and the time unit is an orthogonal frequency division multiplexing OFDM symbol.

In the mapping rule 12, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose $(k, l)_{p,\mu}$ index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 12 may meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the k subcarrier, m=12n+k', and Δ is a subcarrier offset factor. For a specific implementation of the formula in the mapping rule 12, refer to the formula in the mapping rule 1. Details are not described herein again.

Optionally, values of $w_f(k')$, $w_t(l')$ and Δ corresponding to port p may be determined based on Table 12. Table 12 is a correspondence table 12 between ports and cover code sub-elements provided in this embodiment of this application.

TABLE 12

| | | | $w_f$ (k') | | | | | | | | | | | | $w_t$ (l') | |
|---|---|---|---|---|---|---|---|---|---|---|---|---|---|---|---|---|
| p | λ | Δ | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 | l' = 1 |
| 1000 | 0 | 0 | +1 | +1 | +1 | +1 | +1 | +1 | +1 | +1 | +1 | +1 | +1 | +1 | +1 | +1 |
| 1001 | 0 | 0 | +1 | −1 | +1 | −1 | +1 | −1 | +1 | −1 | +1 | −1 | +1 | −1 | +1 | +1 |
| 1002 | 1 | 1 | +1 | +1 | +1 | +1 | +1 | +1 | +1 | +1 | +1 | +1 | +1 | +1 | +1 | +1 |
| 1003 | 1 | 1 | +1 | −1 | +1 | −1 | +1 | −1 | +1 | −1 | +1 | −1 | +1 | −1 | +1 | +1 |
| 1004 | 0 | 0 | +1 | +1 | +1 | +1 | +1 | +1 | +1 | +1 | +1 | +1 | +1 | +1 | +1 | −1 |
| 1005 | 0 | 0 | +1 | −1 | +1 | −1 | +1 | −1 | +1 | −1 | +1 | −1 | +1 | −1 | +1 | −1 |
| 1006 | 1 | 1 | +1 | +1 | +1 | +1 | +1 | +1 | +1 | +1 | +1 | +1 | +1 | +1 | +1 | −1 |
| 1007 | 1 | 1 | +1 | −1 | +1 | −1 | +1 | −1 | +1 | −1 | +1 | −1 | +1 | −1 | +1 | −1 |
| 1008 | 0 | 0 | +1 | +1 | −1 | −1 | +1 | +1 | +1 | +1 | −1 | −1 | −1 | −1 | +1 | +1 |
| 1009 | 0 | 0 | +1 | −1 | −1 | +1 | +1 | −1 | +1 | −1 | −1 | +1 | −1 | +1 | +1 | +1 |
| 1010 | 1 | 1 | +1 | +1 | −1 | −1 | +1 | +1 | +1 | +1 | −1 | −1 | −1 | −1 | +1 | +1 |
| 1011 | 1 | 1 | +1 | −1 | −1 | +1 | +1 | −1 | +1 | −1 | −1 | +1 | −1 | +1 | +1 | +1 |

TABLE 12-continued

| p | λ | Δ | $w_f(k')$ | | | | | | | | | | | | $w_t(l')$ | |
|---|---|---|---|---|---|---|---|---|---|---|---|---|---|---|---|---|
| | | | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 | l' = 1 |
| 1012 | 0 | 0 | +1 | +1 | −1 | −1 | +1 | +1 | +1 | +1 | −1 | −1 | −1 | −1 | +1 | −1 |
| 1013 | 0 | 0 | +1 | −1 | −1 | +1 | +1 | −1 | +1 | −1 | −1 | +1 | −1 | +1 | +1 | −1 |
| 1014 | 1 | 1 | +1 | +1 | −1 | −1 | +1 | +1 | +1 | +1 | −1 | −1 | −1 | −1 | +1 | −1 |
| 1015 | 1 | 1 | +1 | −1 | −1 | +1 | +1 | −1 | +1 | −1 | −1 | +1 | −1 | +1 | +1 | −1 |

λ is an index of an orthogonal multiplexing group to which port p belongs, and ports in a same orthogonal multiplexing group occupy a same time-frequency resource. For a specific implementation of table in the mapping rule 12, refer to the table in the mapping rule 1. Details are not described herein again.

Optionally, the time-frequency unit may include subcarrier 0 to subcarrier 23 in frequency domain, and may include symbol 0 in time domain. According to the mapping rule 13 shown in FIG. 19A and FIG. 19B, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain. For specific implementations of the third resource sub-block, the fourth resource sub-block, and the fifth resource sub-block in the mapping rule 13, refer to the mapping rule 11 shown in FIG. 17A and FIG. 17B. Details are not described herein again.

In a specific implementation process, an embodiment of this application provides a formula and a table applicable to Scenario 4, to describe the mapping rule 13 shown in FIG. 19A and FIG. 19B. The reference signal is a demodulation reference signal DMRS, and the time unit is an orthogonal frequency division multiplexing OFDM symbol.

In the mapping rule 13, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 13 may meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{ ; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the h OFDM symbol, $w_f(k')$ is a frequency domain cover code sub-element corresponding to the $k^{th}$ subcarrier, m=12n+k', and Δ is a subcarrier offset factor. For a specific implementation of the formula in the mapping rule 13, refer to the formula in the mapping rule 1. Details are not described herein again.

Optionally, values of $w_f(k')$, $w_t(l')$, and Δ corresponding to port p may be determined based on Table 13. Table 13 is a correspondence table 13 between ports and cover code sub-elements provided in this embodiment of this application.

TABLE 13

| p | λ | Δ | $w_f(k')$ | | | | | | | | | | | | $w_t(l')$ | |
|---|---|---|---|---|---|---|---|---|---|---|---|---|---|---|---|---|
| | | | k' = 0 | k' = 1 | k' = 2 | k' = 3 | k' = 4 | k' = 5 | k' = 6 | k' = 7 | k' = 8 | k' = 9 | k' = 10 | k' = 11 | l' = 0 | l' = 1 |
| 1000 | 0 | 0 | +1 | +1 | +1 | +1 | +1 | +1 | +1 | +1 | +1 | +1 | +1 | +1 | +1 | +1 |
| 1001 | 0 | 0 | +1 | −1 | +1 | −1 | +1 | −1 | +1 | −1 | +1 | −1 | +1 | −1 | +1 | +1 |
| 1002 | 1 | 1 | +1 | +1 | +1 | +1 | +1 | +1 | +1 | +1 | +1 | +1 | +1 | +1 | +1 | +1 |
| 1003 | 1 | 1 | +1 | −1 | +1 | −1 | +1 | −1 | +1 | −1 | +1 | −1 | +1 | −1 | +1 | +1 |
| 1004 | 0 | 0 | +1 | +1 | +1 | +1 | +1 | +1 | +1 | +1 | +1 | +1 | +1 | +1 | +1 | −1 |
| 1005 | 0 | 0 | +1 | −1 | +1 | −1 | +1 | −1 | +1 | −1 | +1 | −1 | +1 | −1 | +1 | −1 |
| 1006 | 1 | 1 | +1 | +1 | +1 | +1 | +1 | +1 | +1 | +1 | +1 | +1 | +1 | +1 | +1 | −1 |
| 1007 | 1 | 1 | +1 | −1 | +1 | −1 | +1 | −1 | +1 | −1 | +1 | −1 | +1 | −1 | +1 | −1 |
| 1008 | 0 | 0 | +1 | +1 | −1 | −1 | +1 | +1 | −1 | −1 | +1 | +1 | −1 | −1 | +1 | +1 |
| 1009 | 0 | 0 | +1 | −1 | −1 | +1 | +1 | −1 | −1 | +1 | +1 | −1 | −1 | +1 | +1 | +1 |
| 1010 | 1 | 1 | +1 | +1 | −1 | −1 | +1 | +1 | −1 | −1 | +1 | +1 | −1 | −1 | +1 | +1 |
| 1011 | 1 | 1 | +1 | −1 | −1 | +1 | +1 | −1 | −1 | +1 | +1 | −1 | −1 | +1 | +1 | +1 |
| 1012 | 0 | 0 | +1 | +1 | −1 | −1 | +1 | +1 | −1 | −1 | +1 | +1 | −1 | −1 | +1 | −1 |
| 1013 | 0 | 0 | +1 | −1 | −1 | +1 | +1 | −1 | −1 | +1 | +1 | −1 | −1 | +1 | +1 | −1 |

TABLE 13-continued

| p | λ | Δ | $w_f(k')$ k' = 0 | k' = 1 | k' = 2 | k' = 3 | k' = 4 | k' = 5 | k' = 6 | k' = 7 | k' = 8 | k' = 9 | k' = 10 | k' = 11 | $w_t(l')$ l' = 0 | l' = 1 |
|---|---|---|---|---|---|---|---|---|---|---|---|---|---|---|---|---|
| 1014 | 1 | 1 | +1 | +1 | −1 | −1 | +1 | +1 | −1 | −1 | +1 | +1 | −1 | −1 | +1 | −1 |
| 1015 | 1 | 1 | +1 | −1 | −1 | +1 | +1 | −1 | −1 | +1 | +1 | −1 | −1 | +1 | +1 | −1 |

λ is an index of an orthogonal multiplexing group to which port p belongs, and ports in a same orthogonal multiplexing group occupy a same time-frequency resource. For a specific implementation of table in the mapping rule 13, refer to the table in the mapping rule 1. Details are not described herein again.

In addition, in the mapping rule 13, in the scenario in which the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain. In this case, in a scenario in which the size of the first frequency domain unit may be N times of the resource block RB group, a time-frequency unit including eight contiguous subcarriers in frequency domain may be used to design a corresponding mapping rule 14.

An embodiment of this application provides a mapping rule: a mapping rule 14, applicable to Scenario 4. FIG. 20 is an example diagram 14 of a mapping rule according to an embodiment of this application. According to the mapping rule 14 shown in FIG. 20, the time-frequency unit includes eight contiguous subcarriers (a total of eight contiguous subcarriers, denoted as subcarrier 0 to subcarrier 7) in frequency domain, and includes two time units (denoted as symbol 0 and symbol 1) in time domain. Correspondingly, the time-frequency unit shown in FIG. 20 may be any one of the third resource sub-block, the fourth resource sub-block, and the fifth resource sub-block.

In a specific implementation process, an embodiment of this application provides a formula and a table applicable to Scenario 4, to describe the mapping rule 14 shown in FIG. 20. The reference signal is a demodulation reference signal DMRS, and the time unit is an orthogonal frequency division multiplexing OFDM symbol.

In the mapping rule 14, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 14 meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1015];$$

-continued $$l = \bar{l} + l';$$

$$n = 0, 1, \ldots ; \text{and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. For a specific implementation of the formula in the mapping rule 14, refer to the formula in the mapping rule 1. Details are not described herein again.

Optionally, values of $w_f(k')$, $w_t(l')$, and Δ corresponding to port p may be determined based on Table 14. Table 14 is a correspondence table 14 between ports and cover code sub-elements provided in this embodiment of this application.

λ is an index of an orthogonal multiplexing group to which port p belongs, and ports in a same orthogonal multiplexing group occupy a same time-frequency resource. In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$, to improve DMRS mapping efficiency.

TABLE 14

| p | λ | Δ | $w_f(k')$ k' = 0 | k' = 1 | k' = 2 | k' = 3 | $w_t(l')$ l' = 0 | l' = 1 |
|---|---|---|---|---|---|---|---|---|
| 1000 | 0 | 0 | +1 | +1 | +1 | +1 | +1 | +1 |
| 1001 | 0 | 0 | +1 | −1 | +1 | −1 | +1 | +1 |
| 1002 | 1 | 1 | +1 | +1 | +1 | +1 | +1 | +1 |
| 1003 | 1 | 1 | +1 | −1 | +1 | −1 | +1 | +1 |
| 1004 | 0 | 0 | +1 | +1 | +1 | +1 | +1 | −1 |
| 1005 | 0 | 0 | +1 | −1 | +1 | −1 | +1 | −1 |

TABLE 14-continued

| p | λ | Δ | $w_f(k')$ k' = 0 | k' = 1 | k' = 2 | k' = 3 | $w_t(l')$ l' = 0 | l' = 1 |
|---|---|---|---|---|---|---|---|---|
| 1006 | 1 | 1 | +1 | +1 | +1 | +1 | +1 | −1 |
| 1007 | 1 | 1 | +1 | −1 | +1 | −1 | +1 | −1 |
| 1008 | 0 | 0 | +1 | +1 | −1 | −1 | +1 | +1 |
| 1009 | 0 | 0 | +1 | −1 | −1 | +1 | +1 | +1 |
| 1010 | 1 | 1 | +1 | +1 | −1 | −1 | +1 | +1 |
| 1011 | 1 | 1 | +1 | −1 | −1 | +1 | +1 | +1 |
| 1012 | 0 | 0 | +1 | +1 | −1 | −1 | +1 | −1 |
| 1013 | 0 | 0 | +1 | −1 | −1 | +1 | +1 | −1 |
| 1014 | 1 | 1 | +1 | +1 | −1 | −1 | +1 | −1 |
| 1015 | 1 | 1 | +1 | −1 | −1 | +1 | +1 | −1 |

In still yet another possible design scheme, an embodiment of this application further provides a mapping rule: a mapping rule 15, applicable to Scenario 5: A mapping type of the reference signal is type 1, the size of the first frequency domain unit may be six subcarriers, and the time-frequency unit may include one RB (a total of 12 contiguous subcarriers, denoted as subcarrier 0 to subcarrier 11) in frequency domain, and may include onetime unit in time domain. Subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first frequency domain unit may be a PRG, and the time unit may be an OFDM symbol.

For example, the first port group may include port 0 to port 3, and the second port group may include port 4 and port 5. Ports carried by subcarrier 0 to subcarrier 4 and subcarrier 6 in the time-frequency unit are corresponding to the same first precoding matrix. To be specific, the transmitting end precodes reference signal symbols corresponding to subcarrier 0 to subcarrier 4 and subcarrier 6 by using the same precoding matrix. Therefore, port 4 and port 5 may be corresponding to one complete OCC group (where despreading may be performed by using one group of OCC codewords) on subcarrier 4 and subcarrier 6, and the OCC group is used to perform channel estimation on the $1^{st}$ precoding resource block group in the time-frequency unit. Therefore, subcarrier 0 to subcarrier 4 and subcarrier 6 may be jointly used to perform channel estimation in the $1^{st}$ precoding resource block group.

Similarly, ports carried by subcarrier 5 and subcarrier 7 to subcarrier 11 are corresponding to a same second precoding matrix. To be specific, the transmitting end precodes reference signal symbols corresponding to subcarrier 5 and subcarrier 7 to subcarrier 11 by using the same precoding matrix. Therefore, port 4 and port 5 may be corresponding to one complete OCC group (where despreading may be performed by using one group of OCC codewords) on subcarrier 5 and subcarrier 7, and the OCC group is used to perform channel estimation on the $2^{nd}$ precoding resource block group in the time-frequency unit. In other words, subcarrier 5 and subcarrier 7 to subcarrier 11 may be jointly used to perform channel estimation in the $2^{nd}$ precoding resource block group. For a specific implementation of the OCC group and a specific implementation of the time-frequency unit in time domain and in frequency domain in Scenario 5, refer to Scenario 1. Details are not described herein again.

Figure 21:
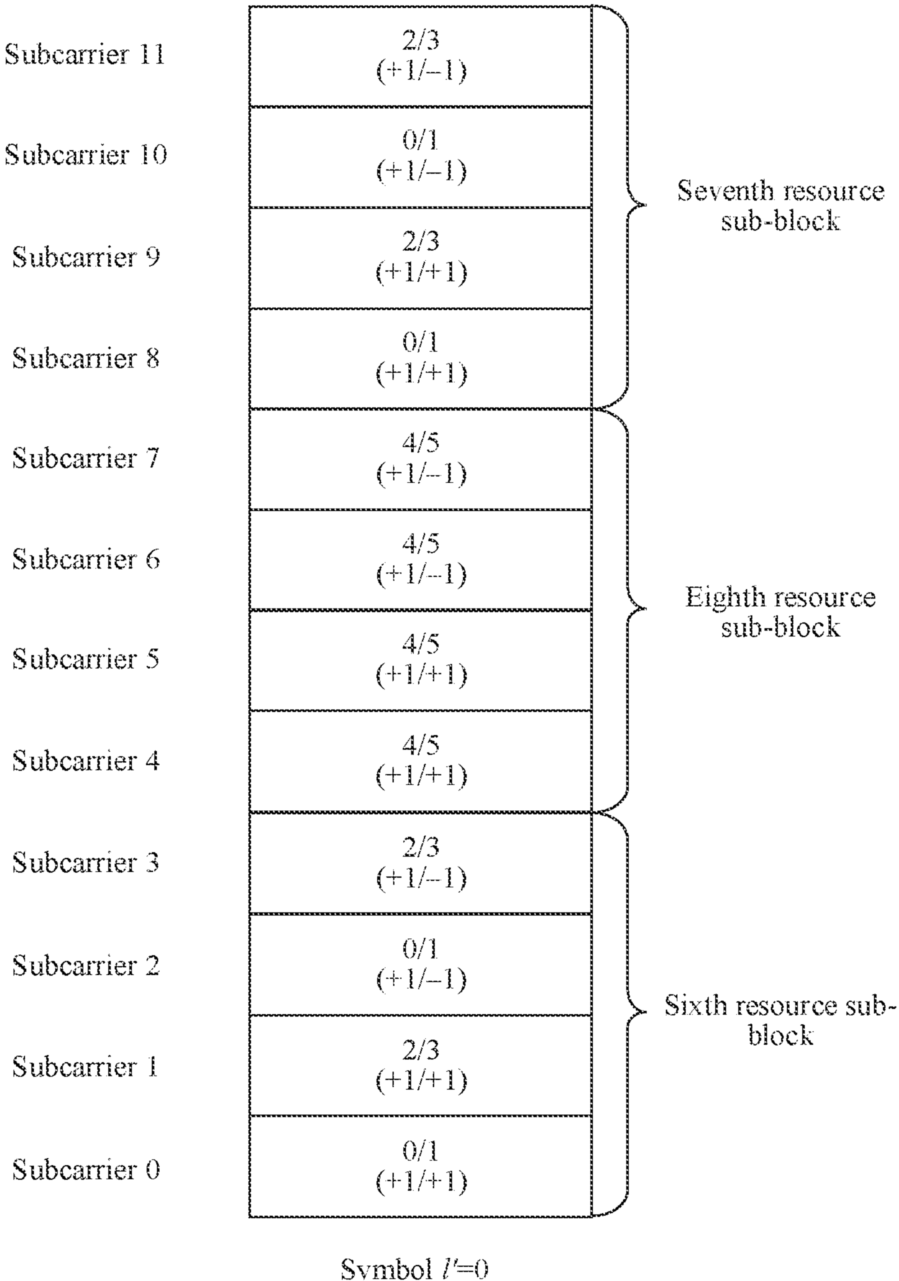
FIG. 21 is an example diagram 15 of a mapping rule according to an embodiment of this application.

The following specifically describes the mapping rule 15 applicable to Scenario 5. FIG. 21 is an example diagram 15 of a mapping rule according to an embodiment of this application. As shown in FIG. 21, the first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. That is, the first resource group and the second resource group meet Condition 2.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a ninth cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a ninth cover code element corresponding to the reference signal.

The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group.

For example, refer to FIG. 21. The first RE set may be an RE set including REs corresponding to subcarrier 0 and subcarrier 2 in symbol l'=0, an RE set including REs corresponding to subcarrier 8 and subcarrier 10 in symbol l'=0, an RE set including REs corresponding to subcarrier 1 and subcarrier 3 in symbol l'=0, or an RE set including Res corresponding to subcarrier 9 and subcarrier 11 in symbol l'=0. That is, any two adjacent subcarriers in a same first RE set are spaced by one subcarrier in frequency domain. For a specific implementation of the first RE set, refer to Scenario 1. Details are not described herein again.

In this case, the reference sequence element is multiplied by the corresponding ninth cover code element, and the product is mapped to the corresponding first RE set. This can ensure that ports in the first port group are orthogonal in a transmission process, and reduce signal transmission interference.

In addition, for REs corresponding to subcarrier 0 and subcarrier 2 in symbol l'=0, a port group that includes ports of reference signals mapped to the foregoing time-frequency resources may be referred to as a CDM group. For REs corresponding to subcarrier 1 and subcarrier 3 in symbol l'=0, a port group that includes ports of reference signals mapped to the foregoing time-frequency resources is referred to as a CDM group. Reference signal ports included in a same CDM group occupy a same RE, that is, occupy a same first RE set. For specific implementations of the CDM group and the first RE set, refer to Scenario 1. Details are not described herein again.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and a tenth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a tenth cover code element corresponding to the reference signal.

The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group.

For example, refer to FIG. 21. The second RE set may be an RE set including REs corresponding to subcarrier 4 and subcarrier 6 in symbol l'=0, or an RE set including REs corresponding to subcarrier 5 and subcarrier 7 in symbol l'=0. That is, subcarriers corresponding to any two adjacent REs in a same first RE set are spaced by one subcarrier in frequency domain. For a specific implementation of the second RE set, refer to a specific implementation of the first RE set in Scenario 1. Details are not described herein again.

In this case, the reference sequence element is multiplied by the corresponding tenth cover code element, and the product is mapped to the corresponding second RE set. This can ensure that ports in the second port group are orthogonal in a transmission process, and reduce signal transmission interference. In addition, in Scenario 5 in which the size of the first frequency domain unit is six subcarriers, compared with the mapping rule A in FIG. 1, in this embodiment of this application, some time-frequency resources in the time-frequency unit that carry existing ports may be used to carry a new port group, namely, the second port group, so that the quantity of supported transmitted streams is increased and the performance of the MIMO system is improved.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the ninth orthogonal cover code sequence and a length of the tenth orthogonal cover code sequence are 2. For example, port 1 in the first port group may be corresponding to the ninth orthogonal cover code sequence whose length is 2, for example, +1/−1. To be specific, in the first RE set, port 1 sends corresponding reference signal sequence elements on two REs in the first RE set, and port 1 is respectively corresponding to the orthogonal cover code sequence elements +1 and −1 on the two REs. The two REs in the first RE set may be the REs corresponding to subcarrier 0 and subcarrier 2 in symbol l'=0.

Similarly, port 4 in the second port group may be corresponding to the tenth orthogonal cover code sequence whose length is 2, for example, +1/+1. To be specific, in the second RE set, port 4 sends corresponding reference signal sequence elements on two REs in the second RE set, and port 4 is respectively corresponding to the orthogonal cover code sequence elements +1 and +1 on the two REs. The two REs in the second RE set may be the REs corresponding to subcarrier 4 and subcarrier 6 in symbol l'=0. For specific implementations of the ninth orthogonal cover code sequence and the tenth orthogonal cover code sequence, refer to Scenario 1. Details are not described herein again.

In this case, an orthogonal cover code sequence whose length is 2, for example, the ninth orthogonal cover code sequence and the tenth orthogonal cover code sequence, is used in the time-frequency resources in the time-frequency unit, to ensure orthogonality of the ports in the time-frequency resources.

It should be noted that ports in the first port group and the second port group may be divided into three CDM groups. A CDM group 9 may include ports 0/1, a CDM group 10 may include ports 2/3, and a CDM group 11 may include ports 4/5. For specific implementations of the CDM groups, refer to Scenario 1. Details are not described herein again.

Optionally, the time-frequency unit may include subcarrier 0 to subcarrier 11 in frequency domain, and may include symbol 0 in time domain. According to the mapping rule 15 shown in FIG. 21, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain.

Therefore, the first resource group and the second resource group separately occupy different time-frequency resources in the time-frequency unit. That is, the first resource group and the second resource group are mutually exclusive. The first resource group and the second resource group each may include symbol 0 in the time-frequency unit, the first resource group may include subcarrier 0 to subcarrier 3 and subcarrier 8 and subcarrier 11 in the time-frequency unit in frequency domain, and the second resource group may include subcarrier 4 to subcarrier 7 in the time-frequency unit in frequency domain. For a specific implementation of mapping the reference signal to the first resource group and the second resource group based on FIG. 21, refer to Scenario 1. Details are not described herein again.

In a specific implementation process, an embodiment of this application provides a formula and a table applicable to Scenario 3, to describe the mapping rule 15 shown in FIG. 21. The reference signal is a demodulation reference signal DMRS, and the time unit is an orthogonal frequency division multiplexing OFDM symbol.

In the mapping rule 15, for port p, an $m^{th}$ reference sequence element r(m) in the DMRS is mapped to an RE whose index is (k, according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 15 meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,4,5 & p \in [1000, 1003] \\ 2,3 & p \in [1004, 1005] \end{cases};$$

$$l = \bar{l} + l';$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 15, refer to the formula in the mapping rule 1. Details are not described herein again.

Optionally, values of $w_f(k')$, $w_t(l')$, and Δ corresponding to port p may be determined based on Table 15. Table 15 is a correspondence table 15 between ports and cover code sub-elements provided in this embodiment of this application.

TABLE 15

| | | | $w_f$(k') | | | | | | $w_t$ (l') |
|---|---|---|---|---|---|---|---|---|---|
| p | λ | Δ | k' = 0 | k' = 1 | k' = 2 | k' = 3 | k' = 4 | k' = 5 | l' = 0 |
| 1000 | 0 | 0 | +1 | +1 | | | +1 | +1 | +1 |
| 1001 | 0 | 0 | +1 | −1 | | | +1 | −1 | +1 |
| 1002 | 1 | 1 | +1 | +1 | | | +1 | +1 | +1 |
| 1003 | 1 | 1 | +1 | −1 | | | +1 | −1 | +1 |
| 1004 | 2 | 0 | | | +1 | +1 | | | +1 |
| 1005 | 2 | 0 | | | +1 | −1 | | | +1 |
| 1004 | 2 | 1 | | | +1 | +1 | | | +1 |
| 1005 | 2 | 1 | | | +1 | −1 | | | +1 |

λ is an index of an orthogonal multiplexing group to which port p belongs, and ports in a same orthogonal multiplexing group occupy a same time-frequency resource.

In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$, to improve DMRS mapping efficiency.

In a further possible design scheme, an embodiment of this application further provides a mapping rule: a mapping rule 16, applicable to Scenario 6, A mapping type of the reference signal is type 1, the size of the first frequency domain unit may be six subcarriers, and the time-frequency unit may include one RB (a total of 12 contiguous subcarriers, denoted as subcarrier 0 to subcarrier 11) in frequency domain and two consecutive time units in time domain, where subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first frequency domain unit may be a PRG, and the time unit may be an OFDM symbol.

For example, the first port group may include port 0 to port 7, and the second port group may include port 8 to port 11. For a specific implementation of the time-frequency unit in Scenario 6, refer to Scenario 5. Details are not described herein again.

The following specifically describes the mapping rule 16 applicable to Scenario 6. FIG. 22 is an example diagram 16 of a mapping rule according to an embodiment of this application. As shown in FIG. 22, the first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. That is, the first resource group and the second resource group meet Condition 2.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and an eleventh cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and an eleventh cover code element corresponding to the reference signal.

The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group.

For example, refer to FIG. 22. The first RE set may be an RE set including REs corresponding to subcarrier 0 and subcarrier 2 in symbol l'=0 and symbol l'=1, an RE set including REs corresponding to subcarrier 8 and subcarrier 10 in symbol l'=0 and symbol l'=1, an RE set including REs corresponding to subcarrier 1 and subcarrier 3 in symbol l'=0 and symbol l'=1, or an RE set including Res corresponding to subcarrier 9 and subcarrier 11 in symbol l'=0 and symbol l'=1. That is, the first RE set may be an RE set including two Res that are spaced by one subcarrier in frequency domain.

In this case, the reference sequence element is multiplied by the corresponding eleventh cover code element, and the product is mapped to the corresponding first RE set. This can ensure that ports in the first port group are orthogonal in a transmission process, and reduce signal transmission interference.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and a twelfth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a twelfth cover code element corresponding to the reference signal.

The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group. For a specific implementation of the eleventh orthogonal cover code sequence, refer to Scenario 5. Details are not described herein again.

For example, refer to FIG. 22. The second RE set may be an RE set including REs corresponding to subcarrier 4 and subcarrier 6 in symbol l'=0 and symbol l'=1, or an RE set including REs corresponding to subcarrier 5 and subcarrier 7 in symbol l'=0 and symbol 1'=1. For a specific implementation of the second RE set, refer to the first RE set in Scenario 5. Details are not described herein again.

In this case, the reference sequence element is multiplied by the corresponding twelfth cover code element, and the product is mapped to the corresponding second RE set. This can ensure that ports in the second port group are orthogonal in a transmission process, and reduce signal transmission interference. In addition, in Scenario 6 in which the size of the first frequency domain unit is six subcarriers, compared with the mapping rule B in FIG. 2, in this embodiment of this application, some time-frequency resources in the time-frequency unit that carry existing ports may be used to carry a new port group, namely, the second port group, so that the quantity of supported transmitted streams is increased and the performance of the MIMO system is improved.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the eleventh orthogonal cover code sequence and a length of the twelfth orthogonal cover code sequence may be 4. For example, port 1 in the first port group may be corresponding to the eleventh orthogonal cover code sequence whose length is 4, for example, +1/−11+1/−1. To be specific, in the first RE set, port 1 sends corresponding reference signal sequence elements on four REs in the first RE set, and port 1 is respectively corresponding to the orthogonal cover code sequence elements +1, −1, +1, and −1 on the four REs. The four REs in the first RE set may be the REs corresponding to subcarrier 0 and subcarrier 2 in symbol l'=0 and symbol l'=1.

Similarly, port 11 in the second port group is corresponding to the twelfth orthogonal cover code sequence whose length is 4, for example, +1/−1/−1/+1. In the second RE set, port 11 sends corresponding reference signal sequence elements on four REs in the second RE set, and port 11 is respectively corresponding to the orthogonal cover code sequence elements +1, −1, −1, and +1 on the four REs. The four REs in the second RE set may be the REs corresponding to subcarrier 4 and subcarrier 6 in symbol l'=0 and symbol l'=1. For specific implementations of the eleventh orthogonal cover code sequence and the twelfth orthogonal cover code sequence, refer to Scenario 1. Details are not described herein again.

In this case, an orthogonal cover code sequence whose length is 4, for example, the eleventh orthogonal cover code sequence and the twelfth orthogonal cover code sequence, is used in the time-frequency resources in the time-frequency unit, to ensure orthogonality of the ports in the time-frequency resources.

It should be noted that ports in the first port group and the second port group may be divided into three CDM groups. A CDM group 12 may include ports 0/1/4/5, a CDM group 13 may include ports 2/3/6/7, and a CDM group 14 may include ports 8/9/10/11. For specific implementations of the CDM group 12, the CDM group 13, and the CDM group 14, refer to Scenario 5. Details are not described herein again.

Optionally, the time-frequency unit may include subcarrier 0 to subcarrier 11 in frequency domain, and may include symbol 0 and symbol 1 in time domain. According to the mapping rule 16 shown in FIG. 22, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain.

Therefore, the first resource group and the second resource group separately occupy different time-frequency resources in the time-frequency unit. For specific implementations of the first resource group and the second resource group, refer to Scenario 2. For a specific implementation of mapping the reference signal to the first resource group and the second resource group based on FIG. 22, refer to Scenario 1. Details are not described herein again.

In a specific implementation process, an embodiment of this application provides a formula and a table applicable to Scenario 3, to describe the mapping rule 16 shown in FIG. 22. The reference signal is a demodulation reference signal DMRS, and the time unit is an orthogonal frequency division multiplexing OFDM symbol.

In the mapping rule 16, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 16 meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,4,5 & p \in [1000, 1007] \\ 2,3 & p \in [1008, 1011] \end{cases};$$

$$l = \bar{l} + l';$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor. For a specific implementation of the formula in the mapping rule 16, refer to the formula in the mapping rule 1. Details are not described herein again.

Optionally, values of $w_f(k')$, $w_t(l')$, and Δ corresponding to port p may be determined based on Table 16. Table 16 is a correspondence table 16 between ports and cover code sub-elements provided in this embodiment of this application.

TABLE 16

| | | | $w_f(k')$ | | | | | | $w_t(l')$ | |
|---|---|---|---|---|---|---|---|---|---|---|
| p | λ | Δ | k' = 0 | k' = 1 | k' = 2 | k' = 3 | k' = 4 | k' = 5 | l' = 0 | l' = 1 |
| 1000 | 0 | 0 | +1 | +1 | | | +1 | +1 | +1 | +1 |
| 1001 | 0 | 0 | +1 | −1 | | | +1 | −1 | +1 | +1 |
| 1002 | 1 | 1 | +1 | +1 | | | +1 | +1 | +1 | +1 |
| 1003 | 1 | 1 | +1 | −1 | | | +1 | −1 | +1 | +1 |
| 1004 | 0 | 0 | +1 | +1 | | | +1 | +1 | +1 | −1 |
| 1005 | 0 | 0 | +1 | −1 | | | +1 | −1 | +1 | −1 |
| 1006 | 1 | 1 | +1 | +1 | | | +1 | +1 | +1 | −1 |
| 1007 | 1 | 1 | +1 | −1 | | | +1 | −1 | +1 | −1 |
| 1008 | 9 | 0 | | | +1 | +1 | | | +1 | +1 |
| 1009 | 2 | 0 | | | +1 | −1 | | | +1 | +1 |
| 1010 | 2 | 0 | | | +1 | +1 | | | +1 | −1 |
| 1011 | 2 | 0 | | | +1 | −1 | | | +1 | −1 |
| 1008 | 2 | 1 | | | +1 | +1 | | | +1 | +1 |
| 1009 | 9 | 1 | | | +1 | −1 | | | +1 | +1 |
| 1010 | 2 | 1 | | | +1 | +1 | | | +1 | −1 |
| 1011 | 2 | 1 | | | +1 | −1 | | | +1 | −1 |

λ is an index of an orthogonal multiplexing group to which port p belongs, and ports in a same orthogonal multiplexing group occupy a same time-frequency resource.

In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$, to improve DMRS mapping efficiency.

Figure 23:
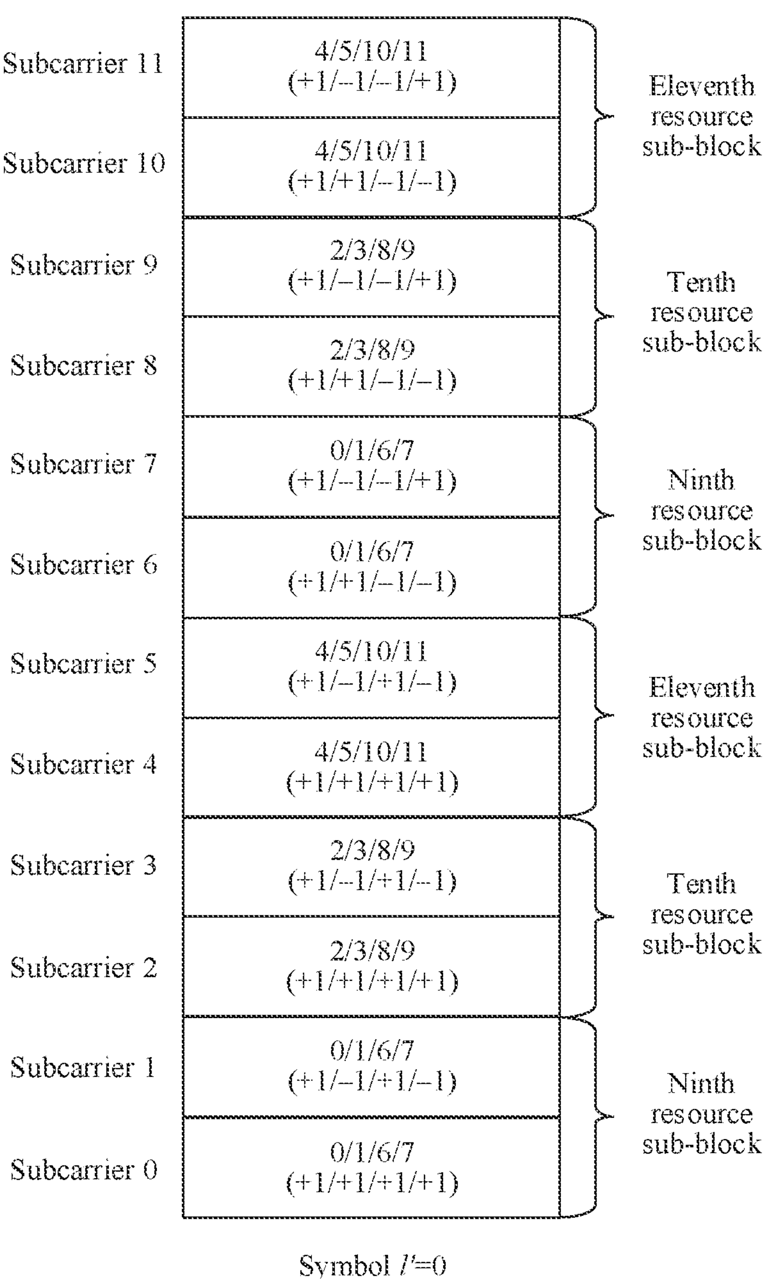
FIG. 23 is an example diagram 17 of a mapping rule according to an embodiment of this application.
Figure 24:
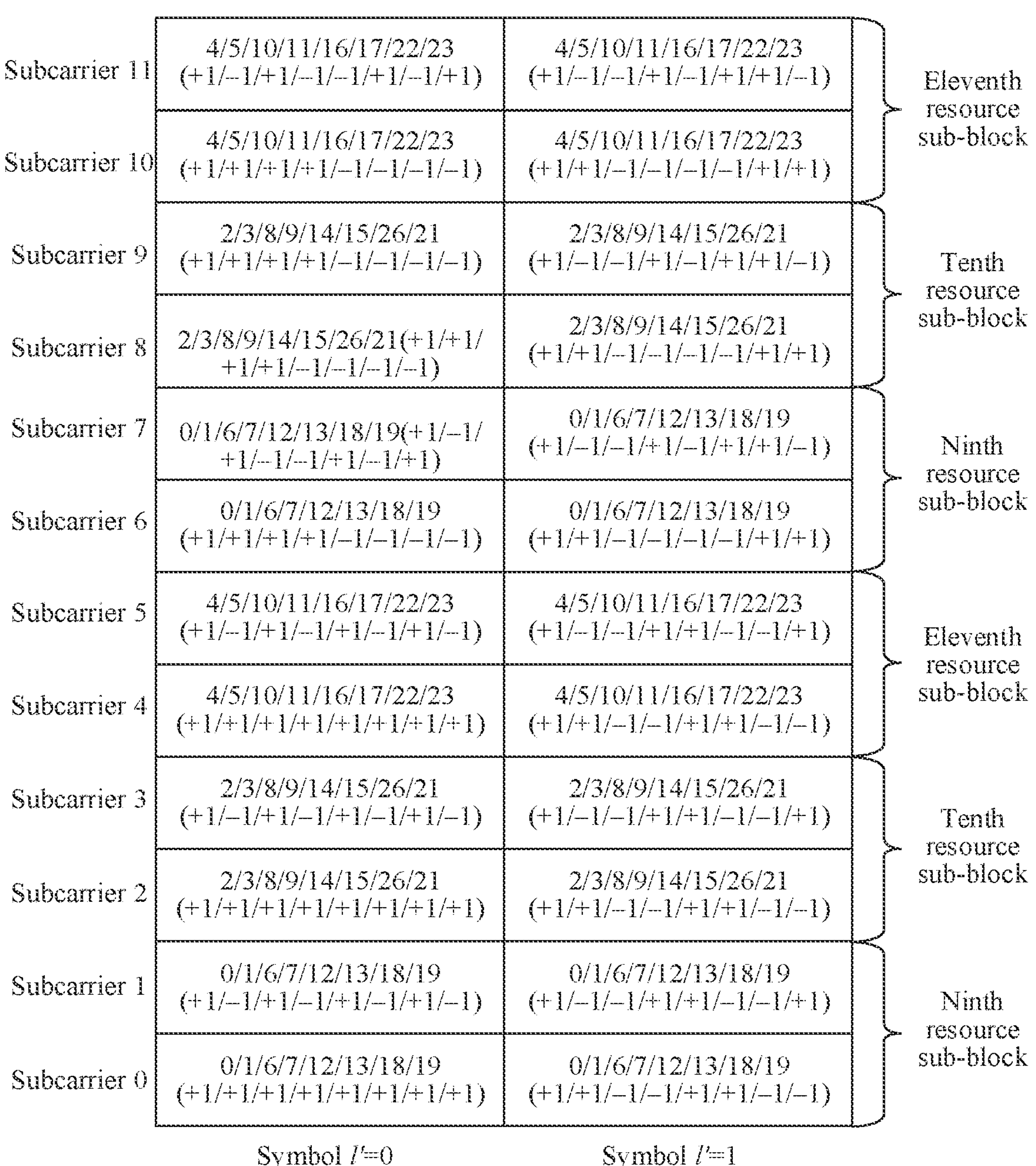
FIG. 24 is an example diagram 18 of a mapping rule according to an embodiment of this application.

With reference to several scenarios and examples shown in FIG. 23 and FIG. 24, the following describes in detail specific implementation of the reference signal mapping method shown in FIG. 6 when a mapping type of the reference signal is type 2.

In a still further possible design scheme, an embodiment of this application further provides a mapping rule: a mapping rule 17, applicable to Scenario 7: A mapping type of the reference signal is type 2, the size of the first frequency domain unit may be greater than or equal to one resource block RB, and the time-frequency unit may include one RB (a total of 12 contiguous subcarriers, denoted as subcarrier 0 to subcarrier 11) in frequency domain, and may include one time unit in time domain. The first port group may include six ports, and the second port group may include six ports. The first frequency domain unit may be a PRG, and the time unit may be an OFDM symbol.

For example, the first port group may include port 0 to port 5, and the second port group may include port 6 to port 11. For a specific implementation of the time-frequency unit in time domain and frequency domain in Scenario 7, refer to Scenario 1. Details are not described herein again.

The following specifically describes the mapping rule 17 applicable to Scenario 7. FIG. 23 is an example diagram 17 of a mapping rule according to an embodiment of this application. As shown in FIG. 23, the first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. That is, the first resource group and the second resource group meet Condition 1.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a thirteenth cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a thirteenth cover code element corresponding to the reference signal.

For example, in the mapping type 2, the first RE set may include at least one subcarrier pair in the first resource group, and one subcarrier includes two adjacent subcarriers. For example, refer to FIG. 23. The first RE set may be a set including REs corresponding to {subcarrier 0, subcarrier 1} and {subcarrier 6, subcarrier 7} in symbol l'=0, a set including REs corresponding to {subcarrier 2, subcarrier 3} and {subcarrier 8, subcarrier 9} in symbol l'=0, or a set including REs corresponding to {subcarrier 4, subcarrier 5} and {subcarrier 10, subcarrier 11} in symbol l'=0. For a specific implementation of the first RE set, refer to Scenario 1. Details are not described herein again.

In this case, the reference sequence element is multiplied by the corresponding thirteenth cover code element, and the product is mapped to the corresponding first RE set. This can ensure that ports in the first port group are orthogonal in a transmission process, and reduce signal transmission interference.

Optionally, the mapping the reference signal corresponding to the first port index to the second resource group in the time-frequency unit if the port corresponding to the first port index belongs to the second port group, and sending the reference signal in S604A may include: mapping a product of a reference sequence element corresponding to the reference signal and a fourteenth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a fourteenth cover code element corresponding to the reference signal.

The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group.

As shown in FIG. 23, the second RE set in the second resource group is similar to the first RE set in Scenario 7. For a specific implementation of the second RE set, refer to a specific implementation of the first RE set in Scenario 1. Details are not described herein again.

In this case, the reference sequence element is multiplied by the corresponding fourteenth cover code element, and the product is mapped to the corresponding first RE set. This can ensure that ports in the first port group are orthogonal in a transmission process, and reduce signal transmission interference. In addition, in Scenario 7 in which the size of the first frequency domain unit is one RB group, compared with the mapping rule C shown in FIG. 3, in this embodiment of this application, a port capacity can be doubled in all time-frequency resources in the time-frequency unit, that is, the second port group whose quantity of ports is the same as that of ports in the first port group is added, to increase the quantity of supported transmitted streams, and improve the performance of the MIMO system.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the thirteenth orthogonal cover code sequence and a length of the fourteenth orthogonal cover code sequence are 4. For example, port 1 in the first port group may be corresponding to the thirteenth orthogonal cover code sequence whose length is 4, for example, +1/−1/+1/−1. In the first RE set, port 1 sends corresponding reference signal sequence elements on four REs in the first RE set, and port 0 is respectively corresponding to the orthogonal cover code sequence elements +1, −1, +1, and −1 on the four REs. The four REs in the first RE set may be the REs corresponding to {subcarrier 0, subcarrier 1} and {subcarrier 6, subcarrier 7} in symbol l'=0.

Port 7 in the second port group may be corresponding to the fourteenth orthogonal cover code sequence whose length is 4, for example, +1/−1/+1/−1. In the second RE set, port 7 sends corresponding reference signal sequence elements on four REs in the second RE set, and port 7 is respectively corresponding to the orthogonal cover code sequence elements +1, −1, +1, and −1 on the four REs. The four REs in the first RE set may be the REs corresponding to {subcarrier 0, subcarrier 1} and {subcarrier 6, subcarrier 7} in symbol l'=0. For specific implementations of the thirteenth orthogonal cover code sequence and the fourteenth orthogonal cover code sequence, refer to Scenario 1. Details are not described herein again.

In this case, an orthogonal cover code sequence whose length is 4, for example, the thirteenth orthogonal cover code sequence and the fourteenth orthogonal cover code sequence, is used in the time-frequency resources in the time-frequency unit, so that orthogonal ports can be expanded in the time-frequency resources.

It should be noted that ports in the first port group and the second port group may be divided into three CDM groups. A CDM group 15 may include ports 0/1/6/7, a CDM group 16 may include ports 2/3/8/9, and a CDM group 17 may include ports 4/5/10/11. In a CDM group, different ports occupy a same time-frequency resource, and different OCC codes may be used to distinguish the ports in the same time-frequency resource. For a specific implementation of using OCC codes to distinguish port located in a same RE, refer to Scenario 1. Details are not described herein again. For specific implementations of determining an orthogonal cover code sequence corresponding to a port based on the OCC group and a specific implementation of a relationship between the orthogonal cover code sequence and the OCC group, refer to Scenario 1. Details are not described herein again.

Optionally, the time-frequency unit may include subcarrier 0 to subcarrier 11 in frequency domain, and may include symbol 0 in time domain. According to the mapping rule 17 shown in FIG. 23, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

Therefore, the first resource group and the second resource group occupy a same time-frequency resource in the time-frequency unit, and each may include symbol 0 in the time-frequency unit in time domain, and may include subcarrier 0 to subcarrier 11 in the time-frequency unit in frequency domain. For a specific implementation of mapping the reference signal to the first resource group and the second resource group based on FIG. 15A and FIG. 15B, refer to Scenario 1. Details are not described herein again.

In a specific implementation process, an embodiment of this application provides a formula and a table applicable to Scenario 7, to describe the mapping rule 17 shown in FIG. 23. The reference signal is a demodulation reference signal DMRS, and the time unit is an orthogonal frequency division multiplexing OFDM symbol.

In the mapping rule 17, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 17 meets:

$$a_{k,l}^{(p,\mu)} = \beta_{PDSCH}^{DMRS} w_f(k') w_t(l') r(6n + k');$$

$$k = 12n + k' + 4 \cdot \left\lfloor \frac{k'}{2} \right\rfloor + \Delta;$$

$$k' = 0,1,2,3;$$

$$n = 0, 1, \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. For a specific implementation of the formula in the mapping rule 17, refer to the formula in the mapping rule 1. Details are not described herein again.

Optionally, values of $w_f(k')$, $w_t(l')$, and Δ corresponding to port p may be determined based on Table 17. Table 17 is a correspondence table 17 between ports and cover code sub-elements provided in this embodiment of this application.

λ is an index of an orthogonal multiplexing group to which port p belongs, and ports in a same orthogonal multiplexing group occupy a same time-frequency resource. In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index is $(k, l)_{p,\mu}$, to improve DMRS mapping efficiency.

TABLE 17

| | | | $w_f(k')$ | | | | $w_t(l')$ |
|---|---|---|---|---|---|---|---|
| p | λ | Δ | k' = 0 | k' = 1 | k' = 2 | k' = 3 | l' = 0 |
| 1000 | 0 | 0 | +1 | +1 | +1 | +1 | +1 |
| 1001 | 0 | 0 | +1 | −1 | +1 | −1 | +1 |
| 1002 | 1 | 2 | +1 | +1 | +1 | +1 | +1 |
| 1003 | 1 | 2 | +1 | −1 | +1 | −1 | +1 |
| 1004 | 2 | 4 | +1 | +1 | +1 | +1 | +1 |
| 1005 | 2 | 4 | +1 | −1 | +1 | −1 | +1 |
| 1006 | 0 | 0 | +1 | +1 | −1 | −1 | +1 |
| 1007 | 0 | 0 | +1 | −1 | −1 | +1 | +1 |
| 1008 | 1 | 2 | +1 | +1 | −1 | −1 | +1 |
| 1009 | 1 | 2 | +1 | −1 | −1 | +1 | +1 |
| 1010 | 2 | 4 | +1 | +1 | −1 | −1 | +1 |
| 1011 | 2 | 4 | +1 | −1 | −1 | +1 | +1 |

In a yet further possible design scheme, an embodiment of this application further provides a mapping rule: a mapping rule 18, applicable to Scenario 8: A mapping type of the reference signal is type 2, the size of the first frequency domain unit may be greater than or equal to one resource block RB, and the time-frequency unit may include one RB (a total of 12 contiguous subcarriers, denoted as subcarrier 0 to subcarrier 11) in frequency domain and two consecutive time units in time domain. The first port group may include 12 ports, and the second port group may include 12 ports. The first frequency domain unit may be a PRG, and the time unit may be an OFDM symbol.

For example, the first port group may include port 0 to port 11, and the second port group may include port 12 to port 23. For a specific implementation of the time-frequency unit in Scenario 8, refer to Scenario 7. Details are not described herein again.

The following specifically describes the mapping rule 18 applicable to Scenario 8. FIG. 24 is an example diagram 18 of a mapping rule according to an embodiment of this application. As shown in FIG. 24, the first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other.

Correspondingly, that the transmitting end maps the reference signal corresponding to the first port index to the first resource group in the time-frequency unit if the port corresponding to the first port index belongs to the first port group, and sends the reference signal in S603A may include:

The transmitting end maps a product of a reference sequence element corresponding to the reference signal and a fifteenth cover code element corresponding to the reference signal to a first RE set included in the first resource group, and sends the product.

Optionally, that the receiving end performs channel estimation based on the reference signal that is corresponding to the first port index and that is in the first resource group in the time-frequency unit if the port corresponding to the first port index belongs to the first port group in S603B may include:

The receiving end determines a reference sequence element corresponding to the reference signal in a first RE set included in the first resource group, and performs channel estimation based on the reference sequence element corresponding to the reference signal and a fifteenth cover code element corresponding to the reference signal.

The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group.

For example, in the mapping type 2, the first RE set may include at least one subcarrier pair in the first resource group, and one subcarrier includes two adjacent subcarriers. For example, refer to FIG. 24. The first RE set may be an RE set including REs corresponding to {subcarrier 0, subcarrier 1} and {subcarrier 6, subcarrier 7} in symbol l'=0 and symbol l'=1, or an RE set including REs corresponding to {subcarrier 2, subcarrier 3} and {subcarrier 8, subcarrier 9} in symbol l'=0 and symbol l'=1. For a specific implementation of the first RE set, refer to Scenario 7. For a specific implementation of the second RE set, refer to a specific implementation of the first RE set in Scenario 8. Details are not described herein again.

For specific implementations of the fifteenth orthogonal cover code sequence and the first RE set, refer to Scenario 7. Details are not described herein again.

In this case, the reference sequence element is multiplied by the corresponding fifteenth cover code element, and the product is mapped to the corresponding first RE set. This can ensure that ports in the first port group are orthogonal in a transmission process, and reduce signal transmission interference.

Optionally, the mapping the reference signal corresponding to the first port index to the second resource group in the time-frequency unit if the port corresponding to the first port index belongs to the second port group, and sending the reference signal in S604A may include:

mapping a product of a reference sequence element corresponding to the reference signal and a sixteenth cover code element corresponding to the reference signal to a second RE set included in the second resource group, and sending the product.

Optionally, the performing channel estimation based on the reference signal that is corresponding to the first port index and that is in the second resource group in the time-frequency unit if the port corresponding to the first port index belongs to the second port group in S604B may include:

The receiving end determines a reference sequence element corresponding to the reference signal in a second RE set included in the second resource group, and performs channel estimation based on the reference sequence element corresponding to the reference signal and a sixteenth cover code element corresponding to the reference signal.

The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group. For specific implementations of the sixteenth orthogonal cover code sequence and the first RE set, refer to Scenario 7. Details are not described herein again.

In this case, the reference sequence element is multiplied by the corresponding sixteenth cover code element, and the product is mapped to the corresponding first RE set. This can ensure that ports in the first port group are orthogonal in a transmission process, and reduce signal transmission interference. In addition, in Scenario 8 in which the size of the first frequency domain unit is one RB, compared with the mapping rule D shown in FIG. 4, in this embodiment of this application, a port capacity can be doubled in all time-frequency resources in the time-frequency unit, that is, the second port group whose quantity of ports is the same as that of ports in the first port group is added, to increase the quantity of supported transmitted streams, and improve the performance of the MIMO system.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element. In this case, a corresponding cover code element can be quickly determined by using a cover code sub-element in time domain and a cover code sub-element in frequency domain, so that signal mapping efficiency can be improved while port orthogonality is ensured.

Optionally, both a length of the fifteenth orthogonal cover code sequence and a length of the sixteenth orthogonal cover code sequence may be 8. For example, port 1 in the first port group may be corresponding to the fifteenth orthogonal cover code sequence whose length is 8, for example, +1/−1/+1/−1/+1/−1/+1/−1. To be specific, in the first RE set, port 1 sends corresponding reference signal sequence elements on eight REs in the first RE set, and port 1 is respectively corresponding to the orthogonal cover code sequence elements +1, −1, +1, −1, +1, −1, +1, and −1 on the eight REs. The eight REs in the first RE set may be the REs corresponding to {subcarrier 0, subcarrier 1} and {subcarrier 6, subcarrier 7} in symbol l'=0 and symbol l'=1.

Similarly, port 19 in the second port group may be corresponding to the sixteenth orthogonal cover code sequence whose length is 8, for example, +1/−1/−1/+1/−1/+1/+1/−1. To be specific, in the first RE set, port 19 sends corresponding reference signal sequence elements on eight REs in the first RE set, and port 19 is respectively corresponding to the orthogonal cover code sequence elements +1,−1,−1,+1,−1,+1,+1, and −1 on the eight REs. The eight REs in the second RE set may be the REs corresponding to {subcarrier 0, subcarrier 1} and {subcarrier 6, subcarrier 7} in symbol l'=0 and symbol l'=1. For specific implementations of the fifteenth orthogonal cover code sequence and the sixteenth orthogonal cover code sequence, refer to Scenario 1. Details are not described herein again.

In this case, an orthogonal cover code sequence whose length is 8, for example, the fifteenth orthogonal cover code sequence and the sixteenth orthogonal cover code sequence, is used in the time-frequency resources in the time-frequency unit, to ensure orthogonality of the ports in the time-frequency resources.

It should be noted that ports in the first port group and the second port group may be divided into three CDM groups. A CDM group 18 may include ports 0/1/6/7/12/13/18/19, a CDM group 19 may include ports 2/3/8/9/14/15/20/21, and a CDM group 20 may include ports 4/5/10/11/16/17/22/23. For specific implementations of the CDM groups, refer to Scenario 1. Details are not described herein again.

Optionally, the time-frequency unit may include subcarrier 0 to subcarrier 11 in frequency domain, and may include symbol 0 and symbol 1 in time domain. According to the mapping rule 18 shown in FIG. 24, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

Therefore, the first resource group and the second resource group occupy a same time-frequency resource in the time-frequency unit, and each may include symbol 0 in the time-frequency unit in time domain, and may include subcarrier 0 to subcarrier 11 in the time-frequency unit in frequency domain. For a specific implementation of mapping the reference signal to the first resource group and the second resource group based on FIG. 24, refer to Scenario 1. Details are not described herein again.

In a specific implementation process, an embodiment of this application provides a formula and a table applicable to Scenario 8, to describe the mapping rule 18 shown in FIG. 24. The reference signal is a demodulation reference signal DMRS, and the time unit is an orthogonal frequency division multiplexing OFDM symbol.

In the mapping rule 18, for port p, an $m^{th}$ reference sequence element r(m) in the DMRS is mapped to an RE whose index is $(k, l)_{p,\mu}$ according to the following rule. Correspondingly, the receiving end determines the $m^{th}$ reference sequence element r(m) in the DMRS in the RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and the mapping rule 18 meets:

$$a_{k,l}^{(p,\mu)} = \beta_{PDSCH}^{DMRS} w_f(k') w_t(l') r(6n+k');$$

$$k = 12n + k' + 4 \cdot \left\lfloor \frac{k'}{2} \right\rfloor + \Delta;$$

$$k' = 0,1,2,3;$$

$$n = 0, 1, \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor. For a specific implementation of the formula in the mapping rule 18, refer to the formula in the mapping rule 1. Details are not described herein again.

Optionally, values of $w_f(k')$, $w_t(l')$, and Δ corresponding to port p may be determined based on Table 18. Table 18 is a correspondence table 18 between ports and cover code sub-elements provided in this embodiment of this application.

TABLE 18

| | | | $w_f(k')$ | | | | $w_t(l')$ | |
|---|---|---|---|---|---|---|---|---|
| p | λ | Δ | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | −1 | +1 | −1 | +1 | +1 |
| 1002 | 1 | 2 | +1 | +1 | +1 | +1 | +1 | +1 |
| 1003 | 1 | 2 | +1 | −1 | +1 | −1 | +1 | +1 |
| 1004 | 2 | 4 | +1 | +1 | +1 | +1 | +1 | +1 |
| 1005 | 2 | 4 | +1 | −1 | +1 | −1 | +1 | +1 |
| 1006 | 0 | 0 | +1 | +1 | +1 | +1 | +1 | −1 |
| 1007 | 0 | 0 | +1 | −1 | +1 | −1 | +1 | −1 |
| 1008 | 1 | 2 | +1 | +1 | +1 | +1 | +1 | −1 |
| 1009 | 1 | 2 | +1 | −1 | +1 | −1 | +1 | −1 |
| 1010 | 2 | 4 | +1 | +1 | +1 | +1 | +1 | −1 |
| 1011 | 2 | 4 | +1 | −1 | +1 | −1 | +1 | −1 |
| 1012 | 0 | 0 | +1 | +1 | −1 | −1 | +1 | +1 |
| 1013 | 0 | 0 | +1 | −1 | −1 | +1 | +1 | +1 |
| 1014 | 1 | 2 | +1 | +1 | −1 | −1 | +1 | +1 |
| 1015 | 1 | 2 | +1 | −1 | −1 | +1 | +1 | +1 |
| 1016 | 2 | 4 | +1 | +1 | −1 | −1 | +1 | +1 |
| 1017 | 2 | 4 | +1 | −1 | −1 | +1 | +1 | +1 |
| 1018 | 0 | 0 | +1 | +1 | −1 | −1 | +1 | −1 |
| 1019 | 0 | 0 | +1 | −1 | −1 | +1 | +1 | −1 |
| 1020 | 1 | 2 | +1 | +1 | −1 | −1 | +1 | −1 |
| 1021 | 1 | 2 | +1 | −1 | −1 | +1 | +1 | −1 |
| 1022 | 2 | 4 | +1 | +1 | −1 | −1 | +1 | −1 |
| 1023 | 2 | 4 | +1 | −1 | −1 | +1 | +1 | −1 |

λ is an index of an orthogonal multiplexing group to which port p belongs, and ports in a same orthogonal multiplexing group occupy a same time-frequency resource. In this case, with reference to the foregoing tables and corresponding formulas, a corresponding mapping rule can be quickly determined, so that the product of the reference sequence element r(m), the corresponding time domain cover code sub-element $w_t(l')$, and the corresponding frequency domain cover code sub-element $w_f(k')$ is quickly mapped to the RE whose index $(k, l)_{p,\mu}$, to improve DMRS mapping efficiency.

Based on the reference signal mapping method shown in any one of FIG. 6 to FIG. 24, an existing port group and a new port group, namely, the first port group and the second port group, are determined based on the preset size of the first frequency domain unit and the preset first port index, so that corresponding reference signals are separately mapped to corresponding resource groups. In this way, it can be ensured that a quantity of supported ports is increased under same time-frequency resource overheads, to resolve a problem that the quantity of supported ports and a quantity of supported transmitted streams are excessively small in an existing reference signal mapping rule, so that a quantity of transmitted streams that can be paired between users is increased, and performance of a MIMO system is improved.

In addition, one of the first port group and the second port group may be a port group specified in an existing protocol, namely, the existing port group, and the other may be a newly introduced port group, namely, the new port group. In addition, a time-frequency resource mapping rule corresponding to a port included in the existing port group is the same as a time-frequency resource mapping rule specified in the existing protocol, so that the reference signal mapping method is compatible with the existing technology. The reference signal mapping method provided in embodiments of this application is described in detail above with reference to FIG. 6 to FIG. 24. A communication apparatus for a reference signal mapping method provided in embodiments of this application is described in detail below with reference to FIG. 25 to FIG. 27.

Figure 25:
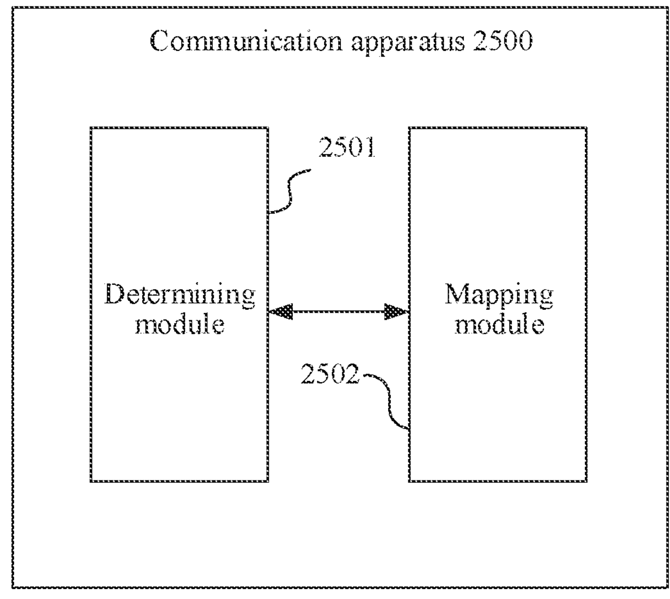
FIG. 25 is a schematic diagram 1 of a structure of a communication apparatus according to an embodiment of this application.

For example, FIG. 25 is a schematic diagram 1 of a structure of a communication apparatus according to an embodiment of this application. As shown in FIG. 25, the communication apparatus 2500 includes a determining module 2501 and a mapping module 2502. For ease of description, FIG. 25 shows only main parts of the communication apparatus.

In some embodiments, the communication apparatus 2500 is applicable to the communication system shown in FIG. 5, and performs a function of the transmitting end in the reference signal mapping method shown in FIG. 6.

The determining module 2501 is configured to: determine a time-frequency unit based on a size of a first frequency domain unit, and determine a resource group in the time-frequency unit based on a first port index. The resource group is corresponding to one port group, and the port group includes one or more ports.

The mapping module 2502 is configured to: map a reference signal corresponding to the first port index to a first resource group in the time-frequency unit if a port corresponding to the first port index belongs to a first port group, and send the reference signal. Alternatively, the mapping module 2502 is configured to: map a reference signal corresponding to the first port index to a second resource group in the time-frequency unit if a port corresponding to the first port index belongs to a second port group, and send the reference signal.

A port index included in the second port group is completely different from a port index included in the first port group. For a same time-frequency unit, the first resource group and the second resource group meet one of the following conditions: a time-frequency resource included in the second resource group is a non-empty subset of a time-frequency resource included in the first resource group; or a time-frequency resource included in the second resource group does not overlap with a time-frequency resource included in the first resource group.

In a possible design scheme, the size of the frequency domain unit is one resource block RB, and the time-frequency unit includes one RB in frequency domain and one time unit in time domain. The first port group includes four ports, and the second port group includes four ports. The first resource group includes a first resource sub-block and a second resource sub-block, and the second resource group includes the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. Correspondingly, the mapping module 2502 is further configured to: map a product of a reference sequence element corresponding to the reference signal and a first cover code element corresponding to the reference signal to a first RE set included in the first resource group, and send the product. Similarly, the mapping module 2502 is further configured to: map a product of a reference sequence element corresponding to the reference signal and a second cover code element corresponding to the reference signal to a second RE set included in the second resource group, and send the product.

The first cover code element is an element in a first orthogonal cover code sequence, each port in the first port group is corresponding to one first orthogonal cover code sequence, and each port in the first port group is corresponding to one first cover code element on each RE in the first RE set included in the first resource group. Second cover code element is an element in a second orthogonal cover code sequence, each port in the second port group is corresponding to one second orthogonal cover code sequence, and each port in the second port group is corresponding to one second cover code element on each RE in the second RE set included in the second resource group.

Further, the first cover code element may be a product of a first frequency domain cover code sub-element and a first time domain cover code sub-element, and the second cover code element may be a product of a second frequency domain cover code sub-element and a second time domain cover code sub-element.

Optionally, a length of the first orthogonal cover code sequence is 2, and a length of the second orthogonal cover code sequence is 4.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1003] \\ 0,1,2,3 & p \in [1004, 1007] \end{cases};$$

$$l = \bar{l} + l',$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 1 in the foregoing method embodiment.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

-continued $$k' = \begin{cases} 0,1,2,3,4,5 & p \in [1000, 1003] \\ 0,1,4,5 & p \in [1004, 1007] \end{cases};$$

$$l = \bar{l} + l',$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 2 shown in the foregoing method embodiment.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a f OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1003] \\ 2,3,4,5 & p \in [1004, 1007] \end{cases};$$

$$l = \bar{l} + l',$$

$$n = 0, 1, \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the k subcarrier, m=6n+k', and Δ is a subcarrier offset factor.

Optionally, values of $w_f(k')$, $w_t(l')$, and Δ corresponding to port p may be determined based on Table 3 shown in the foregoing method embodiment.

In another possible design scheme, the size of the first frequency domain unit may be one resource block RB, and the time-frequency unit may include one RB in frequency domain and two consecutive time units in time domain. The first port group may include eight ports, and the second port group may include eight ports. The first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. Correspondingly, the mapping module 2502 is further configured to: map a product of a reference sequence element corresponding to the reference signal and a third cover code element corresponding to the reference signal to a first RE set included in the first resource group, and send the product. The mapping module 2502 is further configured to: map a product of a reference sequence element corresponding to the reference signal and a fourth cover code element corresponding to the reference signal to a second RE set included in the second resource group, and send the product.

The third cover code element is an element in a third orthogonal cover code sequence, each port in the first port group is corresponding to one third orthogonal cover code sequence, and each port in the first port group is corresponding to one third cover code element on each RE in the first RE set included in the first resource group. The fourth cover code element is an element in a fourth orthogonal cover code sequence, each port in the second port group is corresponding to one fourth orthogonal cover code sequence, and each port in the first port group is corresponding to one fourth cover code element on each RE in the second RE set included in the second resource group.

Further, the third cover code element may be a product of a third frequency domain cover code sub-element and a third time domain cover code sub-element, and the fourth cover code element may be a product of a fourth frequency domain cover code sub-element and a fourth time domain cover code sub-element.

Optionally, a length of the third orthogonal cover code sequence may be 4, and a length of the fourth orthogonal cover code sequence may be 8.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0,1,2,3,4,5 & p \in [1000, 1007] \\ 0,1,2,3 & p \in [1008, 1015] \end{cases};$$

$$l = \bar{l} + l',$$

$$n = 0, 1, \ldots ; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 4 shown in the foregoing method embodiment.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0,1,2,3,4,5 & p \in [1000, 1007] \\ 0,1,4,5 & p \in [1008, 1015] \end{cases};$$

$$l = \bar{l} + l',$$

$$n = 0, 1, \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k,l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 5 shown in the froegoing method embodiment.

In still another possible design scheme, the reference signal may be a demodulation reference signal DMRS, and the time unit may be an orthogonal frequency division multiplexing OFDM symbol. correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 2, 3, 4, 5 & p \in [1008, 1015] \end{cases};$$

$$l = \bar{l} + l';$$

$$n = 0, 1 \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $((k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k' and Δ is a subcarrier offset factor.

Optionally, values of $w_f(k')$, $w_t(l')$, and Δ corresponding to port p may be determined based on Table 6 shown in the foregoing method embodiment.

In still another possible design scheme, the size of the first frequency domain unit may be N times of a resource block RB group, where N is a positive integer, one RB group may include two contiguous RBs, and the time-frequency unit may include one RB group in frequency domain and one time unit in time domain. The first port group may include four ports, and the second port group may include four ports. The first resource group and the second resource group each include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the mapping module 2502 is further configured to: map a product of a reference sequence element corresponding to the reference signal and a fifth cover code element corresponding to the reference signal to a first RE set included in the first resource group, and send the product. Alternatively, the mapping module 2502 is further configured to: map a product of a reference sequence element corresponding to the reference signal and a sixth cover code element corresponding to the reference signal to a second RE set included in the second resource group, and send the product.

The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element.

Optionally, both a length of the fifth orthogonal cover code sequence and a length of the sixth orthogonal cover code sequence may be 4.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 7 shown in the foregoing method embodiment.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 8 shown in the foregoing method embodiment.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 9 shown in the foregoing method embodiment.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1007];$$

$$l = \bar{l} + l';$$

$$n = 0, 1, \ldots ; \text{and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 10 shown in the foregoing method embodiment.

In yet another possible design scheme, the size of the first frequency domain unit may be N times of a resource block RB group, where N is a positive integer, and the RB group may include two contiguous RBs; and the time-frequency unit may include one RB group in frequency domain and two consecutive time units in time domain. The first port group may include eight ports, and the second port group may include eight ports. The first resource group and the second resource group each may include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the mapping module 2502 is further configured to: map a product of a reference sequence element corresponding to the reference signal and a seventh cover code element corresponding to the reference signal to a first RE set included in the first resource group, and send the product. The mapping module 2502 is further configured to: map a product of a reference sequence element corresponding to the reference signal and an eighth cover code element corresponding to the reference signal to a second RE set included in the second resource group, and send the product.

The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element.

Optionally, both a length of the seventh orthogonal cover code sequence and a length of the eighth orthogonal cover code sequence may be 8.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 11 shown in the foregoing method embodiment.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$ and Δ corresponding to port p may be determined based on Table 12 shown in the foregoing method embodiment.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$

$$k = 24n + 2k' + \Delta;$$

$$k' = 0, 1, 2, 3, 4, 5, 6, 7, 8, 9, 10, 11 \quad p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 13 shown in the foregoing method embodiment.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3 \quad p \in [1000, 1015];$$

$$l = \bar{l} + l';$$

$$n = 0, 1, \ldots ; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the 1st OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 14 shown in the foregoing method embodiment.

In still yet another possible design scheme, the size of the first frequency domain unit may be six subcarriers, the time-frequency unit may include one RB in frequency domain and one time unit in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the mapping module 2502 is further configured to: map a product of a reference sequence element corresponding to the reference signal and a ninth cover code element corresponding to the reference signal to a first RE set included in the first resource group, and send the product. The mapping module 2502 is further configured to: map a product of a reference sequence element corresponding to the reference signal and a tenth cover code element corresponding to the reference signal to a second RE set included in the second resource group, and send the product.

The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group. The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element.

Optionally, both a length of the ninth orthogonal cover code sequence and a length of the tenth orthogonal cover code sequence are 2.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 4, 5 & p \in [1000, 1003] \\ 2, 3 & p \in [1004, 1005] \end{cases};$$

$$l = \bar{l} + l';$$

$$n = 0, 1 \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 15 shown in the foregoing method embodiment.

In a further possible design scheme, the size of the first frequency domain unit may be six subcarriers, the time-frequency unit may include one RB in frequency domain and two consecutive time units in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the mapping module 2502 is further configured to: map a product of a reference sequence element corresponding to the reference signal and an eleventh cover code element corresponding to the reference signal to a first RE set included in the first resource group, and send the product. The mapping module 2502 is further configured to: map a product of a reference sequence element corresponding to the reference signal and a twelfth cover code element corresponding to the reference signal to a second RE set included in the second resource group, and send the product.

The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group. The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element.

Optionally, both a length of the eleventh orthogonal cover code sequence and a length of the twelfth orthogonal cover code sequence may be 4.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 4, 5 & p \in [1000, 1007] \\ 2, 3 & p \in [1008, 1011] \end{cases};$$

$$l = \bar{l} + l';$$

$$n = 0, 1 \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 16 shown in the foregoing method embodiment.

In a still further possible design scheme, the size of the first frequency domain unit is greater than or equal to one resource block RB, and the time-frequency unit may include one RB in frequency domain and one time unit in time domain. The first port group may include six ports, and the second port group may include six ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the mapping module 2502 is further configured to: map a product of a reference sequence element corresponding to the reference signal and a thirteenth cover code element corresponding to the reference signal to a first RE set included in the first resource group, and send the product. The mapping module 2502 is further configured to: map a product of a reference sequence element corresponding to the reference signal and a fourteenth cover code element corresponding to the reference signal to a second RE set included in the second resource group, and send the product.

The thirteenth cover code element is an element in a thirteenth orthogonal cover code sequence, each port in the first port group is corresponding to one thirteenth orthogonal cover code sequence, and each port in the first port group is corresponding to one thirteenth cover code element on each RE in the first RE set included in the first resource group. The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element.

Optionally, both a length of the thirteenth orthogonal cover code sequence and a length of the fourteenth orthogonal cover code sequence are 4.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 12n + 2k' + 4 \cdot \left\lfloor \frac{k'}{2} \right\rfloor + \Delta;$$

$$k' = 0, 1, 2, 3;$$

$$n = 0, 1 \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 17 shown in the foregoing method embodiment.

In a yet further possible design scheme, the size of the first frequency domain unit is greater than or equal to one resource block RB, and the time-frequency unit may include one RB in frequency domain and two consecutive time units in time domain. The first port group may include 12 ports, and the second port group may include 12 ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the mapping module 2502 is further configured to: map a product of a reference sequence element corresponding to the reference signal and a fifteenth cover code element corresponding to the reference signal to a first RE set included in the first resource group, and send the product. The mapping module 2502 is further configured to: map a product of a reference sequence element corresponding to the reference signal and a sixteenth cover code element corresponding to the reference signal to a second RE set included in the second resource group, and send the product.

The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group. The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element.

Optionally, both a length of the fifteenth orthogonal cover code sequence and a length of the sixteenth orthogonal cover code sequence may be 8.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is mapped to an RE whose index is $(k, l)_{p,\mu}$ according to the following rule. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 12n + 2k' + 4 \cdot \left\lfloor \frac{k'}{2} \right\rfloor + \Delta;$$

$$k' = 0, 1, 2, 3;$$

$$n = 0, 1 \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 18 shown in the foregoing method embodiment.

Optionally, the determining module 2501 and the mapping module 2502 may alternatively be integrated into one module, for example, a processing module. The processing module is configured to implement a processing function of the communication apparatus 2500.

Optionally, the communication apparatus 2500 may further include a storage module (not shown in FIG. 25). The storage module stores a program or instructions. When the processing module executes the program or the instructions, the communication apparatus 2500 is enabled to perform the reference signal mapping method shown in FIG. 6.

Optionally, the communication apparatus 2500 may further include a transceiver module (not shown in FIG. 25). The transceiver module is configured to implement a sending function and a receiving function of the communication apparatus 2500. Further, the transceiver module may include a receiving module and a sending module (not shown in FIG. 25). The receiving module and the sending module are respectively configured to implement the receiving function and the sending function of the communication apparatus 2500.

It should be understood that the determining module 2501 and the mapping module 2502 in the communication apparatus 2500 may be implemented by a processor or a processor-related circuit component, and may be a processor or a processing unit. The transceiver module may be implemented by a transceiver or a transceiver-related circuit component, and may be a transceiver or a transceiver unit.

It should be noted that the communication apparatus 2500 may be a terminal device or a network device, may be a chip (system) or another part or component that may be disposed in the terminal device or the network device, or may be an apparatus including the terminal device or the network device. This is not limited in this application.

In addition, for a technical effect of the communication apparatus 2500, refer to a technical effect of the reference signal mapping method shown in any one of FIG. 6 to FIG. 24. Details are not described herein again.

Figure 26:
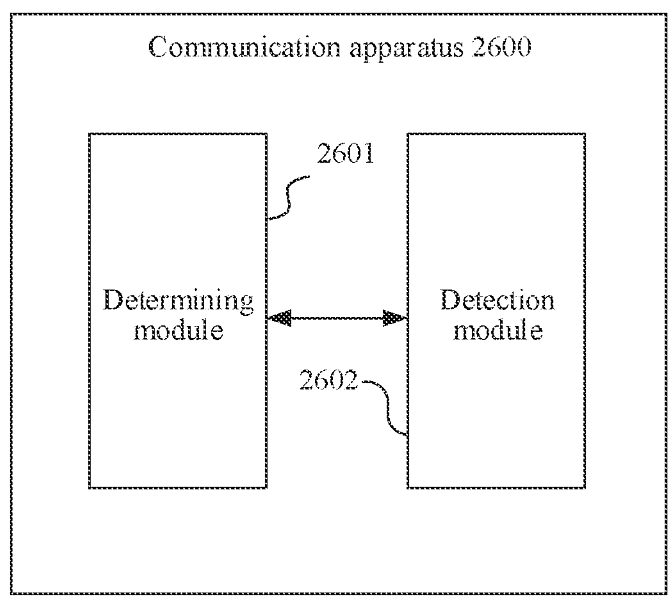
FIG. 26 is a schematic diagram 2 of a structure of a communication apparatus according to an embodiment of this application.

For example. FIG. 26 is a schematic diagram 2 of a structure of a communication apparatus according to an embodiment of this application. As shown in FIG. 26, the communication apparatus 2600 includes a determining module 2601 and a detection module 2602. For ease of description, FIG. 26 shows only main parts of the communication apparatus.

In some embodiments, the communication apparatus 2600 is applicable to the communication system shown in FIG. 5, and performs a function of the receiving end in the reference signal mapping methods shown in FIG. 6 to FIG. 24.

The determining module 2601 is configured to: determine a time-frequency unit based on a size of a first frequency domain unit, and determine a resource group in the time-frequency unit based on a first port index. The resource group is corresponding to one port group, and the port group includes one or more ports. The detection module 2602 is configured to: if a port corresponding to the first port index belongs to a first port group, perform channel estimation based on a reference signal that is corresponding to the first port index and that is in a first resource group in the time-frequency unit. Alternatively, the detection module 2602 is configured to: if a port corresponding to the first port index belongs to a second port group, perform channel estimation based on a reference signal that is corresponding to the first port index and that is in a second resource group in the time-frequency unit.

A port index included in the second port group is completely different from a port index included in the first port group. For a same time-frequency unit, the first resource group and the second resource group meet one of the following conditions: a time-frequency resource included in the second resource group is a non-empty subset of a time-frequency resource included in the first resource group; or a time-frequency resource included in the second resource group does not overlap with a time-frequency resource included in the first resource group. Both the size of the first frequency domain unit and the first port index may be preset or configured.

In a possible design scheme, the size of the first frequency domain unit is one resource block RB, and the time-frequency unit includes one RB in frequency domain and one time unit in time domain. The first port group includes four ports, and the second port group includes four ports. The first resource group includes a first resource sub-block and a second resource sub-block, and the second resource group includes the first resource sub-block but does not include the second resource sub-block. The first resource sub-block includes eight subcarriers in the time-frequency unit in frequency domain, the second resource sub-block includes remaining four contiguous subcarriers in the time-frequency unit in frequency domain, and a time-frequency resource included in the first resource sub-block does not overlap with a time-frequency resource included in the second resource sub-block. Correspondingly, the detection module 2602 is further configured to: determine a reference sequence element corresponding to the reference signal in a first RE set included in the first resource group, and perform channel estimation based on the reference sequence element corresponding to the reference signal and a first cover code element corresponding to the reference signal. The first cover code element is an element in a first orthogonal cover code sequence, each port in the first port group is corresponding to one first orthogonal cover code sequence, and each port in the first port group is corresponding to one first cover code element on each RE in the first RE set included in the first resource group. Similarly, the detection module 2602 is further configured to: determine a reference sequence element corresponding to the reference signal in a second RE set included in the second resource group, and perform channel estimation based on the reference sequence element corresponding to the reference signal and a second cover code element corresponding to the reference signal. The second cover code element is an element in a second orthogonal cover code sequence, each port in the second port group is corresponding to one second orthogonal cover code sequence, and each port in the second port group is corresponding to one second cover code element on each RE in the second RE set included in the second resource group.

Further, the first cover code element may be a product of a first frequency domain cover code sub-element and a first time domain cover code sub-element, and the second cover code element may be a product of a second frequency domain cover code sub-element and a second time domain cover code sub-element.

Optionally, a length of the first orthogonal cover code sequence is 2, and a length of the second orthogonal cover code sequence is 4.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1003] \\ 0, 1, 2, 3 & p \in [1004, 1007] \end{cases};$$

$$l = \bar{l} + l';$$

$$n = 0, 1 \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 1 shown in the foregoing method embodiment. Table 1 is a correspondence table 1 between ports and cover code sub-elements provided in this embodiment of this application.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1003] \\ 0, 1, 4, 5 & p \in [1004, 1007] \end{cases};$$

$$l = \bar{l} + l';$$

$$n = 0, 1 \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 2 shown in the foregoing method embodiment. Table 2 is a correspondence table 2 between ports and cover code sub-elements provided in this embodiment of this application.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1003] \\ 2, 3, 4, 5 & p \in [1004, 1007] \end{cases};$$

$$l = \bar{l} + l';$$

$$n = 0, 1 \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 3 shown in the foregoing method embodiment. Table 3 is a correspondence table 3 between ports and cover code sub-elements provided in this embodiment of this application.

In another possible design scheme, the size of the first frequency domain unit may be one resource block RB, and the time-frequency unit may include one RB in frequency domain and two consecutive time units in time domain. The first port group may include eight ports, and the second port group may include eight ports. The first resource group may include a first resource sub-block and a second resource sub-block, and the second resource group may include the first resource sub-block but does not include the second resource sub-block. The first resource sub-block may include eight subcarriers in the time-frequency unit in frequency domain, the second resource sub-block may include remaining four contiguous subcarriers in the time-frequency unit in frequency domain, and a time-frequency resource included in the first resource sub-block does not overlap with a time-frequency resource included in the second resource sub-block. Correspondingly, the detection module 2602 is further configured to: determine a reference sequence element corresponding to the reference signal in a first RE set included in the first resource group, and perform channel estimation based on the reference sequence element corresponding to the reference signal and a third cover code element corresponding to the reference signal. The third cover code element is an element in a third orthogonal cover code sequence, each port in the first port group is corresponding to one third orthogonal cover code sequence, and each port in the first port group is corresponding to one third cover code element on each RE in the first RE set included in the first resource group. Similarly, the detection module 2602 is further configured to: determine a reference sequence element corresponding to the reference signal in a second RE set included in the second resource group, and perform channel estimation based on the reference sequence element corresponding to the reference signal and a fourth cover code element corresponding to the reference signal. The fourth cover code element is an element in a fourth orthogonal cover code sequence, each port in the second port group is corresponding to one fourth orthogonal cover code sequence, and each port in the first port group is corresponding to one fourth cover code element on each RE in the second RE set included in the second resource group.

Further, the third cover code element may be a product of a third frequency domain cover code sub-element and a third time domain cover code sub-element, and the fourth cover code element may be a product of a fourth frequency domain cover code sub-element and a fourth time domain cover code sub-element.

Optionally, a length of the third orthogonal cover code sequence may be 4, and a length of the fourth orthogonal cover code sequence may be 8.

Optionally, the time-frequency unit may include subcarrier 0 to subcarrier 11 in frequency domain. Correspondingly, the first resource sub-block may include subcarrier 0 to subcarrier 7 in the time-frequency unit in frequency domain, and the second resource sub-block may include subcarrier 8 to subcarrier 11 in the time-frequency unit in frequency domain. Alternatively, the first resource sub-block may include subcarrier 4 to subcarrier 11 in the time-frequency unit in frequency domain, and the second resource sub-block may include subcarrier 0 to subcarrier 3 in the time-frequency unit in frequency domain. Alternatively, the first resource sub-block may include subcarrier 0 to subcarrier 3 and subcarrier 8 to subcarrier 11 in the time-frequency unit in frequency domain, and the second resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 0, 1, 2, 3, & p \in [1008, 1015] \end{cases};$$

$$l = \bar{l} + l';$$

$$n = 0, 1 \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 4 shown in the foregoing method embodiment. Table 4 is a correspondence table 4 between ports and cover code sub-elements provided in this embodiment of this application.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a f OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 2, 3, 4, 5 & p \in [1000, 1007] \\ 0, 1, 4, 5 & p \in [1008, 1015] \end{cases};$$

$$l = \bar{l} + l';$$

$$n = 0, 1 \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 5 shown in the foregoing method embodiment. Table 5 is a correspondence table 5 between ports and cover code sub-elements provided in this embodiment of this application.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets;

$$a_{k,l}^{(p,\mu)} = \beta_{PDSCH}^{DMRS} w_f(k') w_t(l') r(6n + k');$$

$$k = 12n + 2k' + \Delta;$$

$$k' = \begin{cases} 0, 1, 2, 3, 4, 5 & p \in [1000, 1007] \\ 2, 3, 4, 5 & p \in [1008, 1015] \end{cases};$$

$$l = \bar{l} + l';$$

$$n = 0, 1 \ldots; \text{ and}$$

$$l' = 0, 1,$$

where p is the first port index, μ is a subcarrier spacing parameter, $$a_{k,l}^{(p,\mu)}$$

is a DMRS modulation symbol mapped to the RE whose index is $((k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k' and Δ is a subcarrier offset factor.

Optionally, values of $w_f(k')$, $w_t(l')$, and Δ corresponding to port p may be determined based on Table 6 shown in the foregoing method embodiment. Table 6 is a correspondence table 6 between ports and cover code sub-elements provided in this embodiment of this application.

In still another possible design scheme, the size of the first frequency domain unit may be N times of a resource block RB group, where N is a positive integer, one RB group may include two contiguous RBs, and the time-frequency unit may include one RB group in frequency domain and one time unit in time domain. The first port group may include four ports, and the second port group may include four ports. The first resource group and the second resource group each include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, that the detection module 2602 is further configured to perform channel estimation based on the reference signal that is corresponding to the first port index and that is in the first resource group in the time-frequency unit may include: mapping a product of a reference sequence element corresponding to the reference signal and a fifth cover code element corresponding to the reference signal to a first RE set included in the first resource group, and detecting the reference signal. The fifth cover code element may be an element in a fifth orthogonal cover code sequence, each port in the first port group is corresponding to one fifth orthogonal cover code sequence, and each port in the first port group is corresponding to one fifth cover code element on each RE in the first RE set included in the first resource group. Similarly, the detection module 2602 is further configured to: determine a reference sequence element corresponding to the reference signal in a second RE set included in the second resource group, and perform channel estimation based on the reference sequence element corresponding to the reference signal and a sixth cover code element corresponding to the reference signal. The sixth cover code element is an element in a sixth orthogonal cover code sequence, each port in the second port group is corresponding to one sixth orthogonal cover code sequence, and each port in the second port group is corresponding to one sixth cover code element on each RE in the second RE set included in the second resource group.

Further, the fifth cover code element may be a product of a fifth frequency domain cover code sub-element and a fifth time domain cover code sub-element, and the sixth cover code element may be a product of a sixth frequency domain cover code sub-element and a sixth time domain cover code sub-element.

Optionally, both a length of the fifth orthogonal cover code sequence and a length of the sixth orthogonal cover code sequence may be 4.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may meet:

$$a_{k,l}^{(p,\mu)} = \beta_{PDSCH}^{DMRS} w_f(k') w_t(l') r(12n + k');$$
$$k = 24n + 2k' + \Delta;$$
$$k' = 0, 1, 2, 3, 4, 5, 6, 7, 8, 9, 10, 11 \;\; p \in [1000, 1007];$$
$$l = \bar{l} + l';$$
$$n = 0, 1, \ldots \text{; and}$$
$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 7 shown in the foregoing method embodiment. Table 7 is a correspondence table 7 between ports and cover code sub-elements provided in this embodiment of this application.

In another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$
$$k = 24n + 2k' + \Delta;$$
$$k' = 0, 1, 2, 3, 4, 5, 6, 7, 8, 9, 10, 11 \;\; p \in [1000, 1007];$$
$$l = \bar{l} + l';$$
$$n = 0, 1, \ldots \text{; and}$$
$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 8 shown in the foregoing method embodiment. Table 8 is a correspondence table 8 between ports and cover code sub-elements provided in this embodiment of this application.

In still another possible design scheme, the reference signal is a demodulation reference signal DMRS, and the time unit is an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule may alternatively meet:

$$a_{k,l}^{(p,\mu)} = \beta_{PDSCH}^{DMRS} w_f(k') w_t(l') r(12n + k');$$
$$k = 24n + 2k' + \Delta;$$
$$k' = 0, 1, 2, 3, 4, 5, 6, 7, 8, 9, 10, 11 \;\; p \in [1000, 1007];$$
$$l = \bar{l} + l';$$
$$n = 0, 1, \ldots \text{; and}$$
$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $W_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 9 shown in the foregoing method embodiment. Table 9 is a correspondence table 9 between ports and cover code sub-elements provided in this embodiment of this application.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and one time unit in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3, \ p \in [1000, 1007];$$

$$l = \bar{l} + l';$$

$$n = 0, 1, \ldots \text{; and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 10 shown in the foregoing method embodiment. Table 10 is a correspondence table 10 between ports and cover code sub-elements provided in this embodiment of this application.

In yet another possible design scheme, the size of the first frequency domain unit may be N times of a resource block RB group, where N is a positive integer, one RB group may include two contiguous RBs, and the time-frequency unit may include one RB group in frequency domain and two consecutive time units in time domain. The first port group may include eight ports, and the second port group may include eight ports. The first resource group and the second resource group each may include a third resource sub-block, a fourth resource sub-block, and a fifth resource sub-block. The third resource sub-block, the fourth resource sub-block, and the fifth resource sub-block each include eight subcarriers in the time-frequency unit in frequency domain, and a time-frequency resource included in the third resource sub-block, a time-frequency resource included in the fourth resource sub-block, and a time-frequency resource included in the fifth resource sub-block do not overlap with each other. Correspondingly, the detection module 2602 is further configured to: determine a reference sequence element corresponding to the reference signal in a first RE set included in the first resource group, and perform channel estimation based on the reference sequence element corresponding to the reference signal and a seventh cover code element corresponding to the reference signal. The seventh cover code element may be an element in a seventh orthogonal cover code sequence, each port in the first port group is corresponding to one seventh orthogonal cover code sequence, and each port in the first port group is corresponding to one seventh cover code element on each RE in the first RE set included in the first resource group. Similarly, the detection module 2602 is further configured to: determine a reference sequence element corresponding to the reference signal in a second RE set included in the second resource group, and perform channel estimation based on the reference sequence element corresponding to the reference signal and an eighth cover code element corresponding to the reference signal. The eighth cover code element is an element in an eighth orthogonal cover code sequence, each port in the second port group is corresponding to one eighth orthogonal cover code sequence, and each port in the second port group is corresponding to one eighth cover code element on each RE in the second RE set included in the second resource group.

Further, the seventh cover code element may be a product of a seventh frequency domain cover code sub-element and a seventh time domain cover code sub-element, and the eighth cover code element may be a product of an eighth frequency domain cover code sub-element and an eighth time domain cover code sub-element.

Optionally, both a length of the seventh orthogonal cover code sequence and a length of the eighth orthogonal cover code sequence may be 8.

Optionally, the time-frequency unit may include subcarrier 0 to subcarrier 23 in frequency domain. Correspondingly, the third resource sub-block may include subcarrier 0 to subcarrier 7 in the time-frequency unit in frequency domain, the fourth resource sub-block may include subcarrier 12 to subcarrier 19 in the time-frequency unit in frequency domain, and the fifth resource sub-block may include subcarrier 8 to subcarrier 11 and subcarrier 20 to subcarrier 23 in the time-frequency unit in frequency domain. Alternatively, the third resource sub-block may include subcarrier 4 to subcarrier 11 in the time-frequency unit in frequency domain, the fourth resource sub-block may include subcarrier 16 to subcarrier 23 in the time-frequency unit in frequency domain, and the fifth resource sub-block may include subcarrier 0 to subcarrier 3 and subcarrier 12 to subcarrier 15 in the time-frequency unit in frequency domain. Alternatively, the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$
$$k = 24n + 2k' + \Delta;$$
$$k' = 1, 2, 3, 4, 5, 6, 7, 8, 9, 10, 11 \;\; p \in [1000, 1015];$$
$$l = \bar{l} + l';$$
$$n = 0, 1, \ldots \text{; and}$$
$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 11 shown in the foregoing method embodiment. Table 11 is a correspondence table 11 between ports and cover code sub-elements provided in this embodiment of this application.

In another possible design scheme, the reference signal may be a demodulation reference signal DMRS, and the time unit may be an orthogonal frequency division multiplexing OFDM symbol. For port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$
$$k = 24n + 2k' + \Delta;$$
$$k' = 1, 2, 3, 4, 5, 6, 7, 8, 9, 10, 11 \;\; p \in [1000, 1015];$$

-continued $$l = \bar{l} + l';$$
$$n = 0, 1, \ldots \text{; and}$$
$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 12 shown in the foregoing method embodiment. Table 12 is a correspondence table 12 between ports and cover code sub-elements provided in this embodiment of this application.

In still another possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$ The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(12n + k');$$
$$k = 24n + 2k' + \Delta;$$
$$k' = 1, 2, 3, 4, 5, 6, 7, 8, 9, 10, 11 \;\; p \in [1000, 1015];$$
$$l = \bar{l} + l';$$
$$n = 0, 1, \ldots \text{; and}$$
$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=12n+k', and Δ is a subcarrier offset factor.

Optionally, values of $w_f(k')$, $w_t(l')$, and Δ corresponding to port p may be determined based on Table 13 shown in the foregoing method embodiment. Table 13 is a correspondence table 13 between ports and cover code sub-elements provided in this embodiment of this application.

In addition, when the third resource sub-block may include subcarrier 0 to subcarrier 7 in the time-frequency unit in frequency domain, the fourth resource sub-block may include subcarrier 8 to subcarrier 15 in the time-frequency unit in frequency domain, and the fifth resource sub-block may include subcarrier 16 to subcarrier 23 in the time-frequency unit in frequency domain, each resource sub-block may be considered as a time-frequency unit. The time-frequency unit includes eight contiguous subcarriers in frequency domain and two time units in time domain.

Specifically, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 1, 2, 3 \;\; p \in [1000, 1015];$$

$$l = \bar{l} + l';$$

$$n = 0, 1, \ldots \text{; and}$$

$$l' = 0, 1,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 14 shown in the foregoing method embodiment. Table 14 is a correspondence table 14 between ports and cover code sub-elements provided in this embodiment of this application.

In still yet another possible design scheme, the size of the first frequency domain unit may be six subcarriers, the time-frequency unit may include one RB in frequency domain and one time unit in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include four ports, and the second port group may include two ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the detection module 2602 is further configured to: determine a reference sequence element corresponding to the reference signal in a first RE set included in the first resource group, and perform channel estimation based on the reference sequence element corresponding to the reference signal and a ninth cover code element corresponding to the reference signal. The ninth cover code element may be an element in a ninth orthogonal cover code sequence, each port in the first port group is corresponding to one ninth orthogonal cover code sequence, and each port in the first port group is corresponding to one ninth cover code element on each RE in the first RE set included in the first resource group. Similarly, the detection module 2602 is further configured to: determine a reference sequence element corresponding to the reference signal in a second RE set included in the second resource group, and perform channel estimation based on the reference sequence element corresponding to the reference signal and a tenth cover code element corresponding to the reference signal. The tenth cover code element is an element in a tenth orthogonal cover code sequence, each port in the second port group is corresponding to one tenth orthogonal cover code sequence, and each port in the second port group is corresponding to one tenth cover code element on each RE in the second RE set included in the second resource group.

Further, the ninth cover code element may be a product of a ninth frequency domain cover code sub-element and a ninth time domain cover code sub-element, and the tenth cover code element may be a product of a tenth frequency domain cover code sub-element and a tenth time domain cover code sub-element.

Optionally, both a length of the ninth orthogonal cover code sequence and a length of the tenth orthogonal cover code sequence are 2.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource sub-block may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 4, 5 & p \in [1000, 1003] \\ 2, 3 & p \in [1004, 1005] \end{cases};$$

$$l = \bar{l} + l';$$

$$n = 0, 1 \ldots; \text{ and}$$

$$l' = 0,$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 15 shown in the foregoing method embodiment. Table 15 is a correspondence table 15 between ports and cover code sub-elements provided in this embodiment of this application.

In a further possible design scheme, the size of the first frequency domain unit may be six subcarriers, the time-frequency unit may include one RB in frequency domain and two consecutive time units in time domain, subcarrier 0 to subcarrier 4 and subcarrier 6 in the time-frequency unit are corresponding to a first precoding matrix, and subcarrier 5 and subcarrier 7 to subcarrier 11 in the time-frequency unit are corresponding to a second precoding matrix. The first port group may include eight ports, and the second port group may include four ports. The first resource group may include a sixth resource sub-block and a seventh resource sub-block, and the second resource group may include an eighth resource sub-block. The sixth resource sub-block, the seventh resource sub-block, and the eighth resource sub-block each may include four contiguous subcarriers in the time-frequency unit in frequency domain, and a time-frequency resource included in the sixth resource sub-block, a time-frequency resource included in the seventh resource sub-block, and a time-frequency resource included in the eighth resource sub-block do not overlap with each other. Correspondingly, the detection module 2602 is further configured to: determine a reference sequence element corresponding to the reference signal in a first RE set included in the first resource group, and perform channel estimation based on the reference sequence element corresponding to the reference signal and an eleventh cover code element corresponding to the reference signal. The eleventh cover code element is an element in an eleventh orthogonal cover code sequence, each port in the first port group is corresponding to one eleventh orthogonal cover code sequence, and each port in the first port group is corresponding to one eleventh cover code element on each RE in the first RE set included in the first resource group. Similarly, the detection module 2602 is further configured to: determine a reference sequence element corresponding to the reference signal in a second RE set included in the second resource group, and perform channel estimation based on the reference sequence element corresponding to the reference signal and a twelfth cover code element corresponding to the reference signal. The twelfth cover code element is an element in a twelfth orthogonal cover code sequence, each port in the second port group is corresponding to one twelfth orthogonal cover code sequence, and each port in the second port group is corresponding to one twelfth cover code element on each RE in the second RE set included in the second resource group.

Further, the eleventh cover code element may be a product of an eleventh frequency domain cover code sub-element and an eleventh time domain cover code sub-element, and the twelfth cover code element may be a product of a twelfth frequency domain cover code sub-element and a twelfth time domain cover code sub-element.

Optionally, both a length of the eleventh orthogonal cover code sequence and a length of the twelfth orthogonal cover code sequence may be 4.

Optionally, the time-frequency unit may include subcarrier 0 to subcarrier 11 in frequency domain. Correspondingly, the sixth resource sub-block may include subcarrier 0 to subcarrier 3 in the time-frequency unit in frequency domain, the seventh resource sub-block may include subcarrier 8 to subcarrier 11 in the time-frequency unit in frequency domain, and the eighth resource group may include subcarrier 4 to subcarrier 7 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(6n+k');$$

$$k = 12n + 2k' + \Delta;$$

$$k' = \begin{cases} 0, 1, 4, 5 & p \in [1000, 1007] \\ 2, 3 & p \in [1008, 1011] \end{cases};$$

$$l = \bar{l} + l';$$

-continued $n = 0, 1 \ldots$; and $l' = 0, 1,$ where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=6n+k', and Δ is a subcarrier offset factor.

Optionally, values of $w_f(k')$, $w_t(l')$, and Δ corresponding to port p may be determined based on Table 16 shown in the foregoing method embodiment. Table 16 is a correspondence table 16 between ports and cover code sub-elements provided in this embodiment of this application.

In a still further possible design scheme, the size of the first frequency domain unit is greater than or equal to one resource block RB, and the time-frequency unit may include one RB in frequency domain and one time unit in time domain. The first port group may include six ports, and the second port group may include six ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the detection module 2602 is further configured to: determine a reference sequence element corresponding to the reference signal in a first RE set included in the first resource group, and perform channel estimation based on the reference sequence element corresponding to the reference signal and a thirteenth cover code element corresponding to the reference signal. The thirteenth cover code element is an element in a thirteenth orthogonal cover code sequence, each port in the first port group is corresponding to one thirteenth orthogonal cover code sequence, and each port in the first port group is corresponding to one thirteenth cover code element on each RE in the first RE set included in the first resource group. The detection module 2602 is further configured to: determine a reference sequence element corresponding to the reference signal in a second RE set included in the second resource group, and perform channel estimation based on the reference sequence element corresponding to the reference signal and a fourteenth cover code element corresponding to the reference signal. The fourteenth cover code element is an element in a fourteenth orthogonal cover code sequence, each port in the second port group is corresponding to one fourteenth orthogonal cover code sequence, and each port in the second port group is corresponding to one fourteenth cover code element on each RE in the second RE set included in the second resource group.

Further, the thirteenth cover code element may be a product of a thirteenth frequency domain cover code sub-element and a thirteenth time domain cover code sub-element, and the fourteenth cover code element may be a product of a fourteenth frequency domain cover code sub-element and a fourteenth time domain cover code sub-element.

Optionally, both a length of the thirteenth orthogonal cover code sequence and a length of the fourteenth orthogonal cover code sequence are 4.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 12n + 2k' + 4 \cdot \left\lfloor \frac{k'}{2} \right\rfloor + \Delta;$$

$$k' = 0, 1, 2, 3;$$

$$n = 0, 1 \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$, and Δ corresponding to port p may be determined based on Table 17 shown in the foregoing method embodiment. Table 17 is a correspondence table 17 between ports and cover code sub-elements provided in this embodiment of this application.

In a yet further possible design scheme, the size of the first frequency domain unit is greater than or equal to one resource block RB, and the time-frequency unit may include one RB in frequency domain and two consecutive time units in time domain. The first port group may include 12 ports, and the second port group may include 12 ports. The first resource group and the second resource group each may include a ninth resource sub-block, a tenth resource sub-block, and an eleventh resource sub-block. The ninth resource sub-block, the tenth resource sub-block, and the eleventh resource sub-block each may include four subcarriers in the time-frequency unit, and a time-frequency resource included in the ninth resource sub-block, a time-frequency resource included in the tenth resource sub-block, and a time-frequency resource included in the eleventh resource sub-block do not overlap with each other. Correspondingly, the detection module 2602 is further configured to: determine a reference sequence element corresponding to the reference signal in a first RE set included in the first resource group, and perform channel estimation based on the reference sequence element corresponding to the reference signal and a fifteenth cover code element corresponding to the reference signal. The fifteenth cover code element is an element in a fifteenth orthogonal cover code sequence, each port in the first port group is corresponding to one fifteenth orthogonal cover code sequence, and each port in the first port group is corresponding to one fifteenth cover code element on each RE in the first RE set included in the first resource group. The detection module 2602 is further configured to: determine a reference sequence element corresponding to the reference signal in a second RE set included in the second resource group, and perform channel estimation based on the reference sequence element corresponding to the reference signal and a sixteenth cover code element corresponding to the reference signal. The sixteenth cover code element is an element in a sixteenth orthogonal cover code sequence, each port in the second port group is corresponding to one sixteenth orthogonal cover code sequence, and each port in the second port group is corresponding to one sixteenth cover code element on each RE in the second RE set included in the second resource group.

Further, the fifteenth cover code element may be a product of a fifteenth frequency domain cover code sub-element and a fifteenth time domain cover code sub-element, and the sixteenth cover code element may be a product of a sixteenth frequency domain cover code sub-element and a sixteenth time domain cover code sub-element.

Optionally, both a length of the fifteenth orthogonal cover code sequence and a length of the sixteenth orthogonal cover code sequence may be 8.

Optionally, the time-frequency unit includes subcarrier 0 to subcarrier 11 in frequency domain. Correspondingly, the ninth resource sub-block may include subcarrier 0, subcarrier 1, subcarrier 6, and subcarrier 7 in the time-frequency unit in frequency domain, the tenth resource sub-block may include subcarrier 2, subcarrier 3, subcarrier 8, and subcarrier 9 in the time-frequency unit in frequency domain, and the eleventh resource sub-block may include subcarrier 4, subcarrier 5, subcarrier 10, and subcarrier 11 in the time-frequency unit in frequency domain.

In a possible design scheme, the reference signal may be a demodulation reference signal DMRS, and the time unit may be an orthogonal frequency division multiplexing OFDM symbol. Correspondingly, for port p, an $m^{th}$ reference sequence element r(m) in the DMRS is determined, according to the following rule, in an RE whose index is $(k, l)_{p,\mu}$. The RE whose index is $(k, l)_{p,\mu}$ corresponding to a $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 12n + 2k' + 4\cdot\left\lfloor\frac{k'}{2}\right\rfloor + \Delta;$$

$$k' = 0, 1, 2, 3;$$

$$n = 0, 1 \ldots; \text{ and}$$

$$l = \bar{l} + l',$$

where p is the first port index, μ is a subcarrier spacing parameter, $$a_{k,l}^{(p,\mu)}$$

is a DMRS modulation symbol mapped to the RE whose index is $(k, l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

Optionally, values of $w_f(k')$, $w_t(l')$ and Δ corresponding to port p may be determined based on Table 18 shown in the foregoing method embodiment. Table 18 is a correspondence table 18 between ports and cover code sub-elements provided in this embodiment of this application.

Optionally, the determining module 2601 and the detection module 2602 may alternatively be integrated into one module, for example, a processing module. The processing module is configured to implement a processing function of the communication apparatus 2600.

Optionally, the communication apparatus 2600 may further include a storage module (not shown in FIG. 26). The storage module stores a program or instructions. When the processing module executes the program or the instructions, the communication apparatus 2600 is enabled to perform the reference signal mapping method shown in FIG. 6.

Optionally, the communication apparatus 2600 may further include a transceiver module (not shown in FIG. 26). The transceiver module is configured to implement a sending function and a receiving function of the communication apparatus 2600. Further, the transceiver module may include a receiving module and a sending module (not shown in FIG. 26). The receiving module and the sending module are respectively configured to implement the receiving function and the sending function of the communication apparatus 2600.

It should be understood that the determining module 2601 and the mapping module 2602 in the communication apparatus 2600 may be implemented by a processor or a processor-related circuit component, and may be a processor or a processing unit. The transceiver module may be implemented by a transceiver or a transceiver-related circuit component, and may be a transceiver or a transceiver unit.

It should be noted that the communication apparatus 2600 may be a terminal device or a network device, may be a chip (system) or another part or component that may be disposed in the terminal device or the network device, or may be an apparatus including the terminal device or the network device. This is not limited in this application.

In addition, for a technical effect of the communication apparatus 2600, refer to a technical effect of the reference signal mapping method shown in any one of FIG. 6 to FIG. 24. Details are not described herein again.

Figure 27:
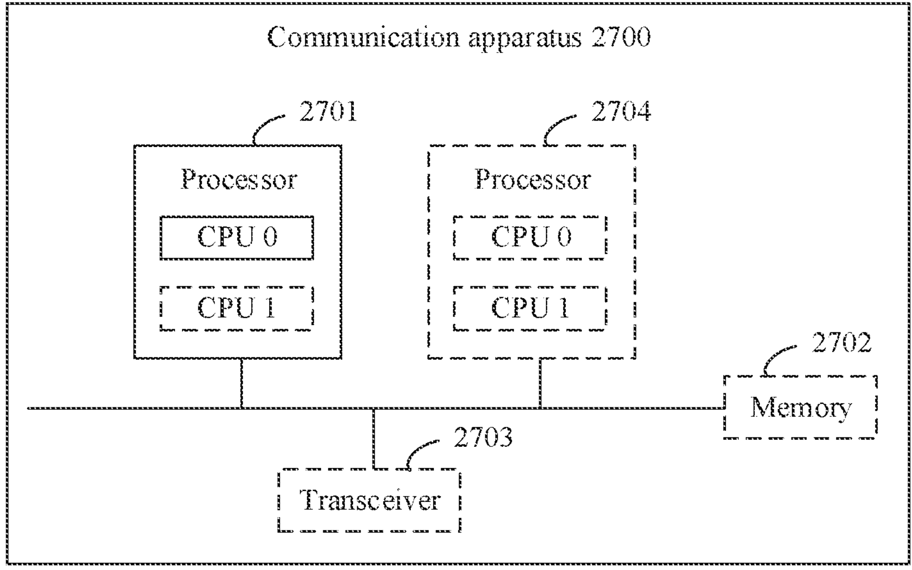
FIG. 27 is a schematic diagram 3 of a structure of a communication apparatus according to an embodiment of this application.

For example, FIG. 27 is a schematic diagram 3 of a structure of a communication apparatus according to an embodiment of this application. The communication apparatus may be a terminal device or a network device, may be a chip (system) or another part or component that may be disposed in the terminal device or the network device, or may be an apparatus including the terminal device or the network device. As shown in FIG. 27, the communication apparatus 2700 may include a processor 2701. Optionally, the communication apparatus 2700 may further include a memory 2702 and/or a transceiver 2703. The processor 2701 is coupled to the memory 2702 and the transceiver 2703, for example, may be connected to the memory 2702 and the transceiver 2703 through a communication bus.

The following describes parts of the reference signal mapping device 2700 in detail with reference to FIG. 27.

The processor 2701 is a control center of the reference signal mapping device 2700, and may be one processor or may be a general term of a plurality of processing elements. For example, the processor 2701 is a central processing unit (CPU) or an application-specific integrated circuit (ASIC), or may be configured as one or more integrated circuits implementing embodiments of the present invention, for example, one or more microprocessors (DSPs) or one or more field programmable gate arrays (FPGAs).

The processor 2701 may perform various functions of the reference signal mapping device 2700 by running or executing a software program stored in the memory 2702 and invoking data stored in the memory 2702.

During specific implementation, in an embodiment, the processor 2701 may include one or more CPUs, for example, a CPU 0 and a CPU 1 shown in FIG. 27.

During specific implementation, in an embodiment, the reference signal mapping device 2700 may include a plurality of processors, for example, the processor 2701 and a processor 2705 shown in FIG. 27. Each of the processors may be a single-core processor (single-CPU) or a multi-core processor (multi-CPU). The processor herein may be one or more devices, circuits, and/or processing cores configured to process data (for example, computer program instructions).

The memory 2702 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a Blue-ray optical disc, or the like), a magnetic disk storage medium or another magnetic storage device, or any other medium capable of carrying or storing expected program code in a form of instructions or a data structure and capable of being accessed by a computer, but is not limited thereto. The memory 2702 may exist independently, and is connected to the processor 2701 through a communication bus. The memory 2702 may alternatively be integrated with the processor 2701.

The memory 2702 is configured to store a software program for executing the solutions in the present invention, where the execution is controlled by the processor 2701.

The transceiver 2703 is configured to communicate with another communication apparatus. For example, the communication apparatus 2700 is a terminal device, and the transceiver 2703 may be configured to communicate with a network device or communicate with another terminal device. For another example, the communication apparatus 2700 is a network device, and the transceiver 2703 may be configured to communicate with a terminal device or communicate with another network device.

Optionally, the transceiver 2703 may include a receiver and a transmitter (not separately shown in FIG. 27). The receiver is configured to implement a receiving function, and the transmitter is configured to implement a sending function.

Optionally, the transceiver 2703 may be integrated with the processor 2701, or may exist independently, and is coupled to the processor 2701 through an interface circuit (not shown in FIG. 27) of the communication apparatus 2700. This is not specifically limited in this embodiment of this application.

It should be noted that, the structure of the communication apparatus 2700 shown in FIG. 27 does not constitute a limitation on the communication apparatus. An actual communication apparatus may include more or fewer parts than those shown in the figure, combine some parts, or have different part arrangement.

In addition, for a technical effect of the communication apparatus 2700, refer to the technical effect of the communication method in the foregoing method embodiments. Details are not described herein again.

An embodiment of this application further provides a chip system, including a processor. The processor is coupled to a memory. The memory is configured to store a program or instructions. When the program or the instructions are executed by the processor, the chip system is enabled to implement the method according to any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated chip (ASIC), a system on a chip (SoC), a central processing unit (CPU), a network processor (NP), a digital signal processing circuit (DSP), a micro controller unit (MCU), a programmable controller (programmable logic device, PLD), or another integrated chip.

An embodiment of this application provides a communication system. The communication system includes one or more terminal devices and one or more network devices.

It should be understood that the processor in embodiments of this application may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should be further understood that the memory in embodiments of this application may be a volatile memory or a non-volatile memory, or may include the volatile memory and the non-volatile memory. The non-volatile memory may be a read-only memory (, ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through example but not limitative descriptions, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory SLDRAM), and a direct rambus random access memory (DR RAM).

All or some of the foregoing embodiments may be implemented by using software, hardware (for example, a circuit), firmware, or any combination thereof. When the software is used to implement embodiments, the foregoing embodiments may be implemented completely or partially in a form of a computer program product. The computer program product includes one or more computer instructions or computer programs. When the computer instructions or the computer programs are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example. A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one item (piece) of the following" or a similar expression thereof means any combination of these items, including a singular item (piece) or any combination of plural items (pieces). For example, at least one (piece) of a, b, or c may represent, a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal mapping method, comprising:

determining a time-frequency unit;

wherein a resource group in the time-frequency unit corresponds to a first port index, wherein the resource group corresponds to one or more ports; and performing at least one of the following:

(1) mapping a reference signal corresponding to a first part of the first port index to a first resource group in the time-frequency unit, and sending the reference signal; or (2) mapping a reference signal corresponding to a second part of the first port index to a second resource group in the time-frequency unit, and sending the reference signal; wherein:

a port index in the first part of the first port index is different from a port index in the second part of the first port index; and a time-frequency resource comprised in the second resource group is the same as a time-frequency resource comprised in the first resource group;

wherein the reference signal is a demodulation reference signal (DMRS);

wherein an orthogonal cover code (OCC) sequence corresponding to the first part of the first port index is different from an orthogonal cover code sequence corresponding to the second part of the first port index; and wherein the ports corresponding to the first part of the first port index comprises eight ports and the ports corresponding to the second part of the first port index comprises eight ports.

2. The reference signal mapping method according to claim 1, wherein the OCC sequence corresponding to the first part of the first port index is [+1 +1 +1 +1] or [+1 −1 +1 −1], and the OCC sequence corresponding to the second part of the first port index is [+1 +1 −1 −1] or [+1 −1 −1 +1].

3. The reference signal mapping method according to claim 1, wherein:

the time-frequency unit comprises two contiguous resource block (RB)s in frequency domain and two consecutive time units in time domains;

the first resource group and the second resource group each comprise a third resource sub-block, a fourth resource sub-block, and a fifth resource sub-block, wherein the third resource sub-block, the fourth resource sub-block, and the fifth resource sub-block each comprise eight subcarriers in the time-frequency unit in frequency domain, and a time-frequency resource in the third resource sub-block, a time-frequency resource in the fourth resource sub-block, and a time-frequency resource in the fifth resource sub-block do not overlap with each other; and (1) the mapping a reference signal corresponding to a first part of the first port index to a first resource group in the time-frequency unit, and sending the reference signal comprises:

mapping a product of a reference sequence element corresponding to the reference signal and a seventh cover code element corresponding to the reference signal to a first resource element (RE) set in the first resource group, and sending the product, wherein:

the seventh cover code element is an element in a seventh orthogonal cover code sequence, each port in the ports corresponding to the first part of the first port index is corresponding to one seventh orthogonal cover code sequence, and each port in the ports corresponding to the first part of the first port index is corresponding to one seventh cover code element on each RE in the first RE set in the first resource group; or (2) the mapping a reference signal corresponding to a second part of the first port index to a second resource group in the time-frequency unit, and sending the reference signal comprises:

mapping a product of a reference sequence element corresponding to the reference signal and an eighth cover code element corresponding to the reference signal to a second RE set in the second resource group, and sending the product, wherein:

the eighth cover code element is an element in an eighth orthogonal cover code sequence, each port in ports corresponding to the second part of the first port index is corresponding to one eighth orthogonal cover code sequence, and each port in ports corresponding to the second part of the first port index is corresponding to one eighth cover code element on each RE in the second RE set in the second resource group.

4. The reference signal mapping method according to claim 3, wherein the seventh cover code element is a product of a seventh frequency domain cover code sub-element and a seventh time domain cover code sub-element, and the eighth cover code element is a product of an eighth frequency domain cover code sub-element and an eighth time domain cover code sub-element.

5. The reference signal mapping method according to claim 3, wherein both a length of the seventh orthogonal cover code sequence and a length of the eighth orthogonal cover code sequence are 8.

6. The reference signal mapping method according to claim 3, wherein the time unit is an orthogonal frequency division multiplexing (OFDM) symbol; and for port p, an $m^{th}$ reference sequence element r(m) in the DMRS is mapped to an RE whose index is $(k,l)_{p,\mu}$ according to the following rule, wherein the RE whose index is $(k,l)_{p,\mu}$ is corresponding to an $l^{th}$ OFDM symbol in one slot in time domain and corresponding to a kth subcarrier in the time-frequency unit in frequency domain, and this rule meets:

$$a_{k,l}^{(p,\mu)} = \beta_{PDSCH}^{DMRS} w_f(k') w_t(l') r(4n + k');$$

$$k = 8n + 2k' + \Delta;$$

$$k' = 0, 1, 2, 3;$$

$$l = \bar{l} + l';$$

$$n = 0, 1, \ldots \text{; and}$$

$$l' = 0, 1,$$

wherein p is a port index of the first port index, μ is a subcarrier spacing parameter, $$a_{k,l}^{(p,\mu)}$$

is a DMRS modulation symbol mapped to the RE whose index is $(k,l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

7. The reference signal mapping method according to claim 6, wherein values of $w_f(k')$, $w_t(l')$, and Δ corresponding to port p are determined based on the following table:

| | | | $w_f(k')$ | | | | $w_t(l')$ | |
|---|---|---|---|---|---|---|---|---|
| p | λ | Δ | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | −1 | +1 | −1 | +1 | +1 |
| 1002 | 1 | 1 | +1 | +1 | +1 | +1 | +1 | +1 |
| 1003 | 1 | 1 | +1 | −1 | +1 | −1 | +1 | +1 |
| 1004 | 0 | 0 | +1 | +1 | +1 | +1 | +1 | −1 |
| 1005 | 0 | 0 | +1 | −1 | +1 | −1 | +1 | −1 |
| 1006 | 1 | 1 | +1 | +1 | +1 | +1 | +1 | −1 |
| 1007 | 1 | 1 | +1 | −1 | +1 | −1 | +1 | −1 |
| 1008 | 0 | 0 | +1 | +1 | −1 | −1 | +1 | +1 |
| 1009 | 0 | 0 | +1 | −1 | −1 | +1 | +1 | +1 |
| 1010 | 1 | 1 | +1 | +1 | −1 | −1 | +1 | +1 |
| 1011 | 1 | 1 | +1 | −1 | −1 | +1 | +1 | +1 |
| 1012 | 0 | 0 | +1 | +1 | −1 | −1 | +1 | −1 |
| 1013 | 0 | 0 | +1 | −1 | −1 | +1 | +1 | −1 |
| 1014 | 1 | 1 | +1 | +1 | −1 | −1 | +1 | −1 |
| 1015 | 1 | 1 | +1 | −1 | −1 | +1 | +1 | −1. |

8. A communication apparatus, comprising at least one processor and at least one memory coupled to the at least one processor, wherein the at least one memory stores program instructions that when executed by the at least one processor, cause the communication apparatus to perform operations comprising:

determining a time-frequency unit;

wherein a resource group in the time-frequency unit corresponds to a first port index, wherein the resource group corresponds to one or more ports; and performing at least one of the following:

(1) mapping a reference signal corresponding to a first part of the first port index to a first resource group in the time-frequency unit, and sending the reference signal; or (2) mapping a reference signal corresponding to a second part of the first port index to a second resource group in the time-frequency unit, and sending the reference signal; wherein:

a port index in the first part of the first port index is different from a port index in the second part of the first port index; and a time-frequency resource in the second resource group is the same as a time-frequency resource in the first resource group;

wherein the reference signal is a demodulation reference signal (DMRS);

wherein an orthogonal cover code (OCC) sequence corresponding to the first part of the first port index is different from an orthogonal cover code sequence corresponding to the second part of the first port index; and wherein the ports corresponding to the first part of the first port index comprises eight ports and the ports corresponding to the second part of the first port index comprises eight ports.

9. The communication apparatus according to claim 8, wherein the OCC sequence corresponding to the first part of the first port index is [+1 +1 +1 +1] or [+1 −1 +1 −1], and the OCC sequence corresponding to the second part of the first port index is [+1 +1 −1 −1] or [+1 −1 −1 +1].

10. The communication apparatus according to claim 8, wherein:

the time-frequency unit comprises two contiguous resource block (RB) s in frequency domain and two consecutive time units in time domain;

the first resource group and the second resource group each comprise a third resource sub-block, a fourth resource sub-block, and a fifth resource sub-block, wherein the third resource sub-block, the fourth resource sub-block, and the fifth resource sub-block each comprise eight subcarriers in the time-frequency unit in frequency domain, and a time-frequency resource in the third resource sub-block, a time-frequency resource in the fourth resource sub-block, and a time-frequency resource in the fifth resource sub-block do not overlap with each other; and (1) the mapping a reference signal corresponding to a first part of the first port index to a first resource group in the time-frequency unit, and sending the reference signal comprises:

mapping a product of a reference sequence element corresponding to the reference signal and a seventh cover code element corresponding to the reference signal to a first resource element (RE) set in the first resource group, and sending the product, wherein:

the seventh cover code element is an element in a seventh orthogonal cover code sequence, each port in the ports corresponding to the first part of the first port index is corresponding to one seventh orthogonal cover code sequence, and each port in the ports corresponding to the first part of the first port index is corresponding to one seventh cover code element on each RE in the first RE set in the first resource group; or (2) the mapping a reference signal corresponding to a second part of the first port index to a second resource group in the time-frequency unit, and sending the reference signal comprises:

mapping a product of a reference sequence element corresponding to the reference signal and an eighth cover code element corresponding to the reference signal to a second RE set in the second resource group, and sending the product, wherein:

the eighth cover code element is an element in an eighth orthogonal cover code sequence, each port in the ports corresponding to the second part of the first port index is corresponding to one eighth orthogonal cover code sequence, and each port in the ports corresponding to the second part of the first port index is corresponding to one eighth cover code element on each RE in the second RE set in the second resource group.

11. The communication apparatus according to claim 10, wherein the seventh cover code element is a product of a seventh frequency domain cover code sub-element and a seventh time domain cover code sub-element, and the eighth cover code element is a product of an eighth frequency domain cover code sub-element and an eighth time domain cover code sub-element.

12. The communication apparatus according to claim 10, wherein both a length of the seventh orthogonal cover code sequence and a length of the eighth orthogonal cover code sequence are 8.

13. The communication apparatus according to claim 10, wherein the time unit is an orthogonal frequency division multiplexing (OFDM) symbol; and for port p, an $m^{th}$ reference sequence element r(m) in the DMRS is mapped to an RE whose index is $(k,l)_{p,\mu}$ according to the following rule, wherein the RE whose index is $(k,)_{p,\mu}$ is corresponding to an $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3;$$

$$l = \bar{l} + l';$$

$$n = 0, 1, \ldots \text{ ; and}$$

$$l' = 0, 1,$$

wherein p is a port index of the first port index, μ is a subcarrier spacing parameter, $$a_{k,l}^{(p,\mu)}$$

is a DMRS modulation symbol mapped to the RE whose index is $(k,l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

14. The communication apparatus according to claim 13, wherein values of $w_f(k')$, $w_t(l')$, and Δ corresponding to port p are determined based on the following table:

| | | | $w_f(k')$ | | | | $w_t(l')$ | |
|---|---|---|---|---|---|---|---|---|
| p | λ | Δ | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | −1 | +1 | −1 | +1 | +1 |
| 1002 | 1 | 1 | +1 | +1 | +1 | +1 | +1 | +1 |
| 1003 | 1 | 1 | +1 | −1 | +1 | −1 | +1 | +1 |
| 1004 | 0 | 0 | +1 | +1 | +1 | +1 | +1 | −1 |
| 1005 | 0 | 0 | +1 | −1 | +1 | −1 | +1 | −1 |
| 1006 | 1 | 1 | +1 | +1 | +1 | +1 | +1 | −1 |
| 1007 | 1 | 1 | +1 | −1 | +1 | −1 | +1 | −1 |
| 1008 | 0 | 0 | +1 | +1 | −1 | −1 | +1 | +1 |
| 1009 | 0 | 0 | +1 | −1 | −1 | +1 | +1 | +1 |
| 1010 | 1 | 1 | +1 | +1 | −1 | −1 | +1 | +1 |
| 1011 | 1 | 1 | +1 | −1 | −1 | +1 | +1 | +1 |
| 1012 | 0 | 0 | +1 | +1 | −1 | −1 | +1 | −1 |
| 1013 | 0 | 0 | +1 | −1 | −1 | +1 | +1 | −1 |
| 1014 | 1 | 1 | +1 | +1 | −1 | −1 | +1 | −1 |
| 1015 | 1 | 1 | +1 | −1 | −1 | +1 | +1 | −1. |

15. A non-transitory computer-readable medium storing one or more instructions executable by a computer system to perform operations comprising:

determining a time-frequency unit;

wherein a resource group in the time-frequency unit corresponds to a first port index, wherein the resource group corresponds to one or more ports; and performing at least one of the following:

(1) mapping a reference signal corresponding to a first part of the first port index to a first resource group in the time-frequency unit, and sending the reference signal; or (2) mapping a reference signal corresponding to a second part of the first port index to a second resource group in the time-frequency unit, and sending the reference signal; wherein:

a port index in the first part of the first port index is different from a port index in the second part of the first port index; and a time-frequency resource in the second resource group is the same as a time-frequency resource in the first resource group;

wherein the reference signal is a demodulation reference signal (DMRS);

wherein an orthogonal cover code (OCC) sequence corresponding to the first part of the first port index is different from an orthogonal cover code sequence corresponding to the second part of the first port index;

wherein the ports corresponding to the first part of the first port index comprises eight ports and the ports corresponding to the second part of the first port index comprises eight ports.

16. The non-transitory computer-readable medium according to claim 15, wherein the OCC sequence corresponding to the first part of the first port index is [+1 +1 +1

+1] or [+1 −1 +1 −1], and the OCC sequence corresponding to the second part of the first port index is [+1 +1 −1 −1] or [+1 −1 −1 +1].

17. The non-transitory computer-readable medium according to claim 15, wherein:

the time-frequency unit comprises two contiguous resource block (RB) s in frequency domain and two consecutive time units in time domain;

the first resource group and the second resource group each comprise a third resource sub-block, a fourth resource sub-block, and a fifth resource sub-block, wherein the third resource sub-block, the fourth resource sub-block, and the fifth resource sub-block each comprise eight subcarriers in the time-frequency unit in frequency domain, and a time-frequency resource in the third resource sub-block, a time-frequency resource in the fourth resource sub-block, and a time-frequency resource in the fifth resource sub-block do not overlap with each other; and (1) the mapping a reference signal corresponding to a first part of the first port index to a first resource group in the time-frequency unit, and sending the reference signal comprises:

mapping a product of a reference sequence element corresponding to the reference signal and a seventh cover code element corresponding to the reference signal to a first resource element (RE) set in the first resource group, and sending the product, wherein:

the seventh cover code element is an element in a seventh orthogonal cover code sequence, each port in the ports corresponding to the first part of the first port index is corresponding to one seventh orthogonal cover code sequence, and each port in the ports corresponding to the first part of the first port index is corresponding to one seventh cover code element on each RE in the first RE set in the first resource group; or (2) the mapping a reference signal corresponding to a second part of the first port index to a second resource group in the time-frequency unit, and sending the reference signal comprises:

mapping a product of a reference sequence element corresponding to the reference signal and an eighth cover code element corresponding to the reference signal to a second RE set in the second resource group, and sending the product, wherein:

the eighth cover code element is an element in an eighth orthogonal cover code sequence, each port in the ports corresponding to the second part of the first port index is corresponding to one eighth orthogonal cover code sequence, and each port in the ports corresponding to the second part of the first port index is corresponding to one eighth cover code element on each RE in the second RE set in the second resource group.

18. The non-transitory computer-readable medium according to claim 17, wherein the seventh cover code element is a product of a seventh frequency domain cover code sub-element and a seventh time domain cover code sub-element, and the eighth cover code element is a product of an eighth frequency domain cover code sub-element and an eighth time domain cover code sub-element and both a length of the seventh orthogonal cover code sequence and a length of the eighth orthogonal cover code sequence are 8.

19. The non-transitory computer-readable medium according to claim 17, wherein the time unit is an orthogonal frequency division multiplexing (OFDM) symbol; and for port p, an $m^{th}$ reference sequence element r(m) in the DMRS is mapped to an RE whose index is $(k,l)_{p,\mu}$ according to the following rule, wherein the RE whose index is $(k,l)_{p,\mu}$ is corresponding to an $l^{th}$ OFDM symbol in one slot in time domain and corresponding to a $k^{th}$ subcarrier in the time-frequency unit in frequency domain, and this rule meets:

$$a_{k,l}^{(p,\mu)} = \beta_{PDSCH}^{DMRS} w_f(k') w_t(l') r(4n+k');$$

$$k = 8n + 2k' + \Delta;$$

$$k' = 0, 1, 2, 3;$$

$$l = \bar{l} + l';$$

$$n = 0, 1, \ldots \text{; and}$$

$$l' = 0, 1,$$

wherein p is a port index of the first port index, μ is a subcarrier spacing parameter, $$a_{k,l}^{(p,\mu)}$$

is a DMRS modulation symbol mapped to the RE whose index is $(k,l)_{p,\mu}$, $\bar{l}$ is a symbol index of the $1^{st}$ OFDM symbol occupied by the time-frequency unit, $$\beta_{PDSCH}^{DMRS}$$

is a power scaling factor, $w_t(l')$ is a time domain cover code sub-element corresponding to the $l^{th}$ OFDM symbol, $w_f(k')$ is a frequency domain cover code sub-element corresponding to the $k^{th}$ subcarrier, m=4n+k', and Δ is a subcarrier offset factor.

20. The non-transitory computer-readable medium according to claim 19, wherein values of $w_f(k')$, $w_t(l')$, and Δ corresponding to port p are determined based on the following table:

| | | | $w_f$(k') | | | | $w_t$ (l') | |
|---|---|---|---|---|---|---|---|---|
| p | λ | Δ | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | −1 | +1 | −1 | +1 | +1 |
| 1002 | 1 | 1 | +1 | +1 | +1 | +1 | +1 | +1 |
| 1003 | 1 | 1 | +1 | −1 | +1 | −1 | +1 | +1 |
| 1004 | 0 | 0 | +1 | +1 | +1 | +1 | +1 | −1 |
| 1005 | 0 | 0 | +1 | −1 | +1 | −1 | +1 | −1 |
| 1006 | 1 | 1 | +1 | +1 | +1 | +1 | +1 | −1 |
| 1007 | 1 | 1 | +1 | −1 | +1 | −1 | +1 | −1 |
| 1008 | 0 | 0 | +1 | +1 | −1 | −1 | +1 | +1 |
| 1009 | 0 | 0 | +1 | −1 | −1 | +1 | +1 | +1 |
| 1010 | 1 | 1 | +1 | +1 | −1 | −1 | +1 | +1 |
| 1011 | 1 | 1 | +1 | −1 | −1 | +1 | +1 | +1 |
| 1012 | 0 | 0 | +1 | +1 | −1 | −1 | +1 | −1 |
| 1013 | 0 | 0 | +1 | −1 | −1 | +1 | +1 | −1 |
| 1014 | 1 | 1 | +1 | +1 | −1 | −1 | +1 | −1 |
| 1015 | 1 | 1 | +1 | −1 | −1 | +1 | +1 | −1. |

* * * * *